(12) United States Patent
Liu et al.

(10) Patent No.: US 11,576,147 B2
(45) Date of Patent: Feb. 7, 2023

(54) PAGING INFORMATION TRANSMISSION METHOD, APPARATUS AND SYSTEM

(71) Applicant: ZTE Corporation, Guangdong (CN)

(72) Inventors: Xing Liu, Guangdong (CN); Feng Bi, Guangdong (CN); Yu Ngok Li, Guangdong (CN); Peng Hao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/459,922

(22) Filed: Jul. 2, 2019

(65) Prior Publication Data

US 2019/0327710 A1    Oct. 24, 2019

Related U.S. Application Data

(63) Continuation of application No. PCT/CN2017/120330, filed on Dec. 29, 2017.

(30) Foreign Application Priority Data

Jan. 5, 2017    (CN) .......................... 201710007665.9

(51) Int. Cl.
*H04W 68/02*    (2009.01)
*H04W 68/04*    (2009.01)

(52) U.S. Cl.
CPC .......... *H04W 68/02* (2013.01); *H04W 68/04* (2013.01)

(58) Field of Classification Search
CPC ..... H04W 68/00; H04W 68/02; H04W 68/04; H04W 16/28; H04W 68/005; H04W 76/27; H04W 76/28; H04W 92/20; H04B 7/0617
See application file for complete search history.

(56) References Cited

U.S. PATENT DOCUMENTS

2007/0105567 A1    5/2007  Mohanty et al.
2008/0268878 A1   10/2008  Wang et al.
(Continued)

FOREIGN PATENT DOCUMENTS

CN    101155167 A    4/2008
CN    101755475 A    6/2010
(Continued)

OTHER PUBLICATIONS

Extended European Search Report on EP 17889644.5 dated Oct. 21, 2019.
(Continued)

*Primary Examiner* — Quoc Thai N Vu
(74) *Attorney, Agent, or Firm* — Foley & Lardner LLP

(57) ABSTRACT

A method, apparatus and system for transmitting paging information. The method includes: calculating, by a first communication node, a time domain position of a paging occasion (PO) of a second communication node; and transmitting, by the first communication node, paging information to the second communication node within the PO corresponding to the time domain position, where the paging information includes at least one of: paging downlink control information and a paging message, and the PO includes a group of paging resources for transmitting paging information on one or more preset beams or ports.

10 Claims, 20 Drawing Sheets

(56) References Cited

U.S. PATENT DOCUMENTS

| | | | | |
|---|---|---|---|---|
| 2010/0240400 | A1* | 9/2010 | Choi | H04W 68/02 455/458 |
| 2010/0279715 | A1 | 11/2010 | Alanara et al. | |
| 2011/0051668 | A1* | 3/2011 | Lee | H04L 5/0007 370/328 |
| 2011/0134893 | A1* | 6/2011 | Park | H04W 68/02 370/336 |
| 2016/0183240 | A1* | 6/2016 | Hu | H04J 11/00 455/67.11 |
| 2017/0311342 | A1* | 10/2017 | You | H04B 7/0695 |
| 2017/0367069 | A1 | 12/2017 | Agiwal et al. | |
| 2018/0014249 | A1* | 1/2018 | Nagasaka | H04W 52/0229 |

FOREIGN PATENT DOCUMENTS

| | | |
|---|---|---|
| CN | 101981969 A | 2/2011 |
| CN | 102098783 A | 6/2011 |
| CN | 102598816 A | 7/2012 |
| CN | 104350795 A | 2/2015 |
| CN | 104394592 A | 3/2015 |
| CN | 104488217 A | 4/2015 |
| CN | 104919872 A | 9/2015 |
| CN | 105144612 A | 12/2015 |
| CN | 106170930 A | 11/2016 |
| EP | 2 624 644 A1 | 8/2013 |
| GB | 2 537 181 A | 10/2016 |
| WO | WO-2011/056252 A1 | 5/2011 |
| WO | WO-2013/149666 A1 | 10/2013 |
| WO | WO-2015/002578 A1 | 1/2015 |

OTHER PUBLICATIONS

Huawei, HiSilicon, "Design of broadcast signal/channel," 3GPP TSG RAN WG1 Meeting #87, R1-1611695, Nov. 14-18, 2016.
LG Electronics, "Issues on NR Initial Access," 3GPP TSG RAN WG1 Meeting #86bis, R1-1609264, Oct. 10-14, 2016.
Samsung, "NR paging channel design," 3GPP TSG RAN WG1 Meeting #87, R1-1612458, Nov. 14-18, 2016.
Samsung, "Discussion on NR paging design," 3GPP TSG RAN WG1 Meeting #86bis R1-1609115, Oct. 10-14, 2016.
Intel Corporation, "Paging reception," 3GPP TSG RAN WG2 Meeting #96, R2-168519, Reno, Nov. 14-18, 2016.
International Search Report and Written Opinion for International Appl. No. PCT/CN2017/120330, dated Mar. 9, 2018.
First CN Office Action on CN 201710007665.9 dated Jul. 26, 2021 (13 pages, including English translation).
First Office Action on CN 201811377575.X dated Mar. 2, 2021 (9 pages, including English translation).
Huawei, "HiSilicon Low frequency assisted High frequency operation," 3GPP TSG-RAN WG2 Meeting #96 R2-167878 , Nov. 4, 2016.
LG Electronics, "NR Paging Design" 3GPP TSG RAN WG1 Meeting #87, R1-1611789, Nov. 18, 2016, Reno, USA (3 pages).
Samsung., "Paging in NR—Beamforming Aspects" 3GPP TSG-RAN WG2 Meeting #95, R2-164697, Aug. 26, 2016, Gothenburg, Sweden (4 pages).
Second Office Action for CN Appl. No. 2017100076659, dated Feb. 16, 2022 (with English translation, 14 pages).
Second EP Office Action on EP 17889644.5 dated May 27, 2022 (5 pages).

* cited by examiner

PAGING INFORMATION TRANSMISSION METHOD, APPARATUS AND SYSTEM

CROSS-REFERENCE TO RELATED APPLICATIONS

This application claims the benefit of priority under 35 U.S.C. § 120 as a continuation of PCT Patent Application No. PCT/CN2017/120330 filed on Dec. 29, 2017, which claims priority to Chinese Patent Application No. 201710007665.9, filed on Jan. 5, 2017, the content of each of which is incorporated by reference herein in its entirety.

TECHNICAL FIELD

The present disclosure relates to the field of wireless communications, for example, to a method, apparatus and system for transmitting paging information.

BACKGROUND

With continuous progress in radio technologies, various radio services are flourishing. However, frequency spectrum resources on which the radio services are based are limited. With increasing bandwidth requirements, the frequency spectrum resources of 300 MHz to 3 GHz mainly used in commercial communications are extremely strained and cannot meet requirements of the future wireless communications.

In the new generation of wireless communications, communications will be performed by adopting a carrier frequency, such as 28 GHz, 45 GHz, 70 GHz, or the like, higher than the carrier frequency used in the fourth-generation (4G) wireless communication system. This type of high frequency channel may be subject to substantial free propagation loss, due to being absorbed by oxygen and affected by rain attenuation, which can negatively affect coverage performance of the high frequency communication system. However, the carrier frequency of the high frequency communications has a shorter wavelength, so more antenna elements can be accommodated in per unit area. An increased number of antenna elements may result in adopting a beamforming method to improve antenna gains, thereby ensuring the coverage performance of the high frequency communications.

With the beamforming method, the transmitting end may concentrate transmission energy in one direction, and the transmission energy is small or free in other directions, that is, each beam has its own directivity and can merely cover terminals in a certain direction. The transmitting end, such as a base station, needs to transmit multiple beams to implement full coverage. In a new generation of wireless communication systems, especially at high frequency bands, the application of beamforming techniques limits the coverage of a single transmit port to a very small angle. At this time, the network side cannot identify by which beam or port the user equipment (UE), when in an IDLE state, is covered. Compared with the cell-level paging message transmission mechanism at low frequency bands, the paging information is repeatedly transmitted on all beams to ensure the coverage of each of the potential positions of the UE. That is, the network side transmits more paging information to ensure that the UE in each beam direction or under each port has an opportunity to receive specified paging information. Due to the limitation of the number of radio links of the base station, the base station transmits the paging information in different beam directions or ports in the time division multiplexing manner. In a beam transmission-based system, beam directions of different subframes or timeslots are flexibly configured based on traffic. If a paging mechanism of a relevant system such as a Long Term Evolution (LTE) system is used, the paging information is loaded within a transmission subframe or timeslot corresponding to each beam, which can cause the UE to receive the paging information transmitted on different beams within multiple subframes or timeslots within the paging period. Since the UE, when in the IDLE state, cannot foresee how beams or ports are scheduled in different timeslots, in the new generation of wireless communication systems, it is challenging to implement a discontinuous reception (DRX) mechanism in the LTE system for paging information transmissions to reduce power consumption.

SUMMARY

The present disclosure provides a method, apparatus and system for transmitting paging information transmission, to solve at least the problem that when a DRX mechanism for receiving paging information in an LTE system is applied to a new generation of wireless communication systems, the paging information is loaded within a transmission subframe or timeslot corresponding to each beam and a UE in an IDLE state cannot foresee how beams or ports are scheduled in different timeslots so that it is complex, even impossible, to implement the DRX mechanism for paging information transmissions.

The present disclosure provides a method for transmitting paging information. The method includes steps described below.

A first communication node calculates a time domain position of a paging occasion (PO) of a second communication node.

The first communication node transmits paging information to the second communication node within the PO corresponding to the time domain position, and the paging information includes one or more of: paging downlink control information or a paging message.

The PO includes a group of paging resources for transmitting paging information transmissions on one or more preset beams or ports.

The present disclosure further provides a method for transmitting paging information. The method includes steps described below.

A second communication node calculates a time domain position of a paging occasion (PO) of the second communication node.

The second communication node receives paging information transmitted by a first communication node within the PO corresponding to the time domain position, and the paging information includes one or more of: paging downlink control information or a paging message.

The PO includes a group of paging resources for transmitting paging information on one or more preset beams or ports.

The present disclosure further provides a method for transmitting paging information. The method includes steps described below.

A first communication node transmits indication information to a second communication node, and the indication information is information of a quasi-co-location relationship between a signal related to paging information and other sweeping signals or channels. Alternatively, the first communication node and the second communication node configure the information of the quasi-co-location relationship between the signal related to the paging information and the other sweeping signals or channels.

The first communication node transmits the paging information to the second communication node according to the information of the quasi-co-location relationship, and the paging information includes one or more of: paging downlink control information or a paging message.

The present disclosure further provides a method for transmitting paging information. The method includes steps described below.

A second communication node receives indication information transmitted by a first communication node, and the indication information is information of a quasi-co-location relationship between a signal related to paging information and other sweeping signals or channels. Alternatively, the second communication node and the first communication node configure the information of the quasi-co-location relationship between the signal related to the paging information and the other sweeping signals or channels.

The second communication node receives the paging information transmitted by the first communication node according to the information of the quasi-co-location relationship, and the paging information includes one or more of: paging downlink control information or a paging message.

The present disclosure further provides an apparatus for transmitting paging information disposed in a first communication node. The apparatus includes a calculation device and a transmitting device.

The calculation device is configured to calculate a time domain position of a paging occasion (PO) of a second communication node.

The transmitting device is configured to transmit paging information to the second communication node within the PO corresponding to the time domain position calculated by the calculation device, and the paging information includes one or more of: paging downlink control information or a paging message.

The PO includes a group of paging resources for transmitting paging information on one or more preset beams or ports.

The present disclosure further provides an apparatus for transmitting paging information disposed in a second communication node. The apparatus includes a calculation device and a receiving device.

The calculation device is configured to calculate a time domain position of a paging occasion (PO) of the second communication node.

The receiving device is configured to receive paging information transmitted by a first communication node within the PO corresponding to the time domain position calculated by the calculation device, and the paging information includes one or more of: paging downlink control information or a paging message.

The PO includes a group of paging resources for transmitting paging information on one or more preset beams or ports.

The present disclosure further provides an apparatus for transmitting paging information disposed in a first communication node. The apparatus includes: a transmitting device and a configuration device.

The transmitting device is configured to transmit indication information to a second communication node, and the indication information is information of a quasi-co-location relationship between a signal related to paging information and other sweeping signals or channels. Alternatively, the configuration device is configured to configure the information of the quasi-co-location relationship between the signal related to the paging information and the other sweeping signals or channels in the first communication node.

The transmitting device is further configured to transmit the paging information to the second communication node according to the information of the quasi-co-location relationship, and the paging information includes one or more of: paging downlink control information and a paging message.

The present disclosure further provides an apparatus for transmitting paging information disposed in a second communication node. The apparatus includes: a receiving device and a configuration device.

The receiving device is configured to receive indication information transmitted by a first communication node, and the indication information is information of a quasi-co-location relationship between a signal related to paging information and other sweeping signals or channels. Alternatively, the configuration device is configured to configure the information of the quasi-co-location relationship between the signal related to the paging information and the other sweeping signals or channels in the second communication node.

The receiving device is further configured to receive the paging information transmitted by the first communication node according to the information of the quasi-co-location relationship, and the paging information includes one or more of: paging downlink control information and a paging message.

The present disclosure further provides a system for transmitting paging information. The system includes: a first communication node and at least one second communication node.

The first communication node is provided with the corresponding apparatus for transmitting paging information described above and each of the at least one second communication node is provided with the corresponding apparatus for transmitting paging information described above.

Alternatively, the first communication node is provided with the corresponding apparatus for transmitting paging information described above and each of the at least one second communication node is provided with the corresponding apparatus for transmitting paging information described above.

The present disclosure further provides a computer-readable storage medium configured to store computer-executable instructions for executing any method described above.

The present disclosure further provides a base station including one or more processors, a memory, and one or more programs, and when executed by the one or more processors, the one or more programs, which are stored in the memory, execute the corresponding method described above.

The present disclosure further provides a terminal device including one or more processors, a memory, and one or more programs, and when executed by the one or more processors, the one or more programs, which are stored in the memory, execute the corresponding method described above.

The present disclosure further provides a computer program product including a computer program stored in a non-transient computer-readable storage medium. The computer program includes program instructions which, when executed by a computer, enable the computer to execute any method described above.

The method, apparatus and system for transmitting paging information provided by the present disclosure may solve the problem that when a DRX mechanism for receiving the paging information in an LTE system is applied to the new generation of wireless communication systems, the paging information is loaded within the transmission subframe or timeslot corresponding to each beam and the UE in the IDLE state cannot foresee how the beams or ports are scheduled in the different timeslots so that it is complex, even impossible, to implement the DRX mechanism for paging information transmissions.

DETAILED DESCRIPTION

Figure 1:
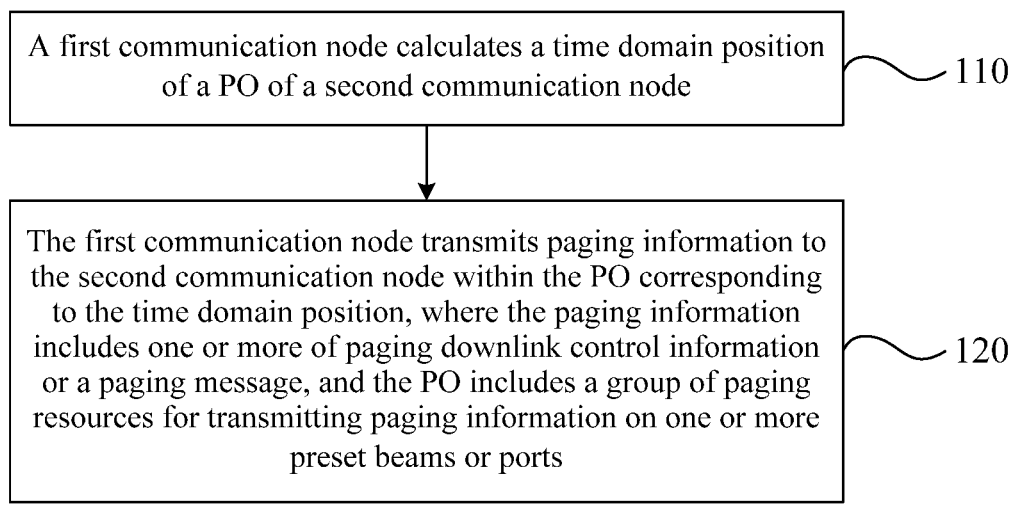
FIG. 1 is a flowchart of a method for transmitting paging information according to an embodiment of the present disclosure.

The steps shown in the flowcharts of the drawings may be performed by a computer system such as a group of computers capable of executing instructions. Although logical sequences are illustrated in the flowcharts, the illustrated or described steps may be performed in sequences different from those described herein in some cases.

Before a method for transmitting paging information provided in this embodiment is described, a manner in which a base station transmits paging information is briefly described. Generally, preliminary measurement and identification of beam directions are performed during a UE accesses a network and preferred uplink and downlink beams for transmission and reception are determined and applied to subsequent uplink and downlink data communications. When the UE, which has accessed the network, has no traffic to be transmitted, the UE may enter into an IDLE state. The UE, when in the IDLE state, can monitor the paging information to detect whether the core network side has a paging information field for the UE. The paging information field includes, for example, a downlink data arrival indication, a system message change indication, receiving indication information of an earthquake and tsunami warning system (ETWS), and receiving indication information of a commercial mobile alert service (CMAS). Due to mobility of the UE, a network side cannot identify an accurate position of the UE in the IDLE state. As such, the paging information is transmitted within a tracking area to ensure reliable reception of the specified UE. For an energy saving purpose, the UE in the IDLE state uses a DRX mechanism and wakes up merely at a specific time point, which is referred to as a paging occasion (PO). The PO is generally a specific subframe position within a specific radio frame calculated by the UE according to a DRX cycle and an identifier of the UE. The UE demodulates a control channel to acquire whether the network side has the paging information currently, determines whether the network side is to page the UE and what a paging reason is for a data channel according to paging scheduling information, and performs a subsequent operation according to the paging reason.

In a new generation of wireless communication systems, especially at high frequency bands, an application of beamforming techniques limits the coverage of a single transmit port to a very small angle. At this time, the network side cannot identify the UE in the IDLE state is covered by which beam or port. Compared with a cell-level paging message transmission mechanism at low frequency bands, the paging information is repeatedly transmitted on all beams to ensure the coverage of each potential position of the UE. That is, the network side transmits more paging information to ensure that the UE in each beam direction or under each port has an opportunity to receive specified paging information. Due to a limitation of a number of radio links of the base station, the base station transmits the paging information in different beam directions or ports in a time division multiplexing manner. In a beam transmission-based system, beam directions of different subframes or timeslots are flexibly configured based on traffic. If a paging mechanism of an LTE system is used, the paging information is loaded within a transmission subframe or timeslot corresponding to each beam, which means that the UE receives the paging information transmitted on different beams within multiple subframes or timeslots within a paging period. Since the UE in the IDLE state cannot foresee how beams or ports are scheduled in different timeslots, in the new generation of wireless communication systems, it is complex, even impossible, to implement the DRX mechanism in the LTE system for paging information transmissions to reduce power consumption.

How to provide a paging information transmission mechanism and a paging occasion determination method to help the UE receive the paging information with energy saved under a basic requirement to effectively cover a target area is an urgent problem to be solved in the new generation of wireless communication systems.

The methods provided by the present application are described through the embodiments described below, in which interaction entities include a first communication node and a second communication node. The first communication node may be the base station in the new generation of wireless communication systems, which may include the base station (BS) and an evolved Node B (eNB). The second communication node may be a terminal device in the new generation of wireless communication systems, such as the user equipment (UE). The embodiments provided by the present application may be combined with each other, and identical or similar concepts or processes may not be repeated in some embodiments.

FIG. 1 is a flowchart of a method for transmitting paging information according to this embodiment. The method for transmitting paging information in this embodiment is applicable to paging in a new generation of wireless communication systems, and may be executed by an apparatus for transmitting paging information. The apparatus for transmitting paging information is implemented by a combination of hardware and software and may be integrated into a processor of a first communication node for the processor's use. As shown in FIG. 1, the method in this embodiment may include steps described below.

In step 110, the first communication node calculates a time domain position of a PO of a second communication node.

This embodiment provides a manner in which the first communication node transmits paging information to the second communication node within a coverage range of the first communication node. Within the coverage range of the first communication node, multiple cells are covered and each cell has multiple second communication nodes. The first communication node may transmit the paging information to different second communication nodes within the POs of the different second communication nodes. Therefore, before transmitting the paging information, the first communication node calculates the time domain position of the PO of one second communication node so that the first communication node knows at which of the time domain positions the paging information is transmitted to one second communication node.

This embodiment involves two types of communication node: a first type communication node may be a network side device, such as a macro base station, a micro base station, a relay node, and a transmission reference point (TRP), which is configured to transmit the paging information in this embodiment; a second type communication node may be a terminal device or the relay node, which is configured to receive the paging information transmitted by the network side device in this embodiment. In application scenarios of this embodiment, a description may be made by using an example in which the first type communication node is a base station and the second type communication node is a UE, which is not to limit the present disclosure.

In step 120, the first communication node transmits the paging information to the second communication node within the PO corresponding to the time domain position, and the paging information includes one or more of: paging downlink control information and a paging message. The PO includes a group of paging resources for transmitting paging information on one or more preset beams or ports.

The PO may correspond to a synchronous signal burst set or to sweeping resources of a group of preset beams or ports.

In this embodiment, after calculating a time-frequency position of the PO of one second communication node, the first communication node may transmit the paging information to the one second communication node within the PO corresponding to the time-frequency position. In this embodiment, the paging information includes at least one of: the paging downlink control information (DCI) and the paging message. The paging DCI is used for indicating scheduling information of the paging information and includes one or more of: resource allocation information, modulation and coding scheme information, and frame structure parameter information. The paging message is used for indicating a terminal identifier related to the current paging information and a paging reason. When the paging downlink control information and the paging message are respectively transmitted through independent sweeping resources, the first communication node may also indicate to the second communication node a quasi-co-location relationship between the paging downlink control information and the paging message. Therefore, a terminal may determine a resource of the paging message according to a resource of the received paging downlink control information and the quasi-co-location relationship, and receive the paging message. Generally, the time-frequency position, i.e., the time domain position and a frequency domain position, is determined for paging information transmissions. The content provided by the present disclosure relates to determining the time domain position. Considering high transmission losses at high frequency bands (such as 28 GHz and 60 GHz), a beam-level transmission manner is introduced in the new generation of wireless communication systems, that is, beamforming techniques are introduced at both receiving and transmitting ends to obtain gains and improve coverage, which is the same for the paging information transmissions. The new generation of wireless communication systems differs from the LTE system in that the second type communication node repeatedly transmits the paging information in a sweeping manner on multiple beams or ports to ensure omnidirectional coverage of the first type communication node. In this sweeping transmission manner, the sweeping resources tend to be introduced to carry sweeping transmission.

Figure 2:
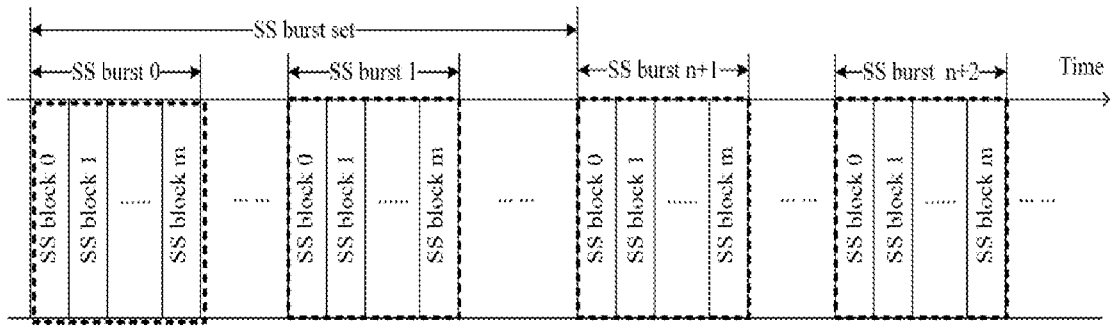
FIG. 2 is a structural diagram of a synchronous signal burst set in a method for transmitting paging information according to an embodiment of the present disclosure.

FIG. 2 is a structural diagram of the synchronous signal burst set in the method for transmitting paging information according to this embodiment. The synchronous signal (SS) burst set are sweeping resources configured for transmitting the SS. The SS burst set includes one or more SS bursts, each SS burst includes one or more SS blocks, and each SS block carries the SS of a specific beam or port (group). Beam sweeping is performed once in one SS burst set, that is, transmission of all beams or ports is completed. The SS block may further include a physical broadcast channel (PBCH), a demodulation reference signal corresponding to the PBCH, other control channels and data channels, and other signals.

In this embodiment, a resource of the SS burst set may be multiplexed for both SS transmissions and paging information transmissions, or the sweeping resources of the group of beams or ports may be preset for paging information transmissions. In this case, the PO of the second communication node is no longer one subframe in the LTE system, but corresponds to one complete sweeping resource, such as one SS burst set or one group of preset sweeping resources. For example, the first communication node transmits the paging information in all beam directions or ports within a paging burst set. The paging burst set includes one or more paging bursts, and each paging burst includes one or more paging blocks.

When the paging information includes the paging downlink control information, the second communication node may receive the paging message on a time-frequency resource indicated by the paging downlink control information and determine whether a paging notification is included for the second communication node itself. The paging information may include only the paging message. In this case, the second communication node needs to completely receive the paging message to determine whether the paging notification is included for the second communication node itself. Of course, the paging information may also include a paging downlink control indication and the paging message. In this case, the second communication node first receives the paging downlink control information and then receives the paging message within the same SS block or paging block according to the paging downlink control information.

A manner for transmitting the paging information in the LTE system is that the PO of the second communication node is a frame or a specific subframe of the frame in the LTE system. Compared with the manner for transmitting the paging information in the LTE system, the PO calculated in this embodiment includes the group of paging resources which may include one or more paging resources and be used for paging information transmissions on the one or more preset beams or ports; and the PO corresponds to the SS burst set or the sweeping resources of the group of preset beams or ports, that is, the first communication node may transmit the paging information in all beam directions or ports within the burst set or the sweeping resources to ensure that the paging information is effectively received within the PO of the second communication node.

In the paging information transmission method according to this embodiment, the first communication node calculates the time domain position of the PO of the second communication node, and transmits the paging information to the second communication node within the PO corresponding to the calculated time domain position, and the paging information includes the paging downlink control information or/and the paging message. In the technical solution provided by this embodiment, the PO of the second communication node includes the group of paging resources which may be used for paging information transmissions on the one or more preset beams or ports, and the PO corresponds to the SS burst set or the sweeping resources of the group of preset beams or ports, that is, the first communication node may transmit the paging information in all beam directions or ports within the burst set or the sweeping resources to ensure that the paging information may be effectively received within the PO of the second communication node, thereby solving the problem that when a DRX mechanism for receiving paging information in the LTE system is applied to the new generation of wireless communication systems, the paging information is loaded within a transmission subframe or timeslot corresponding to each beam and a UE in an IDLE state cannot foresee how beams or ports are scheduled in different timeslots so that it is complex, even impossible, to implement the DRX mechanism for paging information transmissions.

In an embodiment, step 110 may include steps described below.

The first communication node calculates a starting radio frame number of the PO of the second communication node.

The first communication node calculates the time domain position of the PO according to the starting radio frame number and a duration of the PO.

Figure 3:
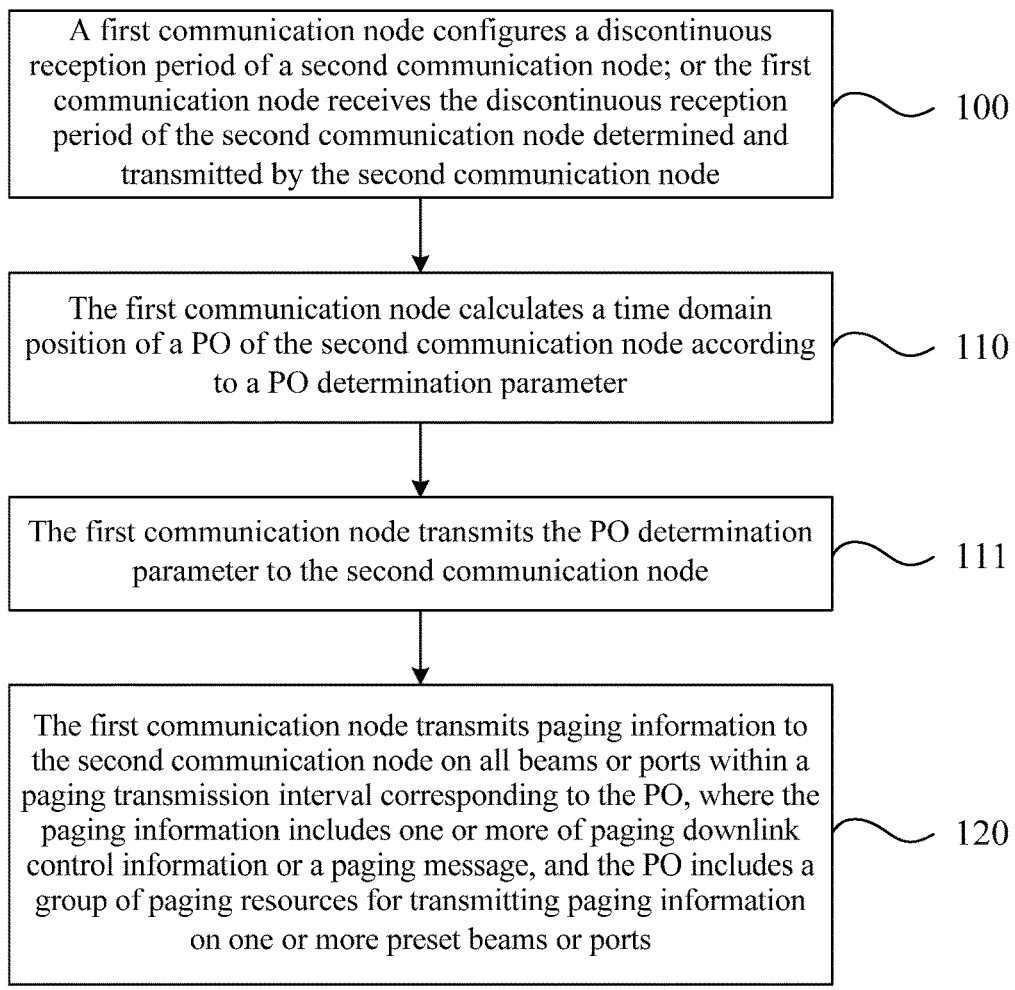
FIG. 3 is a flowchart of another method for transmitting paging information according to an embodiment of the present disclosure.

FIG. 3 is a flowchart of another method for transmitting paging information according to this embodiment. Based on the embodiment shown in FIG. 1, in the method according to this embodiment, an implementation manner of S110 may be that the first communication node calculates the time domain position of the PO of the second communication node according to a PO determination parameter. The PO determination parameter includes one or more of the following:

1. a discontinuous reception cycle $T_{DRX}$ of the second communication node;
2. a paging transmission interval $T_{paging}$ of the first communication node;
3. a number N of paging information transmissions performed by the first communication node within the discontinuous reception cycle;
4. an identifier (ID), Device_ID, of the second communication node; or
5. a PO offset $t_{offset}$ of the second communication node.

In an embodiment, before step 120, the method may further include step 111.

In step 111, the first communication node transmits the PO determination parameter to the second communication node. The PO determination parameter also includes one or more of the preceding parameters. The PO determination parameter is transmitted to the second communication node to instruct the second communication node to calculate the time domain position of the same PO according to the PO determination parameter so that the first communication node and the second communication node may transmit and receive the paging information within the same PO.

In an embodiment, the discontinuous reception cycle of the second communication node in the PO determination parameter is a period within which the second communication node receives the paging information. Before step 110, the method in this embodiment may further include step 100.

In step 100, the first communication node configures the discontinuous reception cycle of the second communication node; or the first communication node receives the discontinuous reception cycle of the second communication node determined and transmitted by the second communication node.

In an embodiment, the paging transmission interval of the first communication node in the PO determination parameter corresponds to the PO, that is, the PO of the second communication node. That is, the first communication node transmits the paging information to the second communication node within the paging transmission interval. An implementation manner of step 120 in this embodiment may be that the first communication node transmits the paging information to the second communication node on all beams or ports within the paging transmission interval corresponding to the PO. That is to say, the first communication node may transmit the paging information within each paging transmission interval, and transmit the paging information on all the beams or ports within each paging transmission interval to ensure that the second communication node may effectively receive the paging information within the PO corresponding to the paging transmission interval.

In an embodiment, in the PO determination parameter, $T_{paging}=n*T_{SS}$, or $T_{paging}=(1/n)*T_{SS}$, where $T_{SS}$ is a period of the SS burst set, i.e., the period of the SS burst set shown in FIG. 2. The first communication node may notify the second communication node of $T_{SS}$ in a broadcast manner. In addition, n is a positive integer. That is to say, $T_{paging}$ may be an integer multiple of $T_{SS}$ or a divisor of $T_{SS}$.

In an embodiment, the PO offset in the PO determination parameter is a parameter for adjusting the time domain position of the PO of the second communication node. For example, in some application scenarios, the effect of multiplexing the SS burst set may be achieved by configuring the PO offset.

In one possible implementation manner of this embodiment, the time domain position of the PO may be calculated according to the identifier of the second communication node in the PO determination parameter. An implementation manner of step 110 may be that the first communication node calculates a group of paging resources within the discontinuous reception cycle as the PO of the second communication node according to the identifier of the second communication node and calculates the starting radio frame number corresponding to the group of paging resources according to the identifier of the second communication node.

In this implementation manner, the first communication node calculates the starting radio frame number of the PO of the second communication node according to one of the following formulas:

$$\text{SFN mod } T_{DRX} = \lfloor T_{paging}*(\text{Device\_ID mod } \lfloor T_{DRX}/T_{paging} \rfloor) \rfloor;$$

$$\text{SFN mod } T_{DRX} = \lfloor T_{paging}*(\text{Device\_ID mod}(T_{DRX}/T_{paging})) \rfloor;$$

$$\text{SFN mod } T_{DRX} = T_{paging}*(\text{Device\_ID mod } \lfloor T_{DRX}/T_{paging} \rfloor);$$

$$\text{SFN mod } T_{DRX} = T_{paging}*(\text{Device\_ID mod}(T_{DRX}/T_{paging}));$$

$$\text{SFN mod } T_{DRX} = \lfloor \lfloor T_{DRX}/N \rfloor *(\text{Device\_ID mod } N) \rfloor;$$

$$\text{SFN mod } T_{DRX} = \lfloor T_{DRX}/N \rfloor *(\text{Device\_ID mod } N);$$

$$\text{SFN mod } T_{DRX} = \lfloor (T_{DRX}/N)*(\text{Device\_ID mod } N) \rfloor;$$

$$\text{SFN mod } T_{DRX} = (T_{DRX}/N)*(\text{Device\_ID mod } N);$$

$$\text{SFN mod } T_{DRX} = \lfloor T_{paging}*(\text{Device\_ID mod } \lfloor T_{DRX}/T_{paging} \rfloor) \rfloor t_{offset};$$

$$\text{SFN mod } T_{DRX} = \lfloor T_{paging}*(\text{Device\_ID mod}(T_{DRX}/T_{paging})) \rfloor + t_{offset};$$

$$\text{SFN mod } T_{DRX} = T_{paging}*(\text{Device\_ID mod } \lfloor T_{DRX}/T_{paging} \rfloor) + t_{offset};$$

$$\text{SFN mod } T_{DRX} = T_{paging}*(\text{Device\_ID mod}(T_{DRX}/T_{paging})) + t_{offset};$$

$$\text{SFN mod } T_{DRX} = \lfloor \lfloor T_{DRX}/N \rfloor *(\text{Device\_ID mod } N) \rfloor + t_{offset};$$

$$\text{SFN mod } T_{DRX} = \lfloor T_{DRX}/N \rfloor *(\text{Device\_ID mod } N) + t_{offset};$$

$$\text{SFN mod } T_{DRX} = \lfloor (T_{DRX}/N)*(\text{Device\_ID mod } N) \rfloor + t_{offset}; \text{ and}$$

$$\text{SFN mod } T_{DRX} = (T_{DRX}/N)*(\text{Device\_ID mod } N) + t_{offset}.$$

SFN is the starting radio frame number of the PO of the second communication node. In a practical application scenario, the first communication node selects one of the preceding formulas according to the content of the PO determination parameter to calculate the starting radio frame number of the PO.

In an embodiment, as shown in the preceding formulas, the PO offset is included in some formulas. In this implementation manner, before step 110, the method may further include that the first communication node configures an universal PO offset for the second communication node in a cell.

In another possible implementation manner of this embodiment, the time domain position of the PO may be calculated according to the PO offset in the PO determination parameter. The implementation manner of step 110 may include steps described below.

The first communication node configures a preset PO offset for the second communication node.

The first communication node calculates a group of paging resources within the discontinuous reception cycle as the PO of the second communication node according to the preset PO offset and calculates the starting radio frame number corresponding to the group of paging resources according to the preset PO offset.

In this implementation manner, the first communication node calculates the starting radio frame number of the PO of the second communication node according to the following formula: SFN mod $T_{DRX} = t_{offset}$. Where SFN is also the starting radio frame number of the PO of the second communication node.

In this implementation manner, before step 110, the method may further includes that the first communication node configures one PO offset for each second communication node in the cell, and the one PO offset configured for each second communication node is the same or different, and different PO offsets are used for configuring each second communication node being within different POs.

In an embodiment, based on the embodiments described above, when the paging transmission interval of the first communication node is less than a radio frame length, after calculating the starting radio frame number of the PO of the second communication node, the method in this embodiment may further include that the first communication node calculates a starting subframe position of the starting radio frame number of the PO of the second communication node. Accordingly, in this embodiment, the implementation manner of step 120 may be that the first communication node transmits the paging information to the second communication node within the PO corresponding to the starting subframe position of the starting radio frame number.

In a practical application, an implementation manner for calculating the starting subframe position of the starting radio frame number of the PO of the second communication node may include that the first communication node calculates the starting subframe position of the starting radio frame number of the PO of the second communication node according to the identifier Device_ID of the second communication node.

For example, the length of a radio frame is 2n milliseconds (ms), and the radio frame includes 2 m subframes; the paging transmission interval of the first communication node is n ms; and the starting subframe position is a subframe 0 or a subframe m and the starting subframe position may be represented by a last bit such as 0 or 1 of the Device_ID of the second communication node.

In an embodiment, the second communication node may also determine a manner for receiving the paging information according to information of a quasi-co-location relationship. In one implementation manner, the first communication node and the second communication node are preconfigured with the information of the quasi-co-location relationship between a signal related to the paging information and other sweeping signals or channels. That is, the preceding communication nodes predefine the information of the quasi-co-location relationship through a common protocol or a system to which the communication nodes belong. In another implementation manner, before step 120, the method may further include that the first communication node transmits indication information to the second communication node, and the indication information is the information of the quasi-co-location relationship between the signal related to the paging information and the other sweeping signals or channels.

In this embodiment, the signal related to the paging information is a reference signal for demodulating the paging information such as a demodulation reference signal of the paging information; or the signal related to the paging information is a reference signal for demodulating a physical control channel related to the paging information such as a demodulation reference signal of a physical downlink control channel carrying the paging DCI. The other sweeping signals or channels include one or more of: the synchronous signal (SS), the demodulation reference signal (DMRS) of the physical broadcast channel (PBCH), a beam reference signal (BRS), the DMRS, a mobility reference signal (MRS), and a channel state information-reference signal (CSI-RS). The information of the quasi-co-location relationship includes: information on a signal or channel with the quasi-co-location relationship with the signal related to the paging information, and a mapping relationship between a port number or/and a resource of the signal related to the paging information and port numbers or/and resources of the other sweeping signals or channels.

Figure 4:
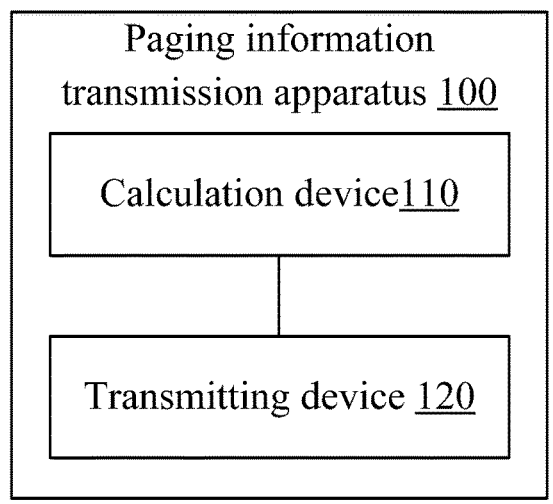
FIG. 4 is a structural diagram of an apparatus for transmitting paging information according to an embodiment of the present disclosure.

FIG. 4 is a structural diagram of an apparatus for transmitting paging information provided in this embodiment. The apparatus for transmitting paging information in this embodiment is applicable to paging in a new generation of wireless communication systems. The apparatus for transmitting paging information is implemented by a combination of hardware and software and may be integrated into a processor of a first communication node for the processor's use. As shown in FIG. 4, the paging information transmission apparatus 100 in this embodiment may include a calculation device 110 and a transmitting device 120.

The calculation device 110 is configured to calculate a time domain position of a paging occasion (PO) of a second communication node.

This embodiment provides a manner in which the first communication node transmits paging information to the second communication node within a coverage range of the first communication node. Within the coverage range of the first communication node, multiple cells are covered and each cell has multiple second communication nodes. The first communication node may transmit the paging information to different second communication nodes within the POs of the different second communication nodes. Therefore, before transmitting the paging information, the first communication node calculates the time domain position of the PO of one second communication node so that the first communication node knows at which specific time domain position the paging information is transmitted to the one second communication node. Entities and functions of a first type communication node and a second type communication node involved in this embodiment have been described in detail in the above-described embodiments, which are not repeated herein.

The transmitting device 120 is configured to transmit the paging information to the second communication node within the PO corresponding to the time domain position calculated by the calculation device 110, and the paging information includes one or more of: paging downlink control information or a paging message. The PO includes a group of paging resources for transmitting paging information on one or more preset beams or ports.

The PO may correspond to a synchronous signal burst set or to sweeping resources of a group of preset beams or ports.

In this embodiment, after calculating a time-frequency position of the PO of one second communication node, the first communication node may transmit the paging information to the one second communication node within the PO corresponding to the time-frequency position. In this embodiment, the paging information includes the paging downlink control information or/and the paging message. The content and functions of the paging downlink control information and the paging message, and the structures of the synchronous signal burst set and the sweeping resources of the preset beams or ports have been described in detail in the above-mentioned embodiments, which are not repeated herein.

When the paging information includes the paging downlink control information, the second communication node may receive the paging message on a time-frequency resource indicated by the paging downlink control information and determine whether a paging notification is included for the second communication node itself. The paging information may include only the paging message. In this case, the second communication node needs to completely receive the paging message to determine whether the paging notification is included for the second communication node itself. Of course, the paging information may also include a paging downlink control indication and the paging message. In this case, the paging downlink control information is first received and then the paging message within the same synchronous signal (SS) block or paging block is received according to the paging downlink control information.

The apparatus for transmitting paging information according to this embodiment is configured to execute the method for transmitting paging information according to the embodiment shown in FIG. 1 and has corresponding functional devices. The implementation principle and technical effects are similar and thus will not be repeated herein.

In an embodiment, the calculation device 110 may include a first calculation unit and a second calculation unit.

The first calculation unit is configured to calculate a starting radio frame number of the PO of the second communication node.

The second calculation unit is configured to calculate the time domain position of the PO according to the starting radio frame number calculated by the first calculation unit and a duration of the PO.

In an embodiment, the calculation device 110 may calculation the time domain position of the PO of the second communication unit by calculating the time domain position of the PO of the second communication node according to a PO determination parameter. The PO determination parameter includes one or more of the following:

1. a discontinuous reception cycle $T_{DRX}$ of the second communication node;
2. a paging transmission interval $T_{paging}$ of the first communication node;
3. a number N of paging information transmissions performed by the first communication node within the discontinuous reception cycle;
4. an identifier (ID) Device_ID of the second communication node; and
5. a PO offset $t_{offset}$ of the second communication node.

In an embodiment, the transmitting device 120 of the apparatus for transmitting paging information 100 is further configured to transmit the PO determination parameter to the second communication node before transmitting the paging information. The PO determination parameter also includes one or more of the preceding parameters. The PO determination parameter is transmitted to the second communication node to instruct the second communication node to calculate the time domain position of the same PO according to the PO determination parameter* so that the first communication node and the second communication node may transmit and receive the paging information within the same PO.

Figure 5:
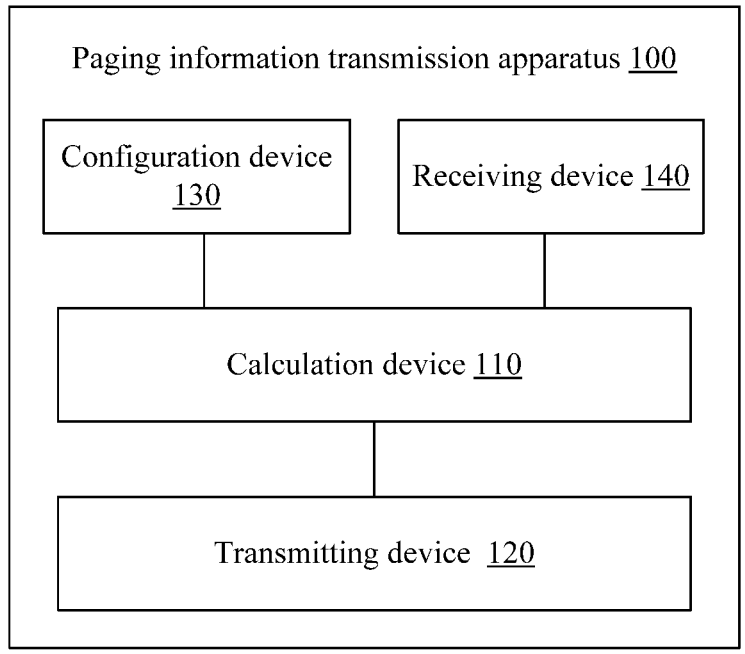
FIG. 5 is a structural diagram of another apparatus for transmitting paging information according to an embodiment of the present disclosure.

In an embodiment, the discontinuous reception cycle of the second communication node in the PO determination parameter is a period within which the second communication node receives the paging information. FIG. 5 is a structural diagram of another apparatus for transmitting paging information according to this embodiment. Based on the structure of the embodiment shown in FIG. 4, the paging information transmission apparatus 100 according to this embodiment may further include one or more of a configuration device 130 or a receiving device 140. The apparatus shown in FIG. 5 is illustrated by taking the configuration device 130 and the receiving device 140 as examples.

The configuration device 130 is configured to configure the discontinuous reception cycle of the second communication node before the calculation device 110 calculates the time domain position of the PO of the second communication node.

The receiving device 140 is configured to receive the discontinuous reception cycle of the second communication node determined and transmitted by the second communication node before the calculation device 110 calculates the time domain position of the PO of the second communication node.

In an embodiment, the paging transmission interval of the first communication node in the PO determination parameter corresponds to the PO, that is, the PO of the second communication node. The transmitting device 120 in this embodiment may transmit the paging information to the second communication node by transmitting the paging information to the second communication node on all beams or ports within the paging transmission interval corresponding to the PO. That is to say, the first communication node may transmit the paging information within each paging transmission interval, and transmit the paging information on all the beams or ports within each paging transmission interval to ensure that the second communication node may effectively receive the paging information within the PO corresponding to the paging transmission interval.

In an embodiment, in the PO determination parameter, $T_{paging}=n*T_{SS}$, or $T_{paging}=(1/n)*T_{SS}$, where $T_{SS}$ is a period of the SS burst set and n is a positive integer. That is to say, $T_{paging}$ may be an integer multiple of $T_{SS}$ or a divisor of $T_{SS}$.

In an embodiment, the PO offset in the PO determination parameter is a parameter for adjusting the time domain position of the PO of the second communication node. For example, in some application scenarios, the PO offset may be set to multiplex the SS burst set.

In one possible implementation manner of this embodiment, the time domain position of the PO may be calculated according to the identifier of the second communication node in the PO determination parameter. The calculation device 110 may calculate the time domain position of the PO of the second communication node by calculating a group of paging resources within the discontinuous reception cycle as the PO of the second communication node according to the identifier of the second communication node and calculating the starting radio frame number corresponding to the group of paging resources according to the identifier of the second communication node.

In this implementation manner, the calculation device 110 calculates the starting radio frame number of the PO of the second communication node according to one of the following formulas:

$$\text{SFN mod } T_{DRX} = \lfloor T_{paging} * (\text{Device\_ID mod } \lfloor T_{DRX}/T_{paging} \rfloor) \rfloor;$$

$$\text{SFN mod } T_{DRX} = \lfloor T_{paging} * (\text{Device\_ID mod}(T_{DRX}/T_{paging})) \rfloor;$$

$$\text{SFN mod } T_{DRX} = T_{paging} * (\text{Device\_ID mod } \lfloor T_{DRX}/T_{paging} \rfloor);$$

$$\text{SFN mod } T_{DRX} = T_{paging} * (\text{Device\_ID mod}(T_{DRX}/T_{paging}));$$

$$\text{SFN mod } T_{DRX} = \lfloor \lfloor T_{DRX}/N \rfloor * (\text{Device\_ID mod } N) \rfloor;$$

$$\text{SFN mod } T_{DRX} = \lfloor T_{DRX}/N \rfloor * (\text{Device\_ID mod } N);$$

$$\text{SFN mod } T_{DRX} = \lfloor (T_{DRX}/N) * (\text{Device\_ID mod } N) \rfloor;$$

$$\text{SFN mod } T_{DRX} = (T_{DRX}/N) * (\text{Device\_ID mod } N);$$

$$\text{SFN mod } T_{DRX} = \lfloor T_{paging} * (\text{Device\_ID mod } \lfloor T_{DRX}/T_{paging} \rfloor) \rfloor + t_{offset};$$

$$\text{SFN mod } T_{DRX} = \lfloor T_{paging} * (\text{Device\_ID mod}(T_{DRX}/T_{paging})) \rfloor + t_{offset};$$

$$\text{SFN mod } T_{DRX} = T_{paging} * (\text{Device\_ID mod } \lfloor T_{DRX}/T_{paging} \rfloor) + t_{offset};$$

$$\text{SFN mod } T_{DRX} = T_{paging} * (\text{Device\_ID mod}(T_{DRX}/T_{paging})) + t_{offset};$$

$$\text{SFN mod } T_{DRX} = \lfloor \lfloor T_{DRX}/N \rfloor * (\text{Device\_ID mod } N) \rfloor + t_{offset};$$

$$\text{SFN mod } T_{DRX} = \lfloor T_{DRX}/N \rfloor * (\text{Device\_ID mod } N) + t_{offset};$$

$$\text{SFN mod } T_{DRX} = \lfloor (T_{DRX}/N) * (\text{Device\_ID mod } N) \rfloor + t_{offset}; \text{ and}$$

$$\text{SFN mod } T_{DRX} = (T_{DRX}/N) * (\text{Device\_ID mod } N) + t_{offset}.$$

SFN is the starting radio frame number of the PO of the second communication node. In a practical application scenario, the first communication node selects one of the preceding formulas according to the content of the PO determination parameter to calculate the starting radio frame number of the PO.

In an embodiment, as shown in the preceding formulas, the PO offset is included in some formulas. In this implementation manner, the configuration device 130 in the paging information transmission apparatus 100 is further configured to configure an universal PO offset for the second communication node in a cell before the calculation device 110 calculates the time domain position of the PO of the second communication node.

In another possible implementation manner of this embodiment, the time domain position of the PO may be calculated according to the PO offset in the PO determination parameter. The calculation device 110 may calculate the time domain position of the PO of the second communication node by configuring a preset PO offset for the second communication node, and calculating a group of paging resources within the discontinuous reception cycle as the PO of the second communication node according to the preset PO offset and calculating the starting radio frame number corresponding to the group of paging resources according to the preset PO offset.

In this implementation manner, the calculation device 110 calculates the starting radio frame number of the PO of the second communication node according to the following formula: $\text{SFN mod } T_{DRX} = t_{offset}$. Where SFN is also the starting radio frame number of the PO of the second communication node.

In this implementation manner, before the calculation device 110 calculates the time domain position of the PO of the second communication node, the configuration device 130 is further configured to configure one PO offset for each second communication node in the cell, the one PO offset configured for each second communication node is the same or different, and different PO offsets are used for configuring each second communication node being within different POs.

In an embodiment, based on the embodiments described above, when the paging transmission interval of the first communication node is less than a length of a radio frame, the calculation device 110 in this embodiment may further include a third calculation unit. The third calculation unit is configured to calculate a starting subframe position of the starting radio frame number of the PO of the second communication node after the first calculation unit calculates the starting radio frame number of the PO of the second communication node. Accordingly, in this embodiment, the transmitting device 120 may transmit the paging information by transmitting the paging information to the second communication node within the PO corresponding to the starting subframe position of the starting radio frame number.

In a practical application, the third calculation unit may calculate the starting subframe position of the starting radio frame number of the PO of the second communication node by calculating the starting subframe position of the starting radio frame number of the PO of the second communication node according to the device_ID of the second communication node.

For example, the length of a radio frame is 2n milliseconds (ms), and the radio frame includes 2 m subframes; the paging transmission interval of the first communication node is n ms; and the starting subframe position is a subframe 0 or a subframe m and the starting subframe position may be represented by a last bit such as 0 or 1 of the identifier Device_ID of the second communication node.

In an embodiment, the second communication node may also determine a manner for receiving the paging information according to information of a quasi-co-location relationship. In one implementation manner, the first communication node and the second communication node are preconfigured with the information of the quasi-co-location relationship between a signal related to the paging information and other sweeping signals or channels. That is, the preceding communication nodes predefine the information of the quasi-co-location relationship through a common protocol or a system to which the communication nodes belong. In another implementation manner, the transmitting device 120 is further configured to transmit indication information to the second communication node before transmitting the paging information to the second communication node, and the indication information is the information of the quasi-co-location relationship between the signal related to the paging information and the other sweeping signals or channels.

In this embodiment, the signal related to the paging information is a reference signal for demodulating the paging information such as a demodulation reference signal of the paging information; or the signal related to the paging information is a reference signal for demodulating a physical control channel related to the paging information such as a demodulation reference signal of a physical downlink control channel carrying the paging DCI. The other sweeping signals or channels include one or more of: the synchronous signal (SS), the demodulation reference signal (DMRS) of a physical broadcast channel (PBCH), a beam reference signal (BRS), the DMRS, a mobility reference signal (MRS), and a channel state information-reference signal (CSI-RS). The information of the quasi-co-location relationship includes: information on a signal or channel with the quasi-co-location relationship with the signal related to the paging information, and a mapping relationship between a port number or/and a resource of the signal related to the paging information and port numbers or/and resources of the other sweeping signals or channels.

The apparatus for transmitting paging information according to this embodiment is configured to execute the method for transmitting paging information according to the embodiment shown in FIG. 3 and has corresponding functional devices. The implementation principle and technical effects are similar and thus will not be repeated herein.

Figure 6:
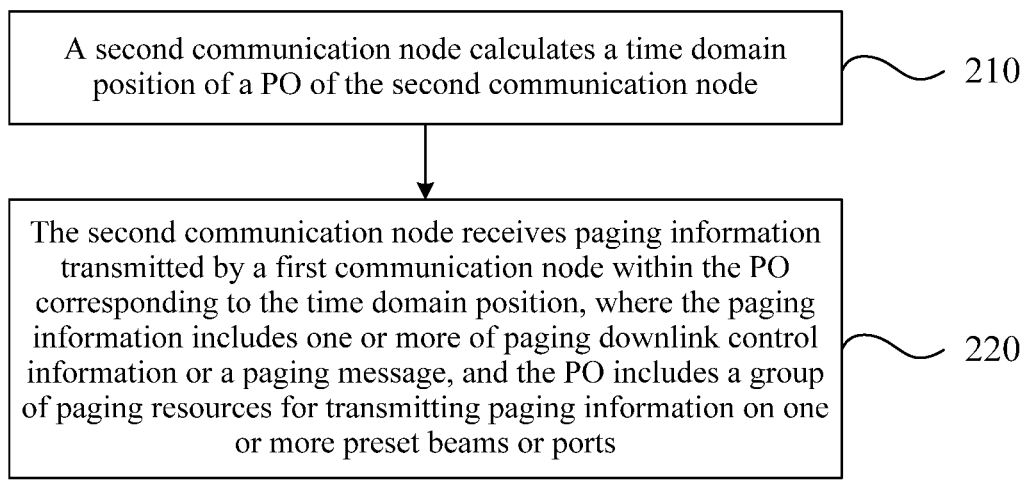
FIG. 6 is a flowchart of another method for transmitting paging information according to an embodiment of the present disclosure.

FIG. 6 is a flowchart of another method for transmitting paging information according to this embodiment. The method for transmitting paging information in this embodiment is applicable to paging in a new generation of wireless communication systems, and may be executed by an apparatus for transmitting paging information. The apparatus for transmitting paging information is implemented by a combination of hardware and software and may be integrated into a processor of a second communication node for the processor's use. As shown in FIG. 6, the method in this embodiment may include steps described below.

In step 210, the second communication node calculates a time domain position of a PO of the second communication node.

This embodiment provides a manner in which a first communication node transmits paging information to the second communication node within a coverage range of the first communication node. Within the coverage range of the first communication node, multiple cells are covered and each cell has multiple second communication nodes. The first communication node may transmit the paging information to different second communication nodes within the POs of the different second communication nodes. Therefore, before transmitting the paging information, the first communication node calculates the time domain position of the PO of one second communication node so that the first communication node knows at which specific time domain position the paging information is transmitted to the one second communication node. Entities and functions of a first type communication node and a second type communication node involved in this embodiment have been described in detail in the above-described embodiments, which are not repeated herein.

In step 220, the second communication node receives the paging information transmitted by the first communication node within the PO corresponding to the time domain position, and the paging information includes one or more of: paging downlink control information or a paging message. The PO includes a group of paging resources for transmitting paging information on one or more preset beams or ports.

The PO may correspond to a synchronous signal burst set or to sweeping resources of a group of preset beams or ports.

In this embodiment, after calculating a time-frequency position of the PO of the second communication node from the first communication node, the second communication node may receive the paging information transmitted by the first communication node within the PO corresponding to the time-frequency position. In this embodiment, the paging information includes the paging downlink control information or/and the paging message. The content and functions of the paging downlink control information and the paging message, and the structures of the synchronous signal burst set and the sweeping resources of the preset beams or ports have been described in detail in the above-mentioned embodiments, which are not repeated herein.

In this embodiment, with reference to the synchronous signal burst set shown in FIG. 2, the second communication node needs to determine the synchronous signal burst set belonging to the second communication node itself and receive a potential paging message within a specified synchronous signal burst set. In an embodiment, the second communication node completes the downlink preferred transmit and receive beam training of the downlink before receiving the paging message so that a terminal may receive the paging message using a preferred receive beam within a synchronous signal (SS) block corresponding to a preferred transmit beam of the first communication node.

When the paging information includes the paging downlink control information, the second communication node may receive the paging message on a time-frequency resource indicated by the paging downlink control information and determine whether a paging notification is included for the second communication node itself. The paging information may include only the paging message. In this case, the second communication node can completely receive the paging message to determine whether the paging notification is included for the second communication node itself. Of course, the paging information may also include a paging downlink control indication and the paging message. In this case, the paging downlink control information is first received and then the paging message within the same SS block or paging block is received according to the paging downlink control information.

In the method for transmitting paging information provided by this embodiment, the second communication node calculates the time domain position of the PO of the second communication node, and receives the paging information transmitted by the first communication node within the PO corresponding to the calculated time domain position, and the paging information includes the paging downlink control information or/and the paging message. In the technical solution provided by this embodiment, the PO of the second communication node includes the group of paging resources, and the PO corresponds to the SS burst set or the sweeping resources of the group of preset beams or ports, that is, the first communication node may transmit the paging information in all beam directions or ports within the burst set or the sweeping resources to ensure that the paging information may be effectively received within the PO of the second communication node, thereby solving the problem that when a DRX mechanism for receiving paging information in an LTE system is applied to the new generation of wireless communication systems, the paging information needs to be loaded within a transmission subframe or timeslot corresponding to each beam and a UE in an IDLE state cannot foresee how beams or ports are scheduled in different timeslots so that it is complex, even impossible, to implement the DRX mechanism for paging information transmissions.

In an embodiment, step 210 may include steps described below.

The second communication node calculates a starting radio frame number of the PO of the second communication node.

The second communication node calculates the time domain position of the PO according to the starting radio frame number and a duration of the PO.

Figure 7:
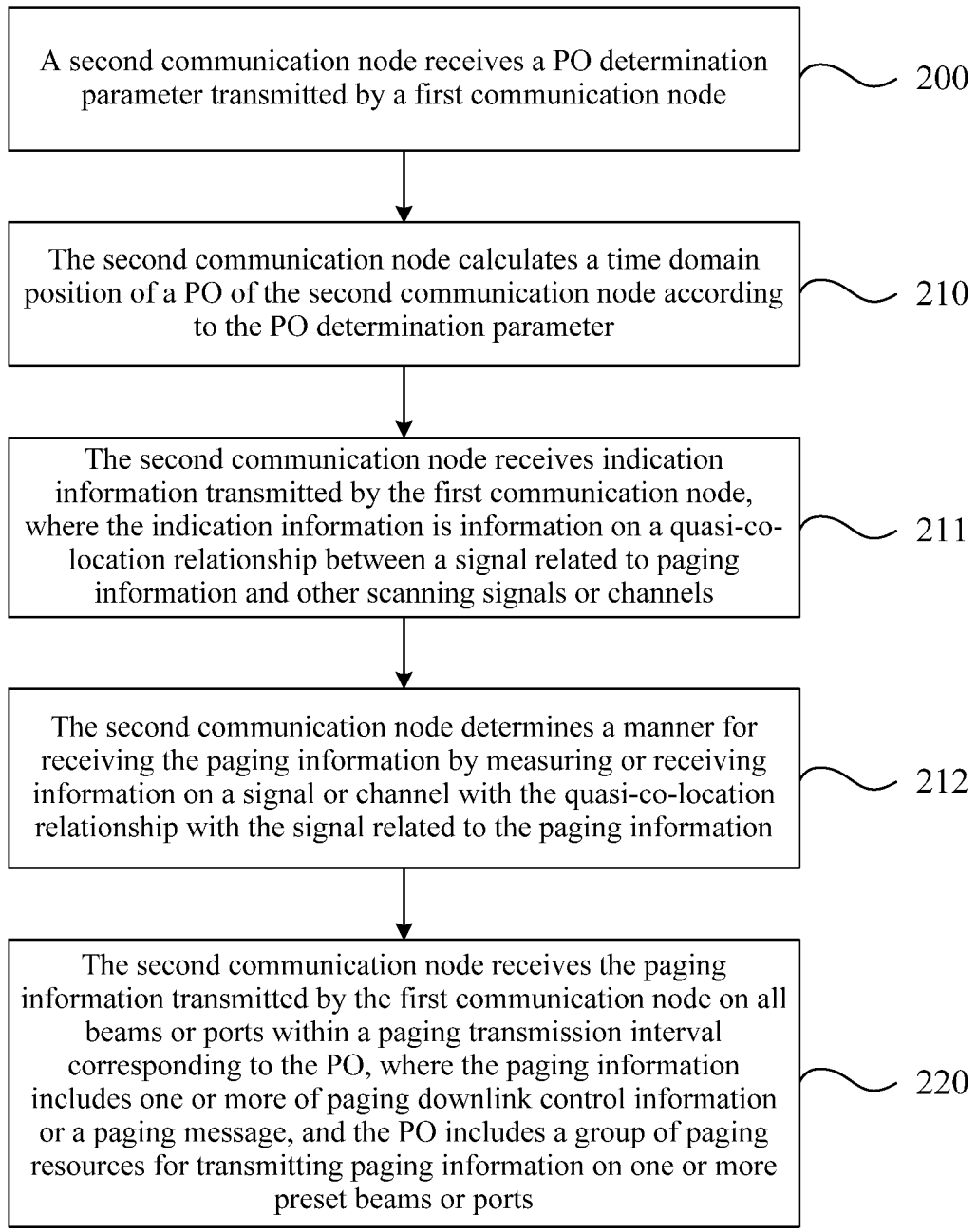
FIG. 7 is a flowchart of another method for transmitting paging information according to an embodiment of the present disclosure.

In an embodiment, FIG. 7 is a flowchart of another method for transmitting paging information according to this embodiment. Based on the embodiment shown in FIG. 6, the method in this embodiment may further include step 200 before step 210.

In step 200, the second communication node receives a PO determination parameter transmitted by the first communication node.

An implementation manner of S210 in this embodiment may be that the second communication node calculates the time domain position of the PO of the second communication node according to the PO determination parameter. The PO determination parameter may be received by the second communication node from the first communication node or configured in the second communication node. The PO determination parameter includes one or more of the following:

1. a discontinuous reception cycle $T_{DRX}$ of the second communication node;
2. a paging transmission interval $T_{paging}$ of the first communication node;
3. a number N of paging information transmissions performed by the first communication node within the discontinuous reception cycle;
4. an identifier (ID) device_ID of the second communication node; or
5. a PO offset $t_{offset}$ of the second communication node.

For example, the discontinuous reception cycle $T_{DRX}$ may be configured and transmitted by the first communication node, or may be configured by the second communication node itself. The identifier Device_ID of the second communication node is configured in the second communication node. The PO offset is configured by the first communication node and transmitted to the second communication node.

In an embodiment, the discontinuous reception cycle of the second communication node in the PO determination parameter is a period within which the second communication node receives the paging information. Before step 210, the method in this embodiment may further include that the second communication node receives the discontinuous reception cycle of the second communication node configured and transmitted by the first communication node; or the second communication node configures the discontinuous reception cycle of the second communication node.

In an embodiment, the paging transmission interval of the first communication node in the PO determination parameter corresponds to the PO. An implementation manner of step 220 may be that the second communication node receives the paging information transmitted by the first communication node on all beams or ports within the paging transmission interval corresponding to the PO. That is to say, the first communication node may transmit the paging information within each paging transmission interval, and transmit the paging information on all the beams or ports within each paging transmission interval to ensure that the second communication node may effectively receive the paging information within the PO corresponding to the paging transmission interval.

In an embodiment, the paging transmission interval $T_{paging}$ of the first communication node and the PO offset $t_{offset}$ of the second communication node in the PO determination parameter have been described in detail in the above-described embodiments, which are not repeated herein.

In one possible implementation manner of this embodiment, the time domain position of the PO may be calculated according to the identifier Device_ID of the second communication node in the PO determination parameter. An implementation manner of step 210 may be that the second communication node calculates a group of paging resources within the discontinuous reception cycle as the PO of the second communication node according to the identifier Device_ID of the second communication node and calculates the starting radio frame number corresponding to the group of paging resources according to the identifier Device_ID of the second communication node.

In this implementation manner, the second communication node calculates the starting radio frame number of the PO of the second communication node according to one of the following formulas:

$$\text{SFN mod } T_{DRX} = \lfloor T_{paging} * (\text{Device\_ID mod } \lfloor T_{DRX}/T_{paging} \rfloor) \rfloor;$$

$$\text{SFN mod } T_{DRX} = \lfloor T_{paging} * (\text{Device\_ID mod}(T_{DRX}/T_{paging})) \rfloor;$$

$$\text{SFN mod } T_{DRX} = T_{paging} * (\text{Device\_ID mod } \lfloor T_{DRX}/T_{paging} \rfloor);$$

$$\text{SFN mod } T_{DRX} = T_{paging} * (\text{Device\_ID mod}(T_{DRX}/T_{paging}));$$

$$\text{SFN mod } T_{DRX} = \lfloor \lfloor T_{DRX}/N \rfloor * (\text{Device\_ID mod } N) \rfloor;$$

$$\text{SFN mod } T_{DRX} = \lfloor T_{DRX}/N \rfloor * (\text{Device\_ID mod } N);$$

$$\text{SFN mod } T_{DRX} = \lfloor (T_{DRX}/N) * (\text{Device\_ID mod } N) \rfloor;$$

$$\text{SFN mod } T_{DRX} = (T_{DRX}/N) * (\text{Device\_ID mod } N);$$

$$\text{SFN mod } T_{DRX} = \lfloor T_{paging} * (\text{Device\_ID mod } \lfloor T_{DRX}/T_{paging} \rfloor) \rfloor + t_{offset};$$

$$\text{SFN mod } T_{DRX} = \lfloor T_{paging} * (\text{Device\_ID mod}(T_{DRX}/T_{paging})) \rfloor + t_{offset};$$

$$\text{SFN mod } T_{DRX} = T_{paging} * (\text{Device\_ID mod } \lfloor T_{DRX}/T_{paging} \rfloor) + t_{offset};$$

$$\text{SFN mod } T_{DRX} = T_{paging} * (\text{Device\_ID mod}(T_{DRX}/T_{paging})) + t_{offset};$$

$$\text{SFN mod } T_{DRX} = \lfloor \lfloor T_{DRX}/N \rfloor * (\text{Device\_ID mod } N) \rfloor + t_{offset};$$

$$\text{SFN mod } T_{DRX} = \lfloor T_{DRX}/N \rfloor * (\text{Device\_ID mod } N) + t_{offset};$$

$$\text{SFN mod } T_{DRX} = \lfloor (T_{DRX}/N) * (\text{Device\_ID mod } N) \rfloor + t_{offset}; \text{ and}$$

$$\text{SFN mod } T_{DRX} = (T_{DRX}/N) * (\text{Device\_ID mod } N) + t_{offset}.$$

SFN is the starting radio frame number of the PO of the second communication node. In a practical application scenario, the second communication node selects one of the preceding formulas according to the content of the PO determination parameter to calculate the starting radio frame number of the PO. In an embodiment, as shown in the preceding formulas, the PO offset is included in some formulas. In this implementation manner, the second communication node in a cell is configured with an universal PO offset.

In another possible implementation manner of this embodiment, the time domain position of the PO may be calculated according to the PO offset in the PO determination parameter, and the second communication node in the cell is configured with a preset PO offset. The implementation manner of step 210 may include that second communication node calculates a group of paging resources within the discontinuous reception cycle as the PO of the second communication node according to the preset PO offset and calculates the starting radio frame number corresponding to the group of paging resources according to the preset PO offset.

In this implementation manner, the second communication node calculates the starting radio frame number of the PO of the second communication node according to the following formula: SFN mod $T_{DRX} = t_{offset}$. Where SFN is also the starting radio frame number of the PO of the second communication node.

In this implementation manner, each second communication node in the cell is configured with one PO offset, the one PO offset configured for each second communication node is the same or different, and different PO offsets are used for configuring each second communication node being within different POs.

In an embodiment, based on the embodiments described above, when the paging transmission interval of the first communication node is less than a length of a radio frame, after calculating the starting radio frame number of the PO of the second communication node, the method in this embodiment may further include that the second communication node calculates a starting subframe position of the starting radio frame number of the PO of the second communication node. Accordingly, in this embodiment, the implementation manner of step 220 may be that the second communication node receives the paging information transmitted by the first communication node within the PO corresponding to the starting subframe position of the starting radio frame number.

In a practical application, an implementation manner for calculating the starting subframe position of the starting radio frame number of the PO of the second communication node may include that the second communication node calculates the starting subframe position of the starting radio frame number of the PO of the second communication node according to the device_ID of the second communication node.

For example, the length of a radio frame is 2n milliseconds (ms), and the radio frame includes 2 m subframes; the paging transmission interval of the first communication node is n ms; and the starting subframe position is a subframe 0 or a subframe m and the starting subframe position may be represented by a last bit such as 0 or 1 of the identifier device_ID of the second communication node.

In an embodiment, the second communication node may also determine a manner for receiving the paging information according to information of a quasi-co-location relationship. In one implementation manner, the first communication node and the second communication node are preconfigured with the information of the quasi-co-location relationship between a signal related to the paging information and other sweeping signals or channels. That is, the preceding communication nodes predefine the information of the quasi-co-location relationship through a common protocol or a system to which the communication nodes belong. In another implementation manner, before step 220, the method may further step 211 in which the second communication node receives indication information transmitted by the first communication node, and the indication information is the information of the quasi-co-location relationship between the signal related to the paging information and the other sweeping signals or channels. Accordingly, before step 220, the method for transmitting paging information in this embodiment may further step 212 in which the second communication node determines the manner for receiving the paging information by measuring or receiving information on a signal or channel with the quasi-co-location relationship with the signal related to the paging information. The receiving manner refers to a resource and a receive beam or port for receiving the paging information. That is, the second communication node receives the signal related to the paging information on which resource of the PO (the group of paging resources) corresponding to the signal related to the paging information through which receive antenna port.

In this embodiment, the signal related to the paging information is a reference signal for demodulating the paging information such as a demodulation reference signal of the paging information; or the signal related to the paging information is a reference signal for demodulating a physical control channel related to the paging information such as a demodulation reference signal of a physical downlink control channel carrying the paging DCI. The other sweeping signals or channels include one or more of: the synchronous signal (SS), the demodulation reference signal (DMRS) of a physical broadcast channel (PBCH), a beam reference signal (BRS), the DMRS, a mobility reference signal (MRS), and a channel state information-reference signal (CSI-RS). The information of the quasi-co-location relationship includes: the information on the signal or channel with the quasi-co-location relationship with the signal related to the paging information, and a mapping relationship between a port number or/and a resource of the signal related to the paging information and port numbers or/and resources of the other sweeping signals or channels.

Figure 8:
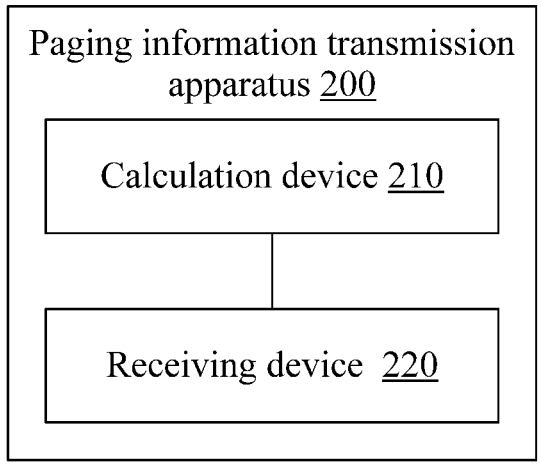
FIG. 8 is a structural diagram of another apparatus for transmitting paging information according to an embodiment of the present disclosure.

FIG. 8 is a structural diagram of another apparatus for transmitting paging information according to this embodiment. The apparatus for transmitting paging information in this embodiment is applicable to paging in a new generation of wireless communication systems. The apparatus for transmitting paging information is implemented by a combination of hardware and software and may be integrated into a processor of a second communication node for the processor's use. As shown in FIG. 8, the paging information transmission apparatus 200 in this embodiment may include a calculation device 210 and a receiving device 220.

The calculation device 110 is configured to calculate a time domain position of a paging occasion (PO) of the second communication node.

This embodiment provides a manner in which a first communication node transmits paging information to the second communication node within a coverage range of the first communication node. Within the coverage range of the first communication node, multiple cells are covered and each cell has multiple second communication nodes. The first communication node may transmit the paging information to different second communication nodes within the POs of the different second communication nodes. Therefore, before transmitting the paging information, the first communication node calculates the time domain position of the PO of one second communication node so that the first communication node knows at which specific time domain position the paging information is transmitted to the one second communication node. Entities and functions of a first type communication node and a second type communication node involved in this embodiment have been described in detail in the above-described embodiments, which are not repeated herein.

The receiving device 220 is configured to receive the paging information transmitted by the first communication node within the PO corresponding to the time domain position calculated by the calculation device 210, and the paging information includes one or more of: paging downlink control information or a paging message. The PO includes a group of paging resources for transmitting paging information on one or more preset beams or ports.

The PO may correspond to a synchronous signal burst set or to sweeping resources of a group of preset beams or ports.

In this embodiment, after the calculation device 210 in the second communication node calculates a time-frequency position of the PO of the second communication node from the first communication node, the second communication node may receive the paging information transmitted by the first communication node within the PO corresponding to the time-frequency position. In this embodiment, the paging information includes the paging downlink control information or/and the paging message. The content and functions of the paging downlink control information and the paging message, and the structures of the synchronous signal burst set and the sweeping resources of the preset beams or ports have been described in detail in the above-mentioned embodiments, which are not repeated herein.

When the paging information includes the paging downlink control information, the receiving device 220 in the second communication node may receive the paging message on a time-frequency resource indicated by the paging downlink control information and determine whether a paging notification is included for the second communication node itself. The paging information may include only the paging message. In this case, the receiving device 220 needs to completely receive the paging message to determine whether the paging notification is included for the second communication node itself. Of course, the paging information may also include a paging downlink control indication and the paging message. In this case, the receiving device 220 first receives the paging downlink control information and then receives the paging message within the same synchronous signal (SS) block or paging block according to the paging downlink control information.

The apparatus for transmitting paging information according to this embodiment is configured to execute the method for transmitting paging information according to the embodiment shown in FIG. 6 and has corresponding functional devices. The implementation principle and technical effects are similar and thus will not be repeated herein.

In an embodiment, the calculation device 210 may include a first calculation unit and a second calculation unit.

The first calculation unit is configured to calculate a starting radio frame number of the PO of the second communication node.

The second calculation unit is configured to calculate the time domain position of the PO according to the starting radio frame number calculated by the first calculation unit and a duration of the PO.

In an embodiment, before the calculation device 110 calculates the time domain position of the PO of the second communication node, the receiving device 220 is further configured to receive a PO determination parameter transmitted by the first communication node. Accordingly, the calculation device 110 may calculate the time domain position of the PO of the second communication node by calculating the time domain position of the PO of the second communication node according to the PO determination parameter. The PO determination parameter may be received by the receiving device 220 from the first communication node, and may also be configured in the second communication node. The PO determination parameter includes one or more of the following:

1. a discontinuous reception cycle $T_{DRX}$ of the second communication node;
2. a paging transmission interval $T_{paging}$ of the first communication node;
3. a number N of paging information transmissions performed by the first communication node within the discontinuous reception cycle;
4. an identifier (ID), device_ID, of the second communication node; and
5. a PO offset $t_{offset}$ of the second communication node.

For example, the discontinuous reception cycle $T_{DRX}$ may be configured and transmitted by the first communication node, or may be configured by the second communication node itself. The identifier Device_ID of the second communication node is configured in the second communication node. The PO offset is configured by the first communication node and transmitted to the second communication node.

Figure 9:
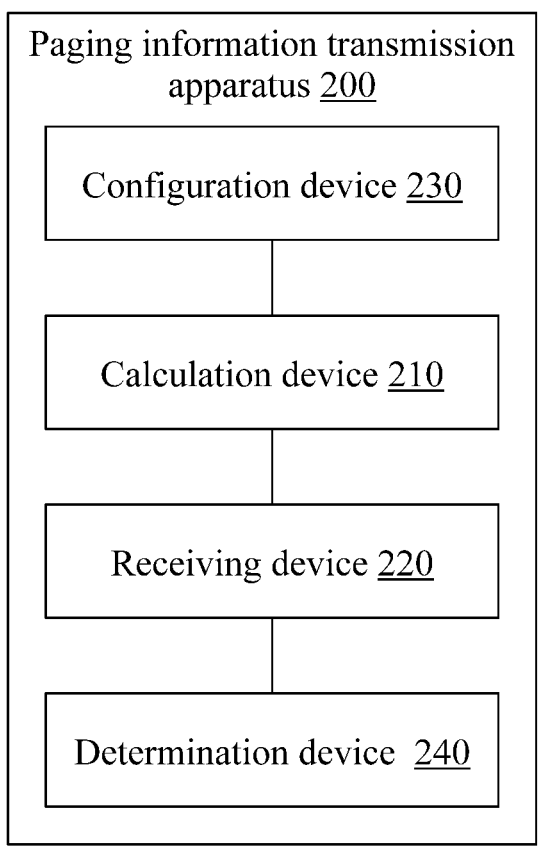
FIG. 9 is a structural diagram of another apparatus for transmitting paging information according to an embodiment of the present disclosure.

In an embodiment, the discontinuous reception cycle of the second communication node in the PO determination parameter is a period within which the second communication node receives the paging information. FIG. 9 is a structural diagram of another apparatus for transmitting paging information according to this embodiment. Based on the embodiment shown in FIG. 8, the paging information transmission apparatus 200 in this embodiment may further include a configuration device 230.

The receiving device 220 is further configured to receive the discontinuous reception cycle of the second communication node determined and transmitted by the first communication node before the calculation device 210 calculates the time domain position of the PO of the second communication node.

The configuration device 230 is configured to configure the discontinuous reception cycle of the second communication node before the calculation device 210 calculates the time domain position of the PO of the second communication node.

In an embodiment, the paging transmission interval of the first communication node in the PO determination parameter corresponds to the PO. The receiving device 220 in this embodiment may receive the paging information transmitted by the first communication node by receiving the paging information transmitted by the first communication node on all beams or ports within the paging transmission interval corresponding to the PO. That is to say, the first communication node may transmit the paging information within each paging transmission interval, and transmit the paging information on all the beams or ports within each paging transmission interval to ensure that the second communication node may effectively receive the paging information within the PO corresponding to the paging transmission interval.

In an embodiment, the paging transmission interval $T_{paging}$ of the first communication node and the PO offset $t_{offset}$ of the second communication node in the PO determination parameter have been described in detail in the above-described embodiments, which are not repeated herein.

In one possible implementation manner of this embodiment, the time domain position of the PO may be calculated according to the device_ID of the second communication node in the PO determination parameter. The calculation device 210 may calculate the time domain position of the PO of the second communication node by calculating a group of paging resources within the discontinuous reception cycle as the PO of the second communication node according to the identifier Device_ID of the second communication node and calculating the starting radio frame number corresponding to the group of paging resources according to the identifier Device_ID of the second communication node.

In this implementation manner, the calculation device 210 calculates the starting radio frame number of the PO of the second communication node according to one of the following formulas:

$$\text{SFN mod } T_{DRX} = \lfloor T_{paging} * (\text{Device\_ID mod } \lfloor T_{DRX}/T_{paging} \rfloor) \rfloor;$$

$$\text{SFN mod } T_{DRX} = \lfloor T_{paging} * (\text{Device\_ID mod}(T_{DRX}/T_{paging})) \rfloor;$$

$$\text{SFN mod } T_{DRX} = T_{paging} * (\text{Device\_ID mod } \lfloor T_{DRX}/T_{paging} \rfloor);$$

$$\text{SFN mod } T_{DRX} = T_{paging} * (\text{Device\_ID mod}(T_{DRX}/T_{paging}));$$

$$\text{SFN mod } T_{DRX} = \lfloor \lfloor T_{DRX}/N \rfloor * (\text{Device\_ID mod } N) \rfloor;$$

$$\text{SFN mod } T_{DRX} = \lfloor T_{DRX}/N \rfloor * (\text{Device\_ID mod } N);$$

$$\text{SFN mod } T_{DRX} = \lfloor (T_{DRX}/N) * (\text{Device\_ID mod } N) \rfloor;$$

$$\text{SFN mod } T_{DRX} = (T_{DRX}/N) * (\text{Device\_ID mod } N);$$

$$\text{SFN mod } T_{DRX} = \lfloor T_{paging} * (\text{Device\_ID mod } \lfloor T_{DRX}/T_{paging} \rfloor) \rfloor + t_{offset};$$

$$\text{SFN mod } T_{DRX} = \lfloor T_{paging} * (\text{Device\_ID mod}(T_{DRX}/T_{paging})) \rfloor + t_{offset};$$

$$\text{SFN mod } T_{DRX} = T_{paging} * (\text{Device\_ID mod } \lfloor T_{DRX}/T_{paging} \rfloor) + t_{offset};$$

$$\text{SFN mod } T_{DRX} = T_{paging} * (\text{Device\_ID mod}(T_{DRX}/T_{paging})) + t_{offset};$$

$$\text{SFN mod } T_{DRX} = \lfloor \lfloor T_{DRX}/N \rfloor * (\text{Device\_ID mod } N) \rfloor + t_{offset};$$

$$\text{SFN mod } T_{DRX} = \lfloor T_{DRX}/N \rfloor * (\text{Device\_ID mod } N) + t_{offset};$$

$$\text{SFN mod } T_{DRX} = \lfloor (T_{DRX}/N) * (\text{Device\_ID mod } N) \rfloor + t_{offset}; \text{ and}$$

$$\text{SFN mod } T_{DRX} = (T_{DRX}/N) * (\text{Device\_ID mod } N) + t_{offset}.$$

SFN is the starting radio frame number of the PO of the second communication node. In a practical application scenario, the calculation device 210 selects one of the preceding formulas according to the content of the PO determination parameter to calculate the starting radio frame number of the PO. In an embodiment, as shown in the preceding formulas, the PO offset is included in some formulas. In this implementation manner, the second communication node in a cell is configured with an universal PO offset.

In another possible implementation manner of this embodiment, the time domain position of the PO may be calculated according to the PO offset in the PO determination parameter, and the second communication node in the cell is configured with a preset PO offset. The calculation device 210 may calculate the time domain position of the PO of the second communication node by calculating a group of paging resources within the discontinuous reception cycle as the PO of the second communication node according to the preset PO offset and calculating the starting radio frame number corresponding to the group of paging resources according to the preset PO offset.

In this implementation manner, the calculation device 210 calculates the starting radio frame number of the PO of the second communication node according to the following formula: $\text{SFN mod } T_{DRX} = t_{offset}$. Where SFN is also the starting radio frame number of the PO of the second communication node.

In this implementation manner, each second communication node in the cell is configured with one PO offset, the one PO offset configured for each second communication node is the same or different, and different PO offsets are used for configuring each second communication node being within different POs.

In an embodiment, based on the embodiments described above, when the paging transmission interval of the first communication node is less than a length of a radio frame, the calculation device may further include a third calculation unit. The third calculation unit is configured to calculate a starting subframe position of the starting radio frame number of the PO of the second communication node after the first calculation unit calculates the starting radio frame number of the PO of the second communication node. Accordingly, in this embodiment, the receiving device 220 may receive the paging information transmitted by the first communication node by receiving the paging information transmitted by the first communication node within the PO corresponding to the starting subframe position of the starting radio frame number.

In a practical application, the third calculation unit may calculate the starting subframe position of the starting radio frame number of the PO of the second communication node by calculating the starting subframe position of the starting radio frame number of the PO of the second communication node according to the device_ID of the second communication node.

For example, the length of a radio frame is 2n milliseconds (ms), and the radio frame includes 2 m subframes; the paging transmission interval of the first communication node is n ms; and the starting subframe position is a subframe 0 or a subframe m and the starting subframe position may be represented by a last bit such as 0 or 1 of the identifier Device_ID of the second communication node.

In an embodiment, the second communication node may also determine a manner for receiving the paging information according to information of a quasi-co-location relationship. In one implementation manner, the first communication node and the second communication node are preconfigured with the information of the quasi-co-location relationship between a signal related to the paging information and other sweeping signals or channels. That is, the preceding communication nodes predefine the information of the quasi-co-location relationship through a common protocol or a system to which the communication nodes belong. In another implementation manner, the receiving device 220 is further configured to receive indication information transmitted by the first communication node before receiving the paging information transmitted by the first communication node, and the indication information is the information of the quasi-co-location relationship between the signal related to the paging information and the other sweeping signals or channels. Accordingly, the paging information transmission apparatus 200 in this embodiment may further includes a determination device 240. Before the receiving device 220 receives the paging information transmitted by the first communication node, the determination device 240 is configured to determine the manner for receiving the paging information of the second communication node by measuring or receiving information on a signal or channel with the quasi-co-location relationship with the signal related to the paging information.

In this embodiment, the signal related to the paging information is a reference signal for demodulating the paging information such as a demodulation reference signal of the paging information; or the signal related to the paging information is a reference signal for demodulating a physical control channel related to the paging information such as a demodulation reference signal of a physical downlink control channel carrying the paging DCI. The other sweeping signals or channels include one or more of: the synchronous signal (SS), the demodulation reference signal (DMRS) of a physical broadcast channel (PBCH), a beam reference signal (BRS), the DMRS, a mobility reference signal (MRS), and a channel state information-reference signal (CSI-RS). The information of the quasi-co-location relationship includes: the information on the signal or channel with the quasi-co-location relationship with the signal related to the paging information, and a mapping relationship between a port number or/and a resource of the signal related to the paging information and port numbers or/and resources of the other sweeping signals or channels.

The apparatus for transmitting paging information according to this embodiment is configured to execute the method for transmitting paging information according to the embodiment shown in FIG. 7 and has corresponding functional devices. The implementation principle and technical effects are similar and thus will not be repeated herein.

Figure 10:
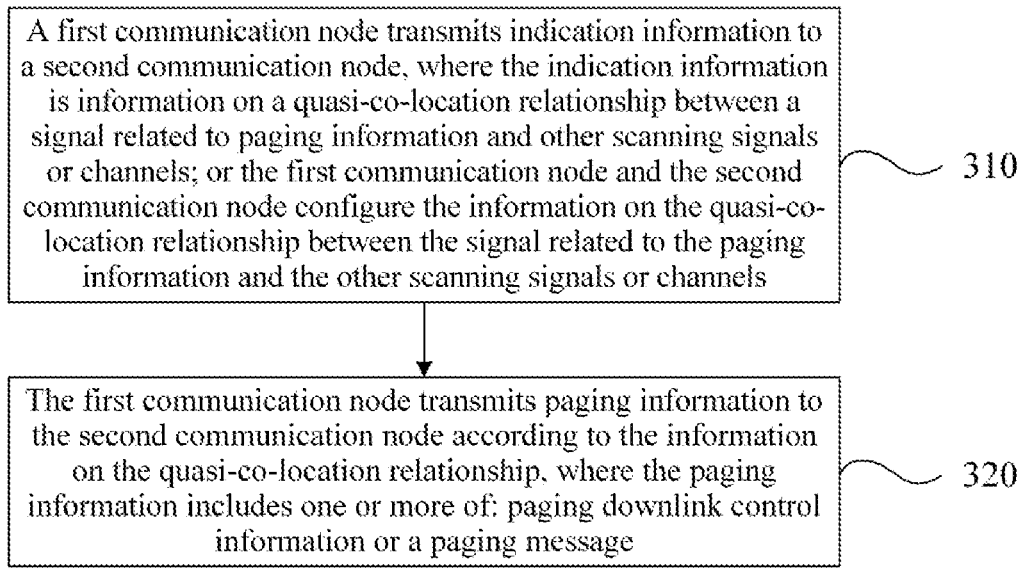
FIG. 10 is a flowchart of another method for transmitting paging information according to an embodiment of the present disclosure.

FIG. 10 is a flowchart of another method for transmitting paging information provided in this embodiment. The method for transmitting paging information in this embodiment is applicable to paging in a new generation of wireless communication systems, and may be executed by an apparatus for transmitting paging information. The apparatus for transmitting paging information is implemented by a combination of hardware and software and may be integrated into a processor of a first communication node for the processor's use. As shown in FIG. 10, the method in this embodiment may include steps described below.

In step 310, the first communication node transmits indication information to a second communication node, and the indication information is information of a quasi-co-location relationship between a signal related to paging information and other sweeping signals or channels.

Alternatively, the first communication node and the second communication node configure the information of the quasi-co-location relationship between the signal related to the paging information and the other sweeping signals or channels.

This embodiment provides a manner in which the first communication node transmits paging information to the second communication node within a coverage range of the first communication node. Within the coverage range of the first communication node, multiple cells are covered and each cell has multiple second communication nodes. The first communication node may indicate on which resources the second communication node receives the paging information by indicating the information of the quasi-co-location relationship. The first communication node may also indicate on which resources the second communication node receives the paging information by configuring the information of the quasi-co-location relationship. That is, the preceding communication nodes may predefine the information of the quasi-co-location relationship through a common protocol or a system to which the communication nodes belong. That is, the second communication node may identify at which specific time domain positions it receives the paging information transmitted by the first communication node. Entities and functions of a first type communication node and a second type communication node involved in this embodiment have been described in detail in the above-described embodiments, which are not repeated herein.

In step 320, the first communication node transmits the paging information to the second communication node according to the information of the quasi-co-location relationship, and the paging information includes one or more of: paging downlink control information and a paging message.

In this embodiment, after the first communication node transmits the information of the quasi-co-location relationship, or after the communication nodes configure the information of the quasi-co-location relationship, the first communication node may transmit the paging information to the second communication node on resources corresponding to the information of the quasi-co-location relationship. In addition, the second communication node may also determine on which resources it receives the paging information according to the known information of the quasi-co-location relationship. In this embodiment, the paging information includes the paging downlink control information or/and the paging message. The content and functions of the paging downlink control information and the paging message have been described in detail in the above-mentioned embodiments, which are not repeated herein.

In the method for transmitting paging information provided by this embodiment, the first communication node transmits the indication information carrying the information of the quasi-co-location relationship to the second communication node, or the first communication node and the second communication node configure the same information of the quasi-co-location relationship; and the first communication node transmits the paging information to the second communication node according to the information of the quasi-co-location relationship, and the paging information includes the paging downlink control information or/and the paging message.

In the technical solution provided by this embodiment, the first communication node and the second communication node can identify the information of the quasi-co-location relationship between the signal related to the paging information and the other sweeping signals or channels and the first communication node transmits the paging information based on the information of the quasi-co-location relationship to ensure that the second communication node may effectively receive the paging information, thereby solving the problem that when a DRX mechanism for receiving paging information in an LTE system is applied to the new generation of wireless communication systems, the paging information is loaded within a transmission subframe or timeslot corresponding to each beam and a UE in an IDLE state cannot foresee how beams or ports are scheduled in different timeslots so that it is complex, even impossible, to implement the DRX mechanism for paging information transmissions.

In an embodiment, the signal related to the paging information is a reference signal for demodulating the paging information such as a demodulation reference signal of the paging information; or the signal related to the paging information is a reference signal for demodulating a physical control channel related to the paging information such as a demodulation reference signal of a physical downlink control channel carrying the paging downlink control information (DCI). The other sweeping signals or channels include one or more of: a synchronous signal (SS), the demodulation reference signal (DMRS) of a physical broadcast channel (PBCH), a beam reference signal (BRS), the DMRS, a mobility reference signal (MRS), and a channel state information-reference signal (CSI-RS). The information of the quasi-co-location relationship includes: information on a signal or channel with the quasi-co-location relationship with the signal related to the paging information, and a mapping relationship between a port number or/and a resource of the signal related to the paging information and port numbers or/and resources of the other sweeping signals or channels.

Figure 11:
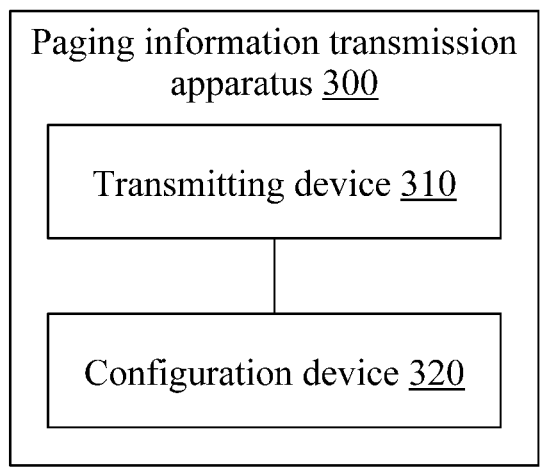
FIG. 11 is a structural diagram of another apparatus for transmitting paging information according to an embodiment of the present disclosure.

FIG. 11 is a structural diagram of another apparatus for transmitting paging information provided in this embodiment. The apparatus for transmitting paging information in this embodiment is applicable to paging in a new generation of wireless communication systems. The apparatus for transmitting paging information is implemented by a combination of hardware and software and may be integrated into a processor of a first communication node for the processor's use. As shown in FIG. 11, the paging information transmission apparatus 300 in this embodiment may include a transmitting device 310 and a configuration device 320.

The transmitting device 310 is configured to transmit indication information to a second communication node, and the indication information is information of a quasi-co-location relationship between a signal related to paging information and other sweeping signals or channels. Alternatively, the configuration device 320 is configured to configure the information of the quasi-co-location relationship between the signal related to the paging information and the other sweeping signals or channels in the first communication node.

This embodiment provides a manner in which the first communication node transmits paging information to the second communication node within a coverage range of the first communication node. Within the coverage range of the first communication node, multiple cells are covered and each cell has multiple second communication nodes. The transmitting device 310 in the first communication node may indicate on which resources the second communication node receives the paging information by indicating the information of the quasi-co-location relationship. The configuration device 320 in the first communication node may also indicate on which resources the second communication node receives the paging information by configuring the information of the quasi-co-location relationship. That is, the preceding communication nodes may predefine the information of the quasi-co-location relationship through a common protocol or a system to which the communication nodes belong. That is, the second communication node may identify at which specific time domain positions it receives the paging information transmitted by the first communication node. Entities and functions of a first type communication node and a second type communication node involved in this embodiment have been described in detail in the above-described embodiments, which are not repeated herein.

The transmitting device 310 is further configured to transmit the paging information to the second communication node according to the information of the quasi-co-location relationship, and the paging information includes one or more of: paging downlink control information or a paging message.

In this embodiment, after the transmitting device 310 transmits the information of the quasi-co-location relationship, or after the configuration device 320 configures the information of the quasi-co-location relationship, the paging information may be transmitted to the second communication node on resources corresponding to the information of the quasi-co-location relationship. In addition, the second communication node may also determine on which resources it receives the paging information according to the known information of the quasi-co-location relationship. In this embodiment, the paging information includes the paging downlink control information or/and the paging message. The content and functions of the paging downlink control information and the paging message have been described in detail in the above-mentioned embodiments, which are not repeated herein.

The apparatus for transmitting paging information provided by this embodiment is configured to execute the method for transmitting paging information according to the embodiment shown in FIG. 10 and has corresponding functional devices. The implementation principle and technical effects are similar and thus will not be repeated herein.

In an embodiment, the signal related to the paging information is a reference signal for demodulating the paging information such as a demodulation reference signal of the paging information; or the signal related to the paging information is a reference signal for demodulating a physical control channel related to the paging information such as a demodulation reference signal of a physical downlink control channel carrying the paging downlink control information (DCI). The other sweeping signals or channels include one or more of: a synchronous signal (SS), the demodulation reference signal (DMRS) of a physical broadcast channel (PBCH), a beam reference signal (BRS), the DMRS, a mobility reference signal (MRS), and a channel state information-reference signal (CSI-RS). The information of the quasi-co-location relationship includes: information on a signal or channel with the quasi-co-location relationship with the signal related to the paging information, and a mapping relationship between a port number or/and a resource of the signal related to the paging information and port numbers or/and resources of the other sweeping signals or channels.

Figure 12:
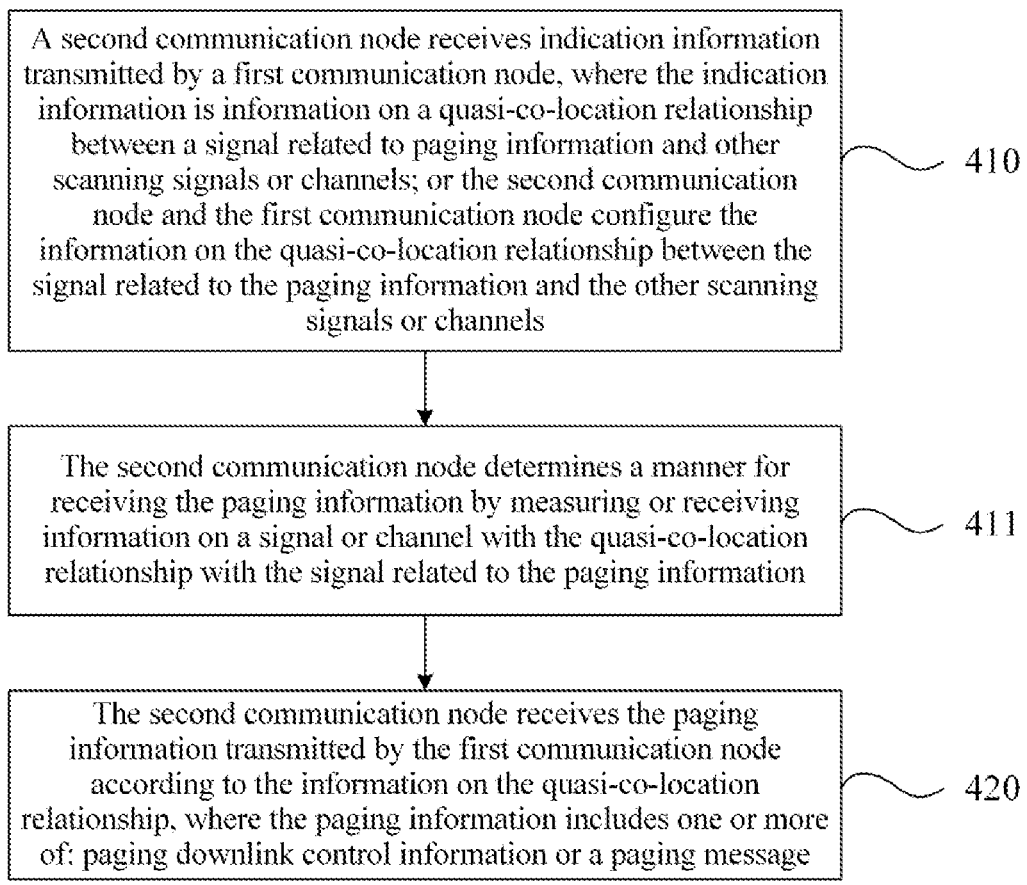
FIG. 12 is a flowchart of another method for transmitting paging information according to an embodiment of the present disclosure.

FIG. 12 is a flowchart of another method for transmitting paging information provided in this embodiment. The method for transmitting paging information in this embodiment is applicable to paging in a new generation of wireless communication systems, and may be executed by an apparatus for transmitting paging information. The apparatus for transmitting paging information is implemented by a combination of hardware and software and may be integrated into a processor of a second communication node for the processor's use. As shown in FIG. 12, the method in this embodiment may include steps described below.

In step 410, the second communication node receives indication information transmitted by a first communication node, and the indication information is information of a quasi-co-location relationship between a signal related to paging information and other sweeping signals or channels. Alternatively, the second communication node and the first communication node configure the information of the quasi-co-location relationship between the signal related to the paging information and the other sweeping signals or channels.

This embodiment provides a manner in which the first communication node transmits paging information to the second communication node within a coverage range of the first communication node. Within the coverage range of the first communication node, multiple cells are covered and each cell has multiple second communication nodes. The second communication node may determine on which resources it receives the paging information by receiving the information of the quasi-co-location relationship transmitted by the first communication node. The second communication node may also determine on which resources it receives the paging information by configuring the information of the quasi-co-location relationship. That is, the preceding communication nodes may predefine the information of the quasi-co-location relationship through a common protocol or a system to which the communication nodes belong. That is, the second communication node may identify at which specific time domain positions it receives the paging information transmitted by the first communication node. Entities and functions of a first type communication node and a second type communication node involved in this embodiment have been described in detail in the above-described embodiments, which are not repeated herein.

In step 420, the second communication node receives the paging information transmitted by the first communication node according to the information of the quasi-co-location relationship, and the paging information includes one or more of: paging downlink control information and a paging message.

In this embodiment, after the second communication node receives the information of the quasi-co-location relationship, or after the communication nodes configure the information of the quasi-co-location relationship, the second communication node may receive the paging information transmitted by the first communication node on resources corresponding to the information of the quasi-co-location relationship. In addition, the first communication node may also determine on which resources it transmits the paging information according to the known information of the quasi-co-location relationship. In this embodiment, the paging information includes the paging downlink control information or/and the paging message. The content and functions of the paging downlink control information and the paging message have been described in detail in the above-mentioned embodiments, which are not repeated herein.

In the method for transmitting paging information provided by this embodiment, the second communication node receives the indication information carrying the information of the quasi-co-location relationship and transmitted by the first communication node, or the first communication node and the second communication node configure the same information of the quasi-co-location relationship; and the second communication node receives the paging information transmitted by the first communication node according to the information of the quasi-co-location relationship, and the paging information includes the paging downlink control information or/and the paging message.

In the technical solution provided by this embodiment, the first communication node and the second communication node can identify the information of the quasi-co-location relationship between the signal related to the paging information and the other sweeping signals or channels and the first communication node transmits the paging information based on the information of the quasi-co-location relationship to ensure that the second communication node may effectively receive the paging information, thereby solving the problem that when a DRX mechanism for receiving paging information in an LTE system is applied to the new generation of wireless communication systems, the paging information is loaded within a transmission subframe or timeslot corresponding to each beam and a UE in an IDLE state cannot foresee how beams or ports are scheduled in different timeslots so that it is complex, even impossible, to implement the DRX mechanism for paging information transmissions.

In an embodiment, the signal related to the paging information is a reference signal for demodulating the paging information such as a demodulation reference signal of the paging information; or the signal related to the paging information is a reference signal for demodulating a physical control channel related to the paging information such as a demodulation reference signal of a physical downlink control channel carrying the paging downlink control information (DCI). The other sweeping signals or channels include one or more of: a synchronous signal (SS), the demodulation reference signal (DMRS) of a physical broadcast channel (PBCH), a beam reference signal (BRS), the DMRS, a mobility reference signal (MRS), and a channel state information-reference signal (CSI-RS). The information of the quasi-co-location relationship includes: information on a signal or channel with the quasi-co-location relationship with the signal related to the paging information, and a mapping relationship between a port number or/and a resource of the signal related to the paging information and port numbers or/and resources of the other sweeping signals or channels.

In an embodiment, before step 420, the method may further include step 411.

In step 411, the second communication node determines a manner for receiving the paging information by measuring or receiving the information on the signal or channel with the quasi-co-location relationship with the signal related to the paging information.

Figure 13:
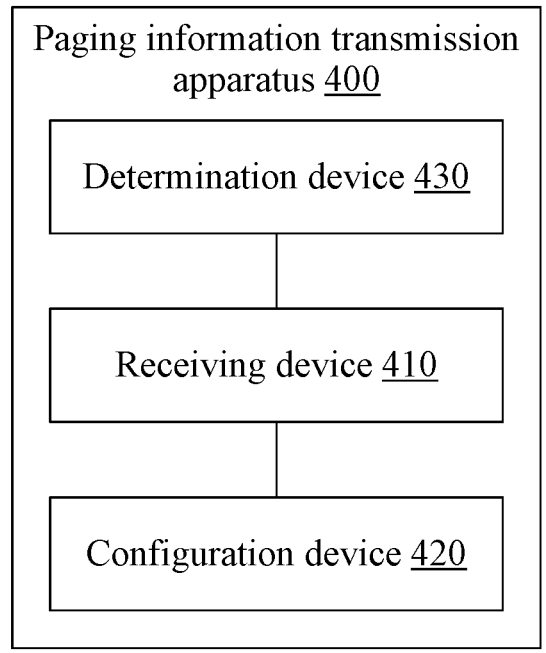
FIG. 13 is a structural diagram of another apparatus for transmitting paging information according to an embodiment of the present disclosure.

FIG. 13 is a structural diagram of another apparatus for transmitting paging information provided in this embodiment. The apparatus for transmitting paging information in this embodiment is applicable to paging in a new generation of wireless communication systems. The apparatus for transmitting paging information is implemented by a combination of hardware and software and may be integrated into a processor of a second communication node for the processor's use. As shown in FIG. 13, the paging information transmission apparatus 400 in this embodiment may include a receiving device 410 and a configuration device 420.

The receiving device 410 is configured to receive indication information transmitted by a first communication node, and the indication information is information of a quasi-co-location relationship between a signal related to paging information and other sweeping signals or channels. Alternatively, the configuration device 420 is configured to configure the information of the quasi-co-location relationship between the signal related to the paging information and the other sweeping signals or channels in the second communication node.

This embodiment provides a manner in which the first communication node transmits paging information to the second communication node within a coverage range of the first communication node. Within the coverage range of the first communication node, multiple cells are covered and each cell has multiple second communication nodes. The receiving device 410 in the second communication node may determine on which resources it receives the paging information by receiving the information of the quasi-co-location relationship. The configuration device 420 may also determine on which resources the second communication node receives the paging information by configuring the information of the quasi-co-location relationship. That is, the preceding communication nodes may predefine the information of the quasi-co-location relationship through a common protocol or a system to which the communication nodes belong. That is, the second communication node may identify at which specific time domain positions it receives the paging information transmitted by the first communication node. Entities and functions of a first type communication node and a second type communication node involved in this embodiment have been described in detail in the above-described embodiments, which are not repeated herein.

The receiving device 410 is further configured to receive the paging information transmitted by the first communication node according to the information of the quasi-co-location relationship, and the paging information includes one or more of: paging downlink control information or a paging message.

In this embodiment, after the receiving device 410 receives the information of the quasi-co-location relationship, or after the configuration device 420 configures the information of the quasi-co-location relationship, the paging information transmitted by the first communication node may be received on resources corresponding to the information of the quasi-co-location relationship.

In addition, the first communication node may also determine on which resources it transmits the paging information according to the known information of the quasi-co-location relationship. In this embodiment, the paging information includes the paging downlink control information or/and the paging message. The content and functions of the paging downlink control information and the paging message have been described in detail in the above-mentioned embodiments, which are not repeated herein.

The apparatus for transmitting paging information according to this embodiment is configured to execute the method for transmitting paging information according to the embodiment shown in FIG. 12 and has corresponding functional devices. The implementation principle and technical effects are similar and thus will not be repeated herein.

In an embodiment, the signal related to the paging information is a reference signal for demodulating the paging information such as a demodulation reference signal of the paging information; or the signal related to the paging information is a reference signal for demodulating a physical control channel related to the paging information such as a demodulation reference signal of a physical downlink control channel carrying the paging downlink control information (DCI). The other sweeping signals or channels include one or more of: a synchronous signal (SS), the demodulation reference signal (DMRS) of a physical broadcast channel (PBCH), a beam reference signal (BRS), the DMRS, a mobility reference signal (MRS), and a channel state information-reference signal (CSI-RS). The information of the quasi-co-location relationship includes: information on a signal or channel with the quasi-co-location relationship with the signal related to the paging information, and a mapping relationship between a port number or/and a resource of the signal related to the paging information and port numbers or/and resources of the other sweeping signals or channels.

In an embodiment, the paging information transmission apparatus 400 may further include a determination device 430.

Before the receiving device 410 receives the paging information transmitted by the first communication node, the determination device 430 is configured to determine a manner for receiving the paging information of the second communication node by measuring or receiving the information on the signal or channel with the quasi-co-location relationship with the signal related to the paging information.

Figure 14:
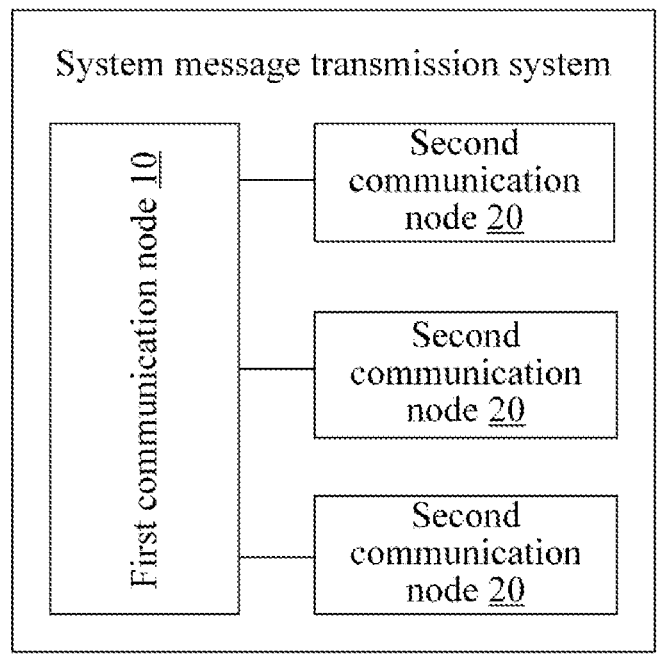
FIG. 14 is a structural diagram of a system for transmitting paging information according to an embodiment of the present disclosure.

FIG. 14 is a structural diagram of a system for transmitting paging information according to this embodiment. The system for transmitting paging information includes: a first communication node 10 and at least one second communication node 20.

In an embodiment, the first communication node 10 is provided with the paging information transmission apparatus 100 according to any one of the embodiments shown in FIG. 4 and FIG. 5, and each of the at least one second communication node 20 is provided with the paging information transmission apparatus 200 according to any one of the embodiments shown in FIG. 8 and FIG. 9. The embodiment shown in FIG. 14 is illustrated by taking the system for transmitting paging information including three second communication nodes 20 as an example. Each network element in the system for transmitting paging information performs paging information transmissions in the same manner as a manner in which a corresponding network element in the embodiments shown in FIG. 4, FIG. 5, FIG. 8, and FIG. 9 performs paging information transmissions, and similarly, the each network element is configured to execute the method for transmitting paging information according to any one of the embodiments shown in FIGS. 1 to 3, FIG. 6, and FIG. 7, and has corresponding entity apparatuses. The implementation principle and technical effects are similar and thus will not be repeated herein.

In an embodiment, the first communication node 10 is provided with the paging information transmission apparatus 300 according to the embodiment shown in FIG. 11, and each of the at least one second communication node 20 is provided with the paging information transmission apparatus 400 according to the embodiment shown in FIG. 13. The embodiment shown in FIG. 14 is illustrated by taking the system for transmitting paging information including three second communication nodes 20 as an example. Each network element in the system for transmitting paging information performs paging information transmissions in the same manner as a manner in which a corresponding network element in the embodiments shown in FIG. 11 and FIG. 13 performs paging information transmissions, and similarly, the each network element is configured to execute the method for transmitting paging information according to any one of the embodiments shown in FIG. 10 and FIG. 12, and has corresponding entity apparatuses. The implementation principle and technical effects are similar and thus will not be repeated herein.

Since this embodiment involves much content of the PO determination parameter, the PO determination parameter that has not been described in detail in the above-mentioned embodiments will be described below.

Figure 15:
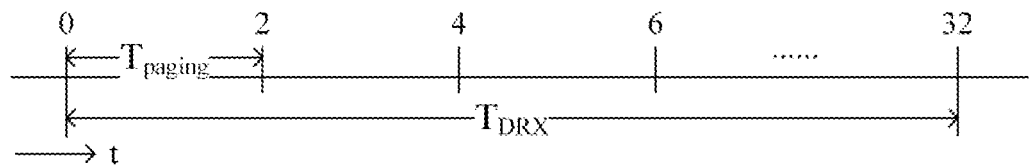
FIG. 15 is a schematic diagram of $T_{DRX}$ in a method for transmitting paging information according to an embodiment of the present disclosure.

1. A discontinuous reception cycle $T_{DRX}$ of a second communication node. FIG. 15 is a schematic diagram of $T_{DRX}$ in a method for transmitting paging information according to this embodiment. $T_{DRX}$ is the discontinuous reception cycle of the second communication node, and also a time interval during which the second communication node monitors paging information. The discontinuous reception cycle may be a value configured by a network side (for example, delivered to the second communication node through a system broadcast message or other RRC signaling), or may be set by the second communication node as required. In condition that the discontinuous reception cycle is set by the second communication node, a value of the period is fed back to a first communication node on the network side and is taken as an input parameter for both the first communication node and the second communication node to calculate a PO. As shown in FIG. 15, the period $T_{DRX}$ is set to 32, that is, 32 radio frames and has a length of 320 ms, and a starting radio frame number SFN of the PO is SFN mod $T_{DRX}$=0. The second communication node wakes up and monitors paging information belonging to the second communication node every 320 ms.

2. A paging transmission interval $T_{paging}$ of the first communication node is a time interval during which the first communication node transmits the paging information. As shown in FIG. 15, $T_{paging}$=2, that is, 20 ms. That is, the first communication node transmits the paging information once every 20 ms. Each paging information transmission refers to repeatedly transmitting the paging information on a group of paging resources. The group of paging resources corresponds to all ports and achieves full coverage of the paging information. The group of paging resources may correspond to resources of an SS burst set in FIG. 2, that is, each SS block may be multiplexed for transmitting both the paging information and an SS, or a group of sweeping resources preset for transmitting the paging information.

3. A identifier Device_ID of the second communication node is an identifier of a second type communication node. Here, a UE identifier (UE_ID) is taken as an example for description. The UE_ID may be all or part of fields of an international mobile subscriber identity (IMSI) for uniquely identifying a UE within an entire network or area. The Device_ID of the second communication node may be other identifiers.

4. Quasi-co-location (QCL) is similar to quasi co-location in the LTE. When two channels or signals have a QCL relationship, large-scale information related to one channel or signal may be derived from large-scale information related to the other channel or signal.

When information of a quasi-co-location relationship is applied to this embodiment, a first type communication node transmits an indication including the information of the quasi-co-location relationship to the second type communication node. For example, the indication includes the information of the quasi-co-location relationship between a signal related to the paging information and other sweeping signals or channels. Alternatively, a system predefines the information of the quasi-co-location relationship between the signal related to the paging information and the other sweeping signals or channels. The information of the quasi-co-location relationship includes: information on a signal or channel with the quasi-co-location relationship with the signal related to the paging information, and a mapping relationship between a port number or/and a resource of the signal related to the paging information and port numbers or/and resources of the other sweeping signals or channels. Therefore, before receiving the signal related to the paging information, the second communication node may determine a manner for receiving the signal related to the paging information by measuring or receiving the signal or channel with the quasi-co-location relationship with the signal related to the paging information. The receiving manner refers to a resource and a receive beam or port for receiving the paging information. That is, the second type communication node receives the signal related to the paging information on which resource of the PO (the group of paging resources) corresponding to the signal related to the paging information through which receive antenna port.

The preceding information of the quasi-co-location relationship may be transmitted by the first type communication node to all the second type communication nodes through a broadcast message or via dedicated radio resource control (RRC) signaling between the first type communication node and the second type communication node. The other sweeping signals or channels include one or more of: a synchronous signal (SS), a demodulation reference signal (DMRS) of a physical broadcast channel (PBCH), a beam reference signal (BRS), the DMRS, a mobility reference signal (MRS), and a channel state information-reference signal (CSI-RS).

In this embodiment, the SS is carried by sweeping resources in the SS burst set shown in FIG. 2 and the SS is transmitted on a specific port/port group within each SS block. The quasi-co-location relationship between the SS and the signal related to the paging information may be defined so that channel information for receiving the SS within one SS block may be used for receiving the paging information on a paging resource corresponding to the one SS block. The SS burst set further includes a potential PBCH. Accordingly, the DMRS of the PBCH may also be used for defining the quasi-co-location relationship with a paging-related signal. Similarly, the BRS is reference signals corresponding to different beams/ports; the MRS is a reference signal corresponding to mobility measurement of the second communication node, and used for determining whether a beam/TRP/cell is reselected or switched; and the CSI-RS is used by a terminal to measure channel states in different ports/beam directions. These signals or channels may also be configured to have the quasi-co-location relationships with the signal related to the paging information.

Practical applications of the method for transmitting paging information in the above-mentioned embodiments will be described below through some implementation examples.

Implementation Example 1

Figure 16:
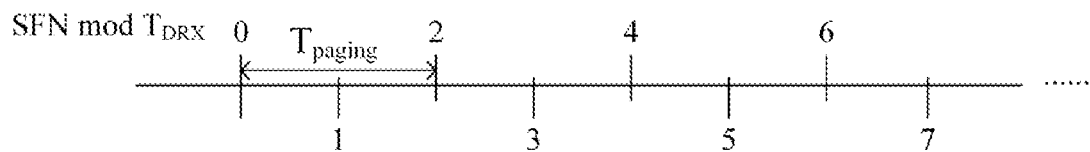
FIG. 16 is a schematic diagram of a relationship between $T_{DRX}$ and $T_{paging}$ according to implementation example 1.

This implementation example describes a method for calculating a PO according to a terminal identifier which has not introduced a PO offset $t_{offset}$ to adjust the PO. The method involves a parameter $T_{DRX}$=32, that is, 32 radio frames, and $T_{DRX}$ has a length of 320 ms. FIG. 16 is a schematic diagram of a relationship between $T_{DRX}$ and $T_{paging}$ according to implementation example 1. In FIG. 16, $T_{paging}$=2, that is, $T_{paging}$ is greater than a length of a radio frame of 10 ms, and $T_{DRX}$ and $T_{paging}$ is a multiple of the other (that is, $T_{DRX}$ is an integer multiple of $T_{paging}$). According to different values of $T_{SS}$ and a position of a starting radio frame of an SS burst set, a detailed description of the method is made in conjunction with sub-implementation examples below.

Sub-Implementation Example 1-1

Figure 17:
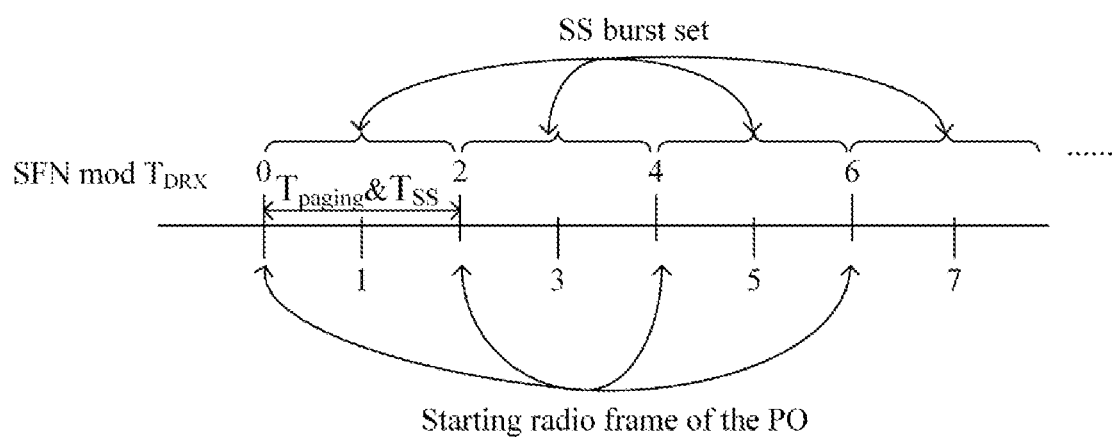
FIG. 17 is a schematic diagram of a relationship between $T_{paging}$ and $T_{SS}$ according to sub-implementation example 1-1.

FIG. 17 is a schematic diagram of a relationship between $T_{paging}$ and $T_{SS}$ according to sub-implementation example 1-1. In sub-implementation example 1-1, $T_{SS}=T_{paging}=2$, that is, a length of two radio frames; and a starting radio frame number of the SS burst set satisfies SFN mod 2=0. In this case, the SS burst set completely overlaps the PO in terms of a period and a time domain starting point, and the SS burst set may be completely multiplexed for paging information transmissions.

When a base station determines to transmit paging information to a terminal whose UE_ID is 0000001101, the base station first calculates a starting radio frame number of the PO of the terminal. The starting radio frame number is determined according to the following formula:

$$SFN \mod T_{DRX}=T_{paging}*(UE\_ID \mod(T_{DRX}/T_{paging})).$$

Parameter values are taken into the formula to obtain:

$$SFN \mod 32=2*(13 \mod(32/2))=26.$$

The starting radio frame number of the PO of the terminal satisfies SFN mod 32=26.

Figure 18:
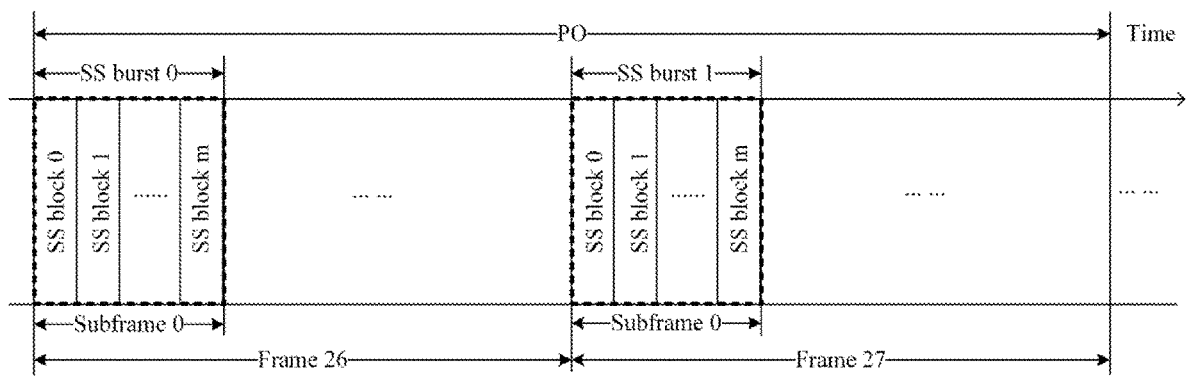
FIG. 18 is a schematic diagram illustrating a structure of a PO of a terminal in sub-implementation example 1-1 shown in FIG. 17.

The base station takes a radio frame satisfying the preceding formula as a starting point and transmits the paging information to the terminal within the SS burst set corresponding to the radio frame. For example, a resource for transmitting the paging information is related to a sweeping resource of the SS burst set. FIG. 18 is a schematic diagram illustrating a structure of a PO of a terminal in sub-implementation example 1-1 shown in FIG. 17. The PO of the terminal includes two SS bursts which respectively occupy a first subframe, a subframe 0, of radio frames 26 and 27. Each SS burst includes m SS blocks and the base station transmits the same paging information to the terminal on a specific port or beam within each SS block. Each SS block may be multiplexed by the paging information with a synchronous signal and other signals in manners such as TDM and FDM, which are not stipulated herein.

Accordingly, the terminal calculates its own PO according to the same formula, and monitors whether the paging information belonging to the terminal exists within each PO. A determining parameter for calculating the PO is configured in advance by the base station. Accordingly, the radio frame which has the starting radio frame number mod 32=26 of the PO is obtained. According to the sweeping resource of the SS burst set, the terminal can identify that the terminal monitors the paging information on the subframes 0 of the frames 26 and 27. When the terminal does not know which downlink transmit port corresponds to the terminal itself, the terminal attempts to receive the paging information within each SS block, and if the terminal does not know a preferred downlink receive port, the terminal also attempts to receive the paging information on different receive ports. That is, the terminal attempts to receive all the SS blocks in the whole PO with one receive port, and switches the receive port with the next PO. In this manner, the terminal may determine whether the paging information belonging to the terminal exists by monitoring the paging information within multiple POs.

To reduce overheads and a delay for receiving the paging information, the base station configures a QCL relationship between the paging information and a synchronous signal for the terminal, that is, the paging information and the synchronous signal are quasi-co-located. Moreover, provided is a mapping relationship between a paging resource and a transmission resource of the synchronous signal. For example, the transmission resource of the synchronous signal is represented by an index of the SS block. Accordingly, the paging resource is represented by an index of a paging block (the SS block may be reused as the paging block).

Before the PO arrives, the terminal wakes up in advance from a sleep state, and measures or receives a sweeping signal/channel having the QCL relationship with the paging information transmitted by the base station. Taking the synchronous signal as an example, the terminal sequentially receives the synchronous signal transmitted by the base station through different transmit antenna ports by using different receive antenna ports, and the terminal obtains multiple groups of measurement results, each of which corresponds to one receive antenna port of the terminal and one transmit antenna port of the base station. The receive antenna port of the terminal corresponding to a group pf measure results with the strongest signal strength among the multiple groups of measurement results is taken as an antenna port for subsequently receiving a paging message.

When the PO arrives, the terminal may receive the paging information transmitted by the base station with the predetermined specific receive antenna port. In this sub-implementation example, the terminal learns by trainings that the preferred downlink receive antenna port is a receive antenna port 4. When the PO arrives, the terminal will receive the paging message only with the receive antenna port 4, and no longer switch the receive antenna port within different POs.

In a training process of the downlink receive antenna port of the terminal, a preferred downlink transmit antenna port/a preferred transmit beam direction on the base station side may be simultaneously identified, that is, a transmit antenna port on the base station side corresponding to a group of measurement results with the strongest signal strength among the multiple of measurement results. When a system predefines a position of a time and frequency domain resource of the transmit antenna port (such as an SS block with index 3) and a mapping relationship between the time and frequency domain resource and the paging resource corresponding to the transmit antenna port (i.e., one paging resource within the PO such as a paging block (which is the SS block when a resource is multiplexed by the paging information and the SS) with index 3), the terminal may reduce paging reception times when the PO arrives, that is, the terminal only receives the paging information within the SS block corresponding to the preferred downlink transmit antenna port.

In this sub-implementation example, the preferred downlink transmit antenna port (the corresponding paging resource is an SS block 3) of the base station with respect to the terminal is obtained by the trainings, and the preferred downlink receive antenna port of the terminal is the port 4. When the PO arrives, the terminal will only receive the paging information within the SS block 3 by using the receive antenna port 4.

The signal or channel having the QCL relationship with the paging information may also be one of: a demodulation reference signal (DMRS) of a physical broadcast channel (PBCH), a beam reference signal (BRS), a mobility reference signal (MRS), and a channel state information-reference signal (CSI-RS). A manner in which the terminal determines the paging resource within the PO by using indication information of the quasi-co-location relationship is the same as the manner in this implementation example.

Sub-Implementation Example 1-2

Figure 19:
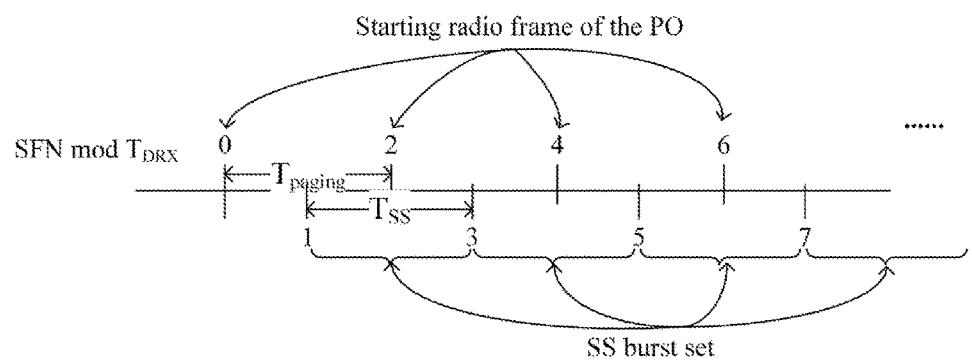
FIG. 19 is a schematic diagram of a relationship between $T_{paging}$ and $T_{SS}$ according to sub-implementation example 1-2.

FIG. 19 is a schematic diagram of a relationship between $T_{paging}$ and $T_{SS}$ according to sub-implementation example 1-2. In sub-implementation example 1-2, $T_{SS}=T_{paging}=2$, that is, a length of two radio frames; and a starting radio frame number of the SS burst set satisfies SFN mod 2=1. In this case, the SS burst set completely overlaps the PO in terms of a period and a time domain starting point, and the SS burst set will not be multiplexed for paging information transmissions.

As described in sub-implementation example 1-1, when a base station determines to transmit paging information to a terminal whose UE_ID is 0000001101, the base station first calculates a starting radio frame number of the PO of the terminal. The starting radio frame number is determined according to the following formula:

$$\text{SFN mod } T_{DRX}=T_{paging}*(\text{UE\_ID mod}(T_{DRX}/T_{paging})).$$

Parameter values are taken into the formula to obtain:

$$\text{SFN mod } 32=2*(13 \text{ mod}(32/2))=26.$$

The starting radio frame number of the PO of the terminal satisfies SFN mod 32=26.

A difference from sub-implementation example 1-1 is that a starting radio frame of the PO is different from a starting radio frame of the SS burst set. Therefore, the SS burst set is not multiplexed by the paging information with a synchronous signal, but a sweeping resource such as a paging burst set is independently formed. Other technical features of sub-implementation example 1-2 are the same as those of sub-implementation example 1-1, which are not repeated herein.

Sub-Implementation Example 1-3

Figure 20:
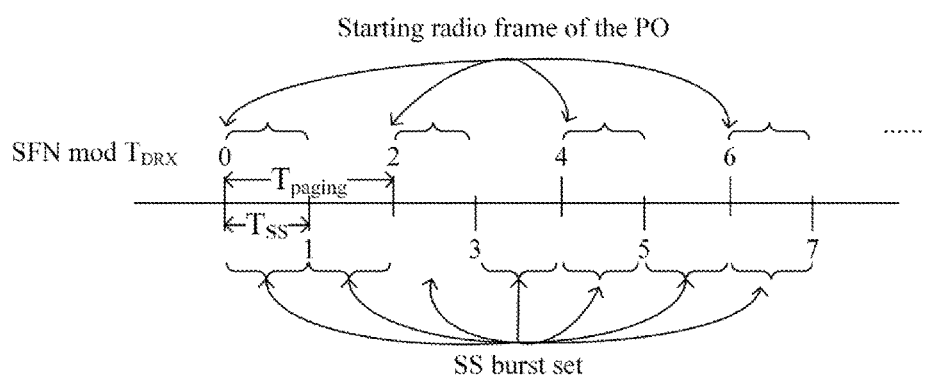
FIG. 20 is a schematic diagram of a relationship between $T_{paging}$ and $T_{SS}$ according to sub-implementation example 1-3.

FIG. 20 is a schematic diagram of a relationship between $T_{paging}$ and $T_{SS}$ according to sub-implementation example 1-3. In sub-implementation example 1-3, $T_{paging}=2*T_{SS}=2$, that is, $T_{SS}=1$. Since a period of the SS burst set is a length of a radio frame, each radio frame is a starting radio frame of the SS burst set. However, a starting radio frame of the PO is a subset of starting radio frames of the SS burst set. In this case, some SS burst sets may be multiplexed for paging information transmissions. That is to say, some SS burst sets are not multiplexed for transmitting paging information, and other SS burst sets are multiplexed for transmitting the paging information.

As described in sub-implementation example 1-1, when a base station determines to transmit the paging information to a terminal whose UE_ID is 0000001101, the base station first calculates a starting radio frame number of the PO of the terminal. The starting radio frame number is determined according to the following formula:

$$\text{SFN mod } T_{DRX}=T_{paging}*(\text{UE\_ID mod}(T_{DRX}/T_{paging})).$$

Parameter values are taken into the formula to obtain:

$$\text{SFN mod } 32=2*(13 \text{ mod}(32/2))=26.$$

The starting radio frame number of the PO of the terminal satisfies SFN mod 32=26.

Figure 21:
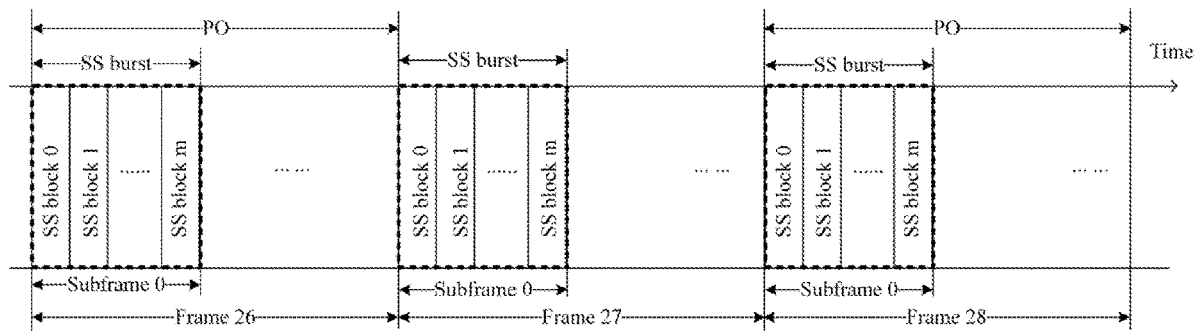
FIG. 21 is a schematic diagram illustrating a structure of a PO of a terminal in sub-implementation example 1-3 shown in FIG. 20.

A difference from sub-implementation example 1-1 is that the starting radio frame, a frame 26, of the PO corresponds to a different sweeping resource of the SS burst set. FIG. 21 is a schematic diagram illustrating a structure of a PO of a terminal in sub-implementation example 1-3 shown in FIG. 20. The SS burst set in FIG. 21 refers to a time domain length of one radio frame, and includes one SS burst mapped onto a subframe 0. After calculating the starting radio frame number of the PO, the terminal will monitor the paging information within the subframe 0 of the frame 26.

Sub-Implementation Example 1-4

Figure 22:
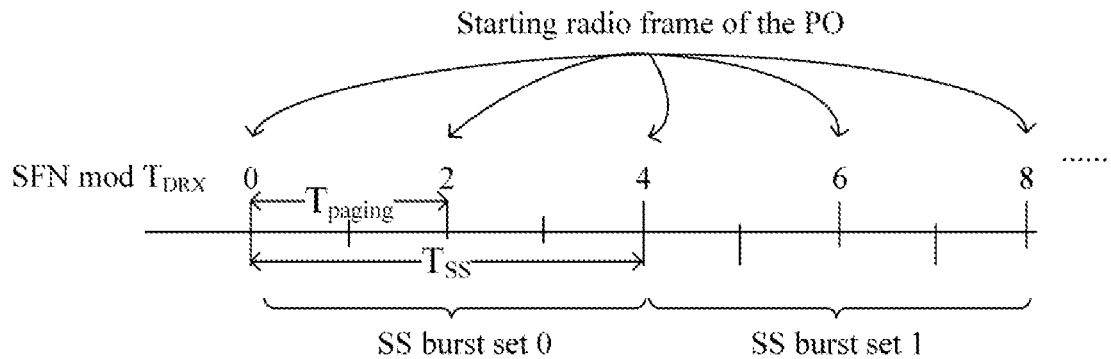
FIG. 22 is a schematic diagram of a relationship between $T_{paging}$ and $T_{SS}$ according to sub-implementation example 1-4.

FIG. 22 is a schematic diagram of a relationship between $T_{paging}$ and $T_{SS}$ according to sub-implementation example 1-4. In sub-implementation example 1-4, $T_{paging}=0.5*T_{SS}=2$, that is, $T_{SS}=4$. That is, a period of the SS burst set is a length of 4 radio frames, and a starting radio frame number of the SS burst set satisfies SFN mod 4=1. In this case, the SS burst set may be multiplexed for part of paging information transmissions. That is to say, all the SS burst sets are multiplexed for transmitting the paging information. In addition, additional sweeping resources are needed for the other part of paging information transmissions.

As described in sub-implementation example 1-1, when a base station determines to transmit the paging information to a UE1 whose UE_ID is 0000001101, the base station first calculates a starting radio frame number of the PO of the UE1. The starting radio frame number is determined according to the following formula:

$$\text{SFN mod } T_{DRX}=T_{paging}*(\text{UE\_ID mod}(T_{DRX}/T_{paging})).$$

Parameter values are taken into the formula to obtain:

$$\text{SFN mod } 32=2*(13 \text{ mod}(32/2))=26.$$

The starting radio frame number of the PO of the UE1 satisfies SFN mod 32=26.

In this case, a starting radio frame of the PO of the UE1 is a frame 26 which does not overlap a starting radio frame of the SS burst set. Therefore, a group of sweeping resources is added to the PO.

In addition, when the base station determines to transmit the paging information to a UE2 whose UE_ID is 0000001110, the base station calculates the starting radio frame number of the PO of the UE2. The starting radio frame number is determined according to the following formula:

$$\text{SFN mod } T_{DRX}=T_{paging}*(\text{UE\_ID mod}(T_{DRX}/T_{paging})).$$

Parameter values are taken into the formula to obtain:

$$\text{SFN mod } 32=2*(14 \text{ mod}(32/2))=28.$$

The starting radio frame number of the PO of the UE2 satisfies SFN mod 32=28.

Figure 23:
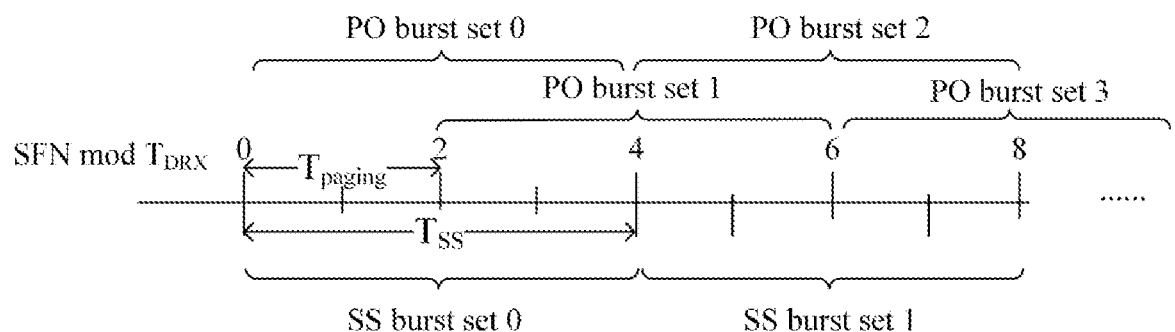
FIG. 23 is a schematic diagram illustrating a structure of a PO of a terminal in sub-implementation example 1-4 shown in FIG. 22.

In this case, a starting radio frame of the PO of the UE2 is a frame 28 which overlaps the starting radio frame of the SS burst set. Therefore, a resource of the SS burst set may be multiplexed within the PO of the UE2. A duration of the PO is the same as the period of the SS burst set, that is, 4 radio frames. FIG. 23 is a schematic diagram illustrating a structure of a PO of a terminal in sub-implementation example 1-4 shown in FIG. 22. Although $T_{paging}=2$, the duration of the PO is 40 ms, some PO burst sets (such as a PO burst set 0 and a PO burst set 2 whose starting radio frames are the same as the starting radio frames of the SS burst sets) exactly match time domain resources of the SS burst sets. The resource of the SS burst set may be multiplexed within those POs. Other PO burst sets (such as a PO burst set 1 and a PO burst set 3) do not match the time domain resources of the SS burst sets. The resource of the SS burst set cannot be multiplexed within those POs. In addition, in such a configuration, the durations of two adjacent PO burst sets overlap in time domain.

Although the durations of two adjacent PO burst sets overlap in time domain, different PO burst sets occupy different time domain resources, for example, both the PO burst set 0 and the PO burst set 1 occupy radio frames 2 and 3, but may occupy different subframe resources.

Figure 24:
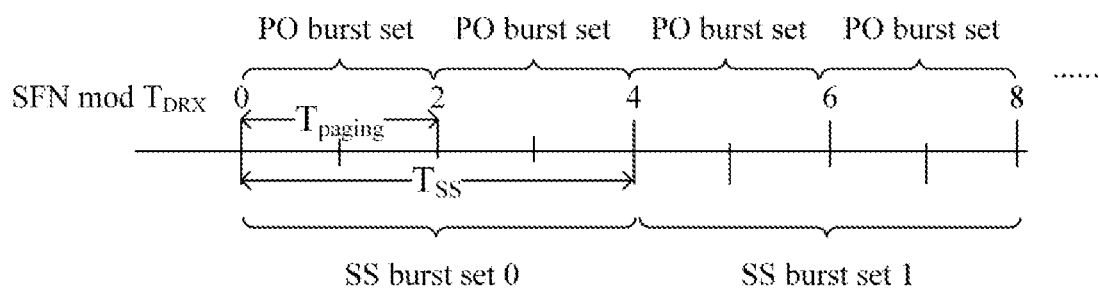
FIG. 24 is a schematic diagram illustrating a structure of another PO of a terminal in sub-implementation example 1-4 shown in FIG. 22.

In another implementation manner of sub-implementation example 1-4, the resource of the SS burst set may not be multiplexed. FIG. 24 is a schematic diagram illustrating a structure of another PO of a terminal in sub-implementation example 1-4 shown in FIG. 22. The PO burst set with a period of 20 ms is independently configured, and in this case, adjacent PO burst sets do not overlap in time domain.

In an embodiment, the starting radio frame number of the PO in each sub-implementation example in implementation example 1 may also be calculated according to the following formula: SFN mod $T_{DRX}=(T_{DRX}/N)*(Device\_ID \bmod N)$. A difference from the formula SFN mod $T_{DRX}=T_{paging}*(UE\_ID \bmod (T_{DRX}/T_{paging}))$ is that the PO determination parameter configured by the base station does not include the paging transmission interval $T_{paging}$, but includes a number N of paging information transmissions within $T_{DRX}$. When $T_{DRX}$ and $T_{paging}$ is a multiple of the other, $N=T_{DRX}/T_{paging}$. Therefore, the two formulas have equivalent functions, and the difference lies only in that parameters configured on the network side are different.

Implementation Example 2

In each sub-implementation example in implementation example 1, $T_{DRX}$ and $T_{paging}$ is a multiple of the other (that is, $T_{DRX}$ is an integer multiple of $T_{paging}$), and $T_{paging}$ is greater than or equal to a length of a radio frame. When $T_{DRX}$ and $T_{paging}$ is not a multiple of the other, and $T_{paging}$ is greater than or equal to the length of a radio frame, a base station and a terminal may calculate a starting radio frame number of a PO according to the following formula:

SFN mod $T_{DRX}=T_{paging}*(UE\_ID \bmod \lfloor T_{DRX}/T_{paging} \rfloor)$.

Figure 25:
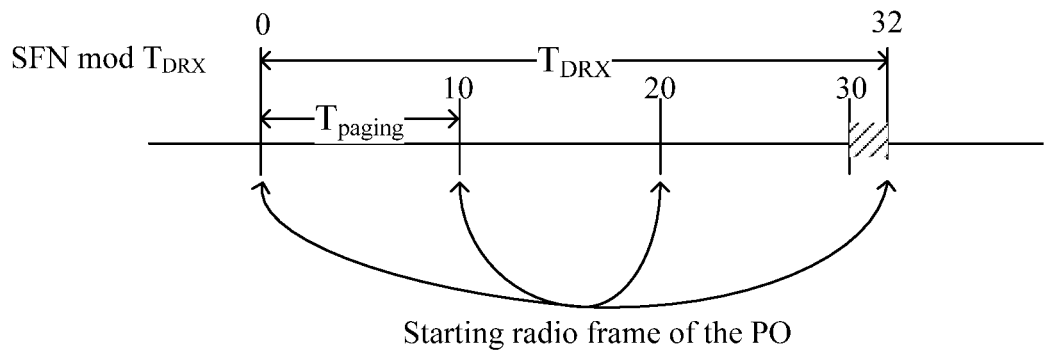
FIG. 25 is a schematic diagram of a relationship between $T_{paging}$ and $T_{DRX}$ according to implementation example 2.

FIG. 25 is a schematic diagram of a relationship between $T_{paging}$ and $T_{DRX}$ according to implementation example 2. In FIG. 25, $T_{DRX}=32$, $T_{paging}=10$, and then each DRX cycle includes three POs. Multiple terminals are distributed within the three POs according to a UE_ID; in this case, a paging resource is not included in radio frames 31 and 32.

When the base station determines to transmit paging information to a terminal whose UE_ID is 0000001101, the base station first calculates the starting radio frame number of the PO of the terminal. The starting radio frame number is determined according to the following formula:

SFN mod $T_{DRX}=T_{paging}*(UE\_ID \bmod \lfloor T_{DRX}/T_{paging} \rfloor)$.

Parameter values are taken into the formula to obtain:

SFN mod 32=10*(13 mod(32/10))=10.

The starting radio frame number of the PO of the terminal satisfies SFN mod 32=10, that is, a second PO within the DRX cycle.

In another possible implementation manner of this implementation example, the starting radio frame number of the PO may also be calculated according to the following formula:

SFN mod $T_{DRX}=\lfloor T_{DRX}/N \rfloor *(Device\_ID \bmod N)$.

A difference from the formula SFN mod $T_{DRX}=T_{paging}*(UE\_ID \bmod \lfloor T_{DRX}/T_{paging} \rfloor)$ is that a PO determination parameter configured by the base station does not include the paging transmission interval $T_{paging}$, but includes a number N of paging information transmissions within $T_{DRX}$. When $T_{DRX}$ and $T_{paging}$ is not a multiple of the other, $N=\lfloor T_{DRX}/T_{paging} \rfloor$ and $T_{paging}=\lfloor T_{DRX}/N \rfloor$. For example, the base station configures N=3 for the terminal, and then $T_{paging}=\lfloor T_{DRX}/N \rfloor=10$. Therefore, the two formulas have equivalent functions, and the difference lies only in that parameters configured on a network side are different.

Implementation Example 3

In each sub-implementation example in implementation example 1, $T_{DRX}$ and $T_{paging}$ is a multiple of the other (that is, $T_{DRX}$ is an integer multiple of $T_{paging}$), and $T_{paging}$ is greater than or equal to a length of a radio frame. When $T_{DRX}$ and $T_{paging}$ is a multiple of the other, and $T_{paging}$ is less than the length of a radio frame, a base station and a terminal may calculate a starting radio frame number of a PO according to the following formula:

SFN mod $T_{DRX}=\lfloor T_{paging}*(UE\_ID \bmod (T_{DRX}/T_{paging})) \rfloor$.

Figure 26:
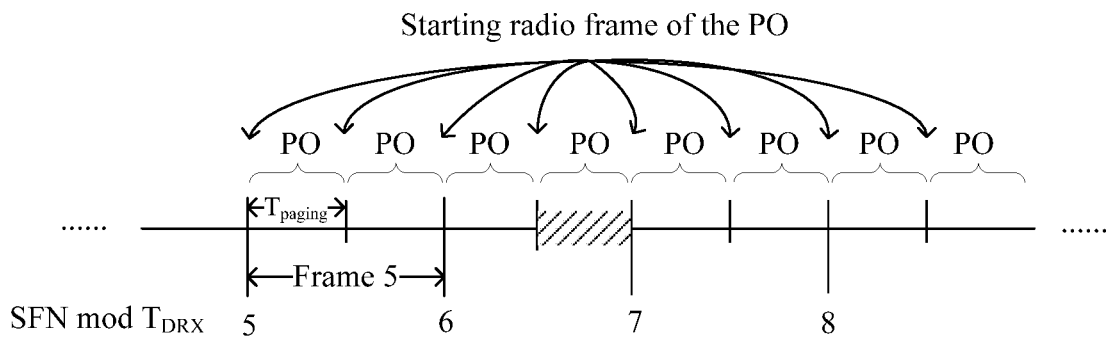
FIG. 26 is a schematic diagram of a relationship between $T_{paging}$ and $T_{DRX}$ according to implementation example 3.

FIG. 26 is a schematic diagram of a relationship between $T_{paging}$ and $T_{DRX}$ according to implementation example 3. In FIG. 26, $T_{DRX}=32$ and $T_{paging}=0.5$, that is, the base station transmits paging information at intervals of 5 ms. In this case, each radio frame corresponds to two POs. After the starting radio frame number is determined, whether the PO of the terminal is in a first half of frame or in a second half of frame, a starting subframe position, is to be determined.

When the base station determines to transmit the paging information to a terminal whose UE_ID is 0000001101, the base station first calculates the starting radio frame number of the PO of the terminal. The starting radio frame number is determined according to the following formula:

SFN mod $T_{DRX}=\lfloor T_{paging}*(UE\_ID \bmod (T_{DRX}/T_{paging})) \rfloor$.

Parameter values are taken into the formula to obtain:

SFN mod 32=$\lfloor 0.5*(13 \bmod(32/0.5)) \rfloor = \lfloor 6.5 \rfloor = 6$.

The starting radio frame number of the PO of the terminal satisfies SFN mod 32=6, that is, a second PO within the DRX cycle.

The starting subframe position of the starting radio frame number of the PO of the terminal is determined according to the UE_ID. In a practical application, it is predefined that a last bit 0 or 1 of the UE_ID corresponds to a subframe 0 or 5. In this implementation example, the last bit of the UE_ID is 1, and then a starting subframe corresponding to the terminal is the subframe 5. That is, a portion with oblique lines in FIG. 26 is the PO of the terminal. The base station transmits the paging information to the terminal on a paging resource corresponding to the subframe 5 of a frame 6. The terminal calculates the PO by the same method and receives the paging information.

In another possible implementation manner of this implementation example, the starting radio frame number of the PO may also be calculated according to the following formula:

SFN mod $T_{DRX}=\lfloor (T_{DRX}/N)*(Device\_ID \bmod N) \rfloor$.

A difference from the formula SFN mod $T_{DRX}=\lfloor T_{paging}*(UE\_ID \bmod (T_{DRX}/T_{paging})) \rfloor$ is that a PO determination parameter configured by the base station does not include the paging transmission interval $T_{paging}$, but includes a number N of paging information transmissions within $T_{DRX}$. When $T_{DRX}$ and $T_{paging}$ is a multiple of the other, $N=T_{DRX}/$ $T_{paging}$. For example, the base station configures N=64 for the terminal, and then $T_{paging}=\lfloor T_{DRX}/N \rfloor=0.5$. Therefore, the two formulas have equivalent functions, and the difference lies only in that parameters configured on a network side are different.

Implementation Example 4

Since parameters such as $T_{DRX}$, $T_{paging}$, and N are all configurable, to avoid a case where $T_{DRX}$ and $T_{paging}$ is not a multiple of the other or/and a case where $T_{paging}$ is less than a length of a radio frame, a base station and a terminal may calculate a starting radio frame number of a PO according to the following formula:

$$\text{SFN mod } T_{DRX} = \lfloor T_{paging} * (\text{UE\_ID mod } \lfloor T_{DRX}/T_{paging} \rfloor) \rfloor.$$

That is, the formula simultaneously includes two floor operations in implementation example 2 and implementation example 3. Similarly, when $T_{paging}$ is less than the length of a radio frame, the base station determines a starting subframe number of the PO of the terminal according to a predefined rule. Accordingly, the terminal also determines the starting subframe number of the PO according to the predefined rule.

In addition, the starting radio frame number of the PO may also be calculated according to the following formula:

$$\text{SFN mod } T_{DRX} = \lfloor \lfloor T_{DRX}/N \rfloor * (\text{UE\_ID mod } N) \rfloor.$$

A difference from the formula SFN mod $T_{DRX}=\lfloor T_{paging} * (\text{UE\_ID mod } \lfloor T_{DRX}/T_{paging} \rfloor) \rfloor$ is that a PO determination parameter configured by the base station does not include the paging transmission interval $T_{paging}$, but includes a number N of paging information transmissions within $T_{DRX}$. When $T_{DRX}$ and $T_{paging}$ is not a multiple of the other, $N=\lfloor T_{DRX}/T_{paging} \rfloor$ and $T_{paging}=\lfloor T_{DRX}/N \rfloor$. Therefore, the two formulas have equivalent functions, and the difference lies only in that parameters configured on a network side are different.

Implementation Example 5

This implementation example describes a method where a starting radio frame number of a PO is calculated using a UE_ID and a PO offset $t_{offset}$ is introduced into a calculation formula to adjust a starting radio frame position of the PO. As described in sub-implementation example 1-2 of implementation example 1, when a starting radio frame of the PO does not match a starting radio frame of an SS burst set, that is, when an offset exists, even if $T_{DRX}$ has a constraint relationship with $T_{paging}$ or $T_{DRX}$ and $T_{paging}$ is a multiple of the other, a resource of the SS burst set still cannot be effectively multiplexed to perform paging. However, a new group of sweeping resources is used so that an optimal resource utilization rate cannot be achieved. Therefore, $t_{offset}$ is introduced in this implementation example.

In this implementation example, $T_{paging}$ is greater than a length of a radio frame of 10 ms, and $T_{DRX}$ is a multiple of $T_{paging}$, according to whether a starting radio frame position of the SS burst set matches a starting radio frame position of the PO, a detailed description is made through two sub-implementation examples.

Sub-Implementation Example 5-1

Figure 27:
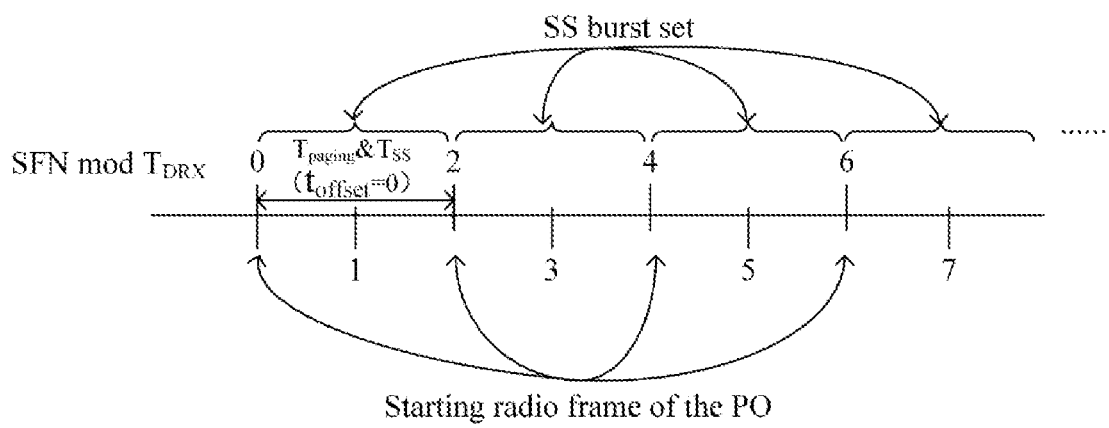
FIG. 27 is a schematic diagram of a relationship between $T_{paging}$ and $T_{SS}$ according to sub-implementation example 5-1.

FIG. 27 is a schematic diagram of a relationship between $T_{paging}$ and $T_{SS}$ according to sub-implementation example 5-1. In sub-implementation example 5-1, $T_{DRX}=32$, that is, a length of 32 radio frames, and $T_{SS}=T_{paging}=2$, that is, a length of two radio frames; a starting radio frame number of the SS burst set satisfies SFN mod 2=0. In this case, the SS burst set completely overlaps the PO in terms of a period and a time domain starting point, and the SS burst set may be completely multiplexed for paging information transmissions. In this case, $t_{offset}=0$, that is, an additional offset is not introduced.

When a base station determines to transmit paging information to a terminal whose UE_ID is 0000001101, the base station first calculates the starting radio frame number of the PO of the terminal. The starting radio frame number is determined according to the following formula:

$$\text{SFN mod } T_{DRX} = T_{paging} * (\text{UE\_ID mod}(T_{DRX}/T_{paging})) + t_{offset}.$$

Parameter values are taken into the formula to obtain:

SFN mod 32=2*(13 mod(32/2))=26.

The starting radio frame number of the PO of the terminal satisfies SFN mod 32=26.

In this way, the starting radio frame of the PO is determined, and the resource of the SS burst set may be multiplexed to transmit the paging information. After determining the starting radio frame of the PO, the base station transmits the paging information. The terminal calculates the starting radio frame of the PO in the same manner and receives the paging information in the same manner as the manner in sub-implementation example 1-1 of implementation example 1, which is not repeated herein.

In this implementation example, $T_{SS}=T_{paging}$. When $T_{SS}$ and $T_{paging}$ is a multiple or divisor of the other, as shown in FIG. 20 and FIG. 21, if the starting radio frame of the PO overlaps the starting radio frame of the SS burst set, $t_{offset}$ may be set to 0, that is, the resource of the SS burst set may also be multiplexed as much as possible to transmit the paging information without adjusting the starting radio frame position of the PO.

Sub-Implementation Example 5-2

Figure 28:
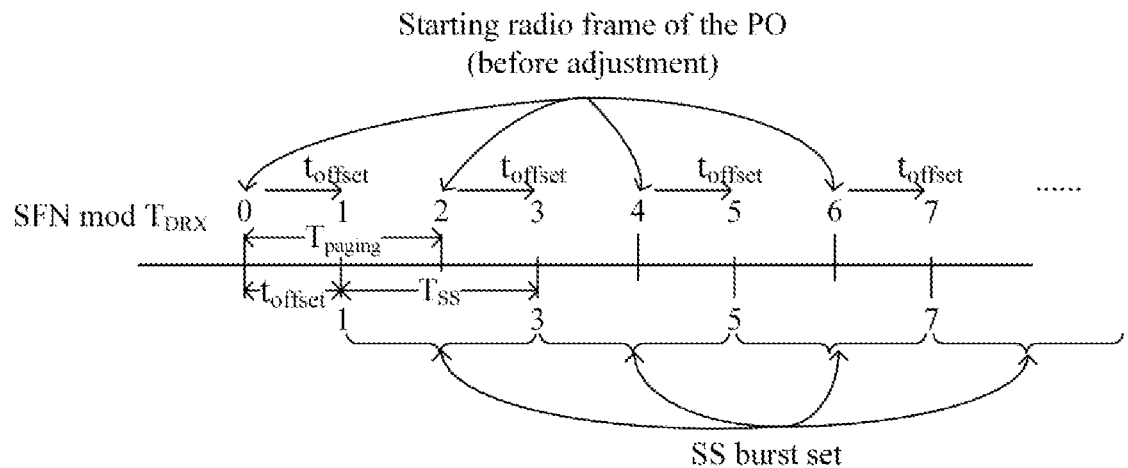
FIG. 28 is a schematic diagram of a relationship between $T_{paging}$ and $T_{SS}$ according to sub-implementation example 5-2.

FIG. 28 is a schematic diagram of a relationship between $T_{paging}$ and $T_{SS}$ according to sub-implementation example 5-2. In sub-implementation example 5-2, $T_{DRX}=32$, that is, a length of 32 radio frames, and $T_{SS}=T_{paging}=2$, that is, a length of two radio frames; a starting radio frame number of the SS burst set satisfies SFN mod 2=1. In this case, the SS burst set does not overlap the PO in terms of a period and a time domain starting point, and $t_{offset}$ is introduced to adjust the starting radio frame position so that the SS burst set may be multiplexed for paging information transmissions.

As described in sub-implementation example 5-1, when a base station determines to transmit the paging information to a terminal whose UE_ID is 0000001101, the base station first calculates a starting radio frame number of the PO of the terminal. The starting radio frame number is determined according to the following formula:

$$\text{SFN mod } T_{DRX} = T_{paging} * (\text{UE\_ID mod}(T_{DRX}/T_{paging})) + t_{offset}.$$

Parameter values are taken into the formula to obtain:

SFN mod 32=2*(13 mod(32/2))+1=27.

The starting radio frame number of the PO of the terminal satisfies SFN mod 32=27.

In FIG. 28, positions of frames 0, 2, 4, 6, etc. are the starting radio frame numbers before the starting radio frames of the PO are adjusted. With a backward offset of $t_{offset}$, the starting radio frames of the PO are adjusted to be the same as the starting radio frames of the SS burst set (i.e., frames 1, 3, 5, 7, etc.) so that the SS burst set is multiplexed for transmitting the paging information and a synchronous signal. Subsequently, a method for transmitting the paging information by the base station and a method for receiving the paging information by the terminal are the same as those in sub-implementation example 1-1 of implementation example 1, which are not repeated herein.

Figure 29:
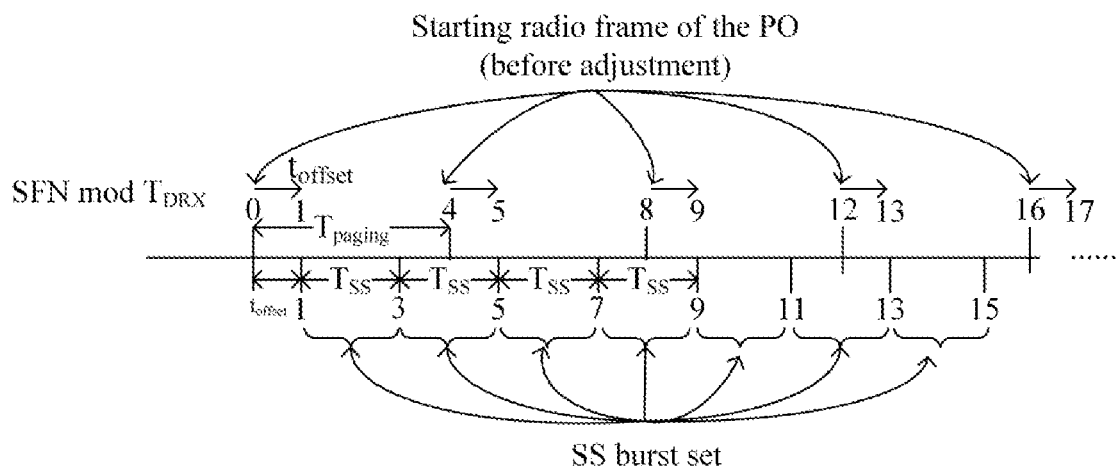
FIG. 29 is a schematic diagram of another relationship between $T_{paging}$ and $T_{SS}$ according to sub-implementation example 5-2.
Figure 30:
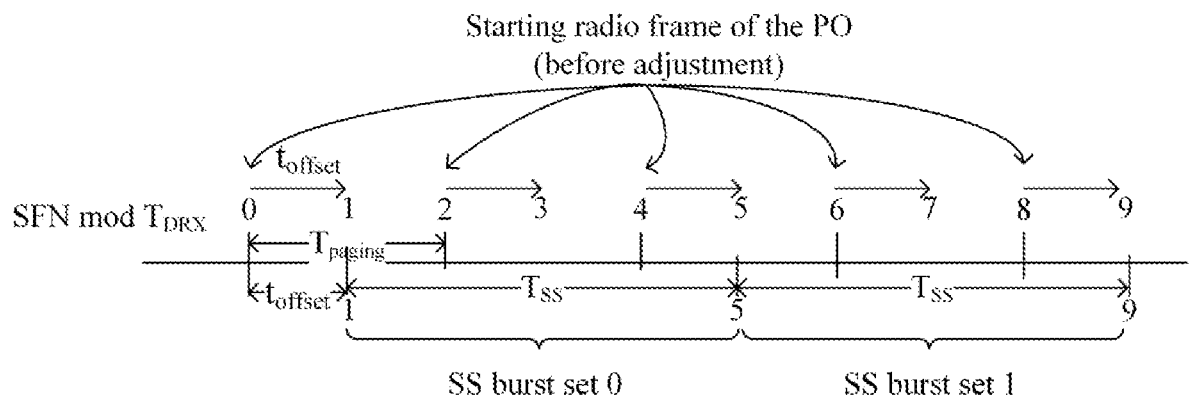
FIG. 30 is a schematic diagram of another relationship between $T_{paging}$ and $T_{SS}$ according to sub-implementation example 5-2.

In this sub-implementation example, $T_{SS}=T_{paging}$. When $T_{SS}$ and $T_{paging}$ is a multiple or divisor of the other, as shown in FIG. 29 and FIG. 30, in condition that the starting radio frame of the PO has an offset from the starting radio frame of the SS burst set, $t_{offset}$ may be set to a corresponding offset value, that is, the resource of the SS burst set is multiplexed as much as possible by adjusting the starting radio frame position of the PO. FIG. 29 is a schematic diagram of another relationship between $T_{paging}$ and $T_{SS}$ according to sub-implementation example 5-2. FIG. 30 is a schematic diagram of yet another relationship between $T_{paging}$ and $T_{SS}$ according to sub-implementation example 5-2.

Implementation Example 6

In each sub-implementation example in implementation example 5, $T_{DRX}$ and $T_{paging}$ is a multiple of the other, and $T_{paging}$ is greater than a length of a radio frame. When $T_{DRX}$ and $T_{paging}$ is not a multiple of the other, and $T_{paging}$ is greater than the length of a radio frame, a base station and a terminal may calculate a starting radio frame number of a PO according to the following formula:

$$\text{SFN} \mod T_{DRX} = T_{paging}*(\text{UE\_ID} \mod \lfloor T_{DRX}/T_{paging} \rfloor) + t_{offset}$$

Figure 31:
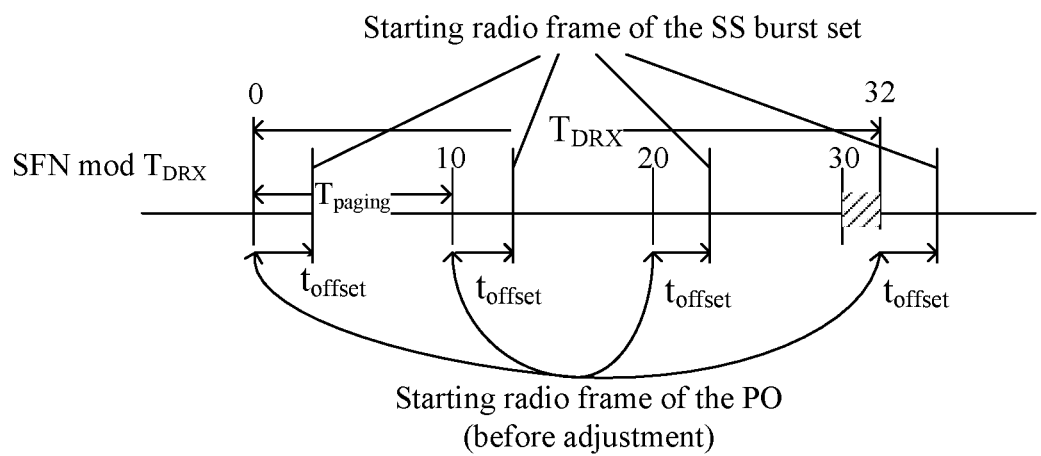
FIG. 31 is a schematic diagram of a relationship between $T_{paging}$ and $T_{SS}$ according to implementation example 6.

FIG. 31 is a schematic diagram of a relationship between $T_{paging}$ and $T_{DRX}$ according to implementation example 6. In FIG. 31, $T_{DRX}=32$, $T_{paging}=10$, $t_{offset}=4$, and then each DRX cycle includes three POs. Multiple terminals are distributed within the three POs according to a UE_ID.

When the base station determines to transmit paging information to a terminal whose UE_ID is 0000001101, the base station first calculates the starting radio frame number of the PO of the terminal. The starting radio frame number is determined according to the following formula:

$$\text{SFN} \mod T_{DRX} = T_{paging}*(\text{UE\_ID} \mod \lfloor T_{DRX}/T_{paging} \rfloor) + t_{offset}$$

Parameter values are taken into the formula to obtain:

SFN mod 32=10*(13 mod(32/10))+4=14.

The starting radio frame number of the PO of the terminal satisfies SFN mod 32=14, that is, a second PO within the DRX cycle.

In another possible implementation manner of this implementation example, the starting radio frame number of the PO may also be calculated according to the following formula: SFN mod $T_{DRX}=\lfloor T_{DRX}/N \rfloor *(\text{UE\_ID} \mod N)+t_{offset}$.

A difference from the formula SFN mod $T_{DRX}=T_{paging}*(\text{UE\_ID} \mod \lfloor T_{DRX}/T_{paging} \rfloor)+t_{offset}$ is that a PO determination parameter configured by the base station does not include the paging transmission interval $T_{paging}$, but includes a number N of paging information transmissions within $T_{DRX}$. When $T_{DRX}$ and $T_{paging}$ is not a multiple of the other, $N=\lfloor T_{DRX}/T_{paging} \rfloor$ and $T_{paging}=\lfloor T_{DRX}/N \rfloor$. For example, the base station configures N=3 for the terminal, and then $T_{paging}=\lfloor T_{DRX}/N \rfloor=10$. Therefore, the two formulas have equivalent functions, and the difference lies only in that parameters configured on a network side are different.

Implementation Example 7

In each sub-implementation example in implementation example 1, $T_{DRX}$ and $T_{paging}$ is a multiple of the other, and $T_{paging}$ is greater than a length of a radio frame. When $T_{DRX}$ and $T_{paging}$ is a multiple of the other, and $T_{paging}$ is less than the length of a radio frame, a base station and a terminal may calculate a starting radio frame number of a PO according to the following formula:

$$\text{SFN} \mod T_{DRX} = \lfloor T_{paging}*(\text{UE\_ID} \mod(T_{DRX}/T_{paging})) \rfloor + t_{offset}$$

As shown in FIG. 25, $T_{DRX}=32$ and $T_{paging}=0.5$, that is, the base station transmits paging information at intervals of 5 ms. In this case, each radio frame corresponds to two POs. After the starting radio frame number is determined, whether the PO of the terminal is in a first half of frame or in a second half of frame, a starting subframe number, is to be determined. In addition, a starting radio frame of the PO overlaps a starting radio frame of an SS burst set, and $t_{offset}$ is set to 0.

When the base station determines to transmit the paging information to a terminal whose UE_ID is 0000001101, the base station first calculates the starting radio frame number of the PO of the terminal. The starting radio frame number is determined according to the following formula:

$$\text{SFN} \mod T_{DRX} = \lfloor T_{paging}*(\text{UE\_ID} \mod(T_{DRX}/T_{paging})) \rfloor + t_{offset}$$

Parameter values are taken into the formula to obtain:

SFN mod 32=⌊0.5*(13 mod(32/0.5))⌋+0=⌊6.5⌋=6.

The starting radio frame number of the PO of the terminal satisfies SFN mod 32=6, that is, a second PO within the DRX cycle.

A starting subframe position of the PO of the terminal is determined according to the UE_ID. It is predefined that a last bit 0 or 1 of the UE_ID corresponds to a subframe 0 or 5. In this implementation example, the last bit of the UE_ID is 1, and then a starting subframe corresponding to the terminal is the subframe 5. That is, a portion with oblique lines in FIG. 25 is the PO of the terminal.

The base station transmits the paging information to the terminal on a paging resource corresponding to the subframe 5 of a frame 6.

In another implementation manner of this implementation example, the starting radio frame number of the PO may also be calculated according to the following formula: SFN mod $T_{DRX}=\lfloor (T_{DRX}/N)*(\text{UE\_ID} \mod N) \rfloor +t_{offset}$.

A difference from the formula SFN mod $T_{DRX}=\lfloor T_{paging}*(\text{UE\_ID} \mod(T_{DRX}/T_{paging})) \rfloor+t_{offset}$ is that a PO determination parameter configured by the base station does not include the paging transmission interval $T_{paging}$, but includes a number N of paging information transmissions within $T_{DRX}$. When $T_{DRX}$ and $T_{paging}$ is a multiple of the other, $N=T_{DRX}/T_{paging}$. For example, the base station configures N=64 for the terminal, and then $T_{paging}=\lfloor T_{DRX}/N \rfloor=0.5$. Therefore, the two formulas have equivalent functions, and the difference lies merely in that parameters configured on a network side are different.

In addition, $t_{offset}$ may be set according to a practical offset between the radio frame number of the PO before the starting radio frame of the PO is adjusted and a starting radio frame of the SS burst set, and be transmitted to the terminal.

Implementation Example 8

Since parameters such as $T_{DRX}$, $T_{paging}$, and N are all configurable, to avoid a case where $T_{DRX}$ and $T_{paging}$ is not a multiple of the other or/and a case where $T_{paging}$ is less than a length of a radio frame, a base station and a terminal may calculate a starting radio frame number of a PO according to the following formula:

$$\text{SFN mod } T_{DRX} = \lfloor T_{paging} * (\text{UE\_ID mod } \lfloor T_{DRX}/T_{paging} \rfloor) \rfloor + t_{offset}.$$

That is, the formula simultaneously includes two floor operators in implementation example 6 and implementation example 7. Similarly, when $T_{paging}$ is less than the length of a radio frame, the base station determines a starting subframe number of the PO of the terminal according to a predefined rule. Accordingly, the terminal also determines the starting subframe number of the PO according to the predefined rule.

In addition, the starting radio frame number of the PO may also be calculated according to the following formula:

$$\text{SFN mod } T_{DRX} = \lfloor \lfloor T_{DRX}/N \rfloor * (\text{UE\_ID mod } N) \rfloor + t_{offset}.$$

A difference from the formula $\text{SFN mod } T_{DRX} = \lfloor T_{paging} * (\text{UE\_ID mod } \lfloor T_{DRX}/T_{paging} \rfloor) \rfloor + t_{offset}$ is that a PO determination parameter configured by the base station does not include the paging transmission interval $T_{paging}$, but includes a number N of paging information transmissions within $T_{DRX}$. When $T_{DRX}$ and $T_{paging}$ is not a multiple of the other, $N = \lfloor T_{DRX}/T_{paging} \rfloor$ and $T_{paging} = \lfloor T_{DRX}/N \rfloor$. Therefore, the two formulas have equivalent functions, and the difference lies merely in that parameters configured on a network side are different.

In addition, $t_{offset}$ may be set according to a practical offset between the radio frame number of the PO before a starting radio frame of the PO is adjusted and a starting radio frame of an SS burst set, and be transmitted to the terminal.

Implementation Example 9

Figure 32:
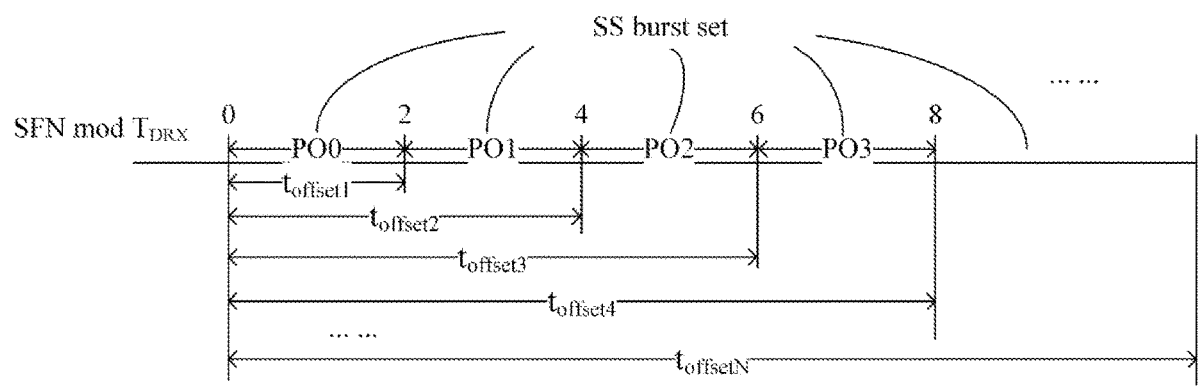
FIG. 32 is a schematic diagram of a relationship between $T_{paging}$ and $T_{SS}$ according to implementation example 9.

This implementation example describes a method for determining a PO based on a base station configuration. $T_{DRX}=32$, that is, a length of 32 radio frames. FIG. 32 is a schematic diagram of a relationship between $T_{paging}$ and $T_{SS}$ according to implementation example 9. In FIG. 32, $T_{SS}=2$, that is, 20 ms. According to different values of $T_{paging}$ and whether an SS burst set is multiplexed for paging information transmissions, a detailed description is made through sub-implementation examples described below.

Sub-Implementation Example 9-1

In this sub-implementation example, $T_{SS}=T_{paging}=2$, where $T_{paging}$ is a period within which a base station transmits paging information. In the method corresponding to this sub-implementation example, the base station may not transmit $T_{paging}$ to the terminal, and the base station configures different values of $t_{offset}$ for the terminal to distribute terminals within different POs. In this case, a resource of the SS burst set may be multiplexed.

The base station determines a starting radio frame number according to the following formula:

$$\text{SFN mod } T_{DRX} = t_{offset}.$$

For example, a network includes 32 terminals, DRX cycles of all the terminals are 32, so the DRX cycle includes 16 POs. In this case, 32 terminals are configured within corresponding POs, as shown in table 1:

TABLE 1

| Terminal | PO Offset ($t_{offset}$) | Paging Occasion (PO) |
|---|---|---|
| UE0, UE1 | 0 | $PO_0$ |
| UE2, UE3 | 2 | $PO_1$ |
| UE4, UE5 | 4 | $PO_2$ |
| UE6, UE7 | 6 | $PO_3$ |
| UE8, UE9 | 8 | $PO_4$ |
| UE10, UE11 | 10 | $PO_5$ |
| ... | ... | ... |
| UE28, UE29 | 28 | $PO_{14}$ |
| UE30, UE31 | 30 | $PO_{15}$ |

The base station configures $t_{offset}$ shown in Table 1 for different UE/UE groups in a unicast or multicast manner, and each terminal determines its own PO according to the PO offset, that is, $\text{SFN mod } T_{DRX} = t_{offset}$. In the unicast manner, $t_{offset}$ may be notified via dedicated RRC signaling. In the multicast manner, the base station assigns the same group identifier (such as a Group Radio Network Temporary Identifier (G-RNTI)) to a group of terminals with the same PO position and scrambles the PO offset with the G-RNTI, and the terminals descramble configuration information with the G-RNTI so that the terminals in the same group obtains the corresponding $t_{offset}$ configuration.

As described in the methods in the preceding implementation examples, the base station transmits the paging information to the terminals within the corresponding POs, and the terminals receive the paging information within the corresponding POs.

In another implementation manner of this implementation example, the base station may not configure all the 16 POs to the terminals, and the base station may not transmit the paging information to the terminals within some POs which are not configured for the terminals. The number of terminals configured within each PO is also variable, and a principle for grouping terminals is not limited herein.

Sub-Implementation Example 9-2

Figure 33:
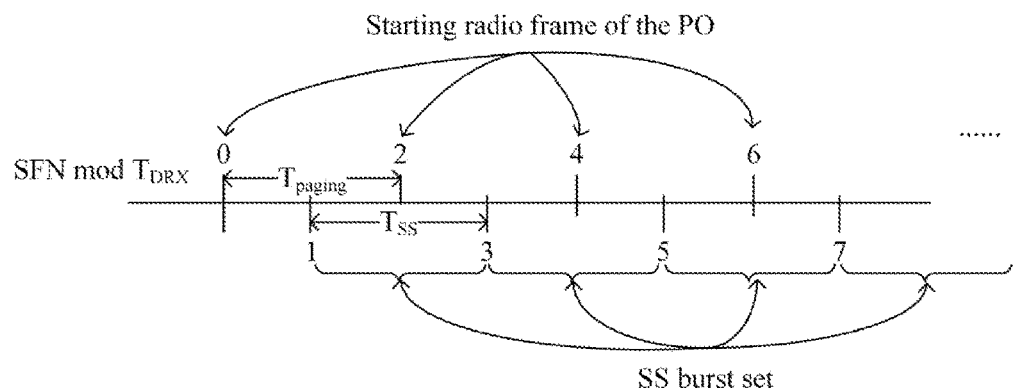
FIG. 33 is a schematic diagram of a relationship between $T_{paging}$ and $T_{SS}$ according to sub-implementation example 9-2.

A base station may also configure $t_{offset}$ to enable the SS burst set not to be multiplexed for paging information transmissions. FIG. 33 is a schematic diagram of a relationship between $T_{paging}$ and $T_{SS}$ according to sub-implementation example 9-2. In FIG. 33, $T_{SS}=T_{paging}=2$, a starting radio frame of the SS burst set satisfies $\text{SFN mod } 2=1$, and a starting radio frame of the PO satisfies $\text{SFN mod } 2=0$. In this case, a resource of the SS burst set is not multiplexed to transmit paging information, but a group of additional sweeping resources is used for paging information transmissions.

For example, a network includes 32 terminals, DRX cycles of all the terminals are 32, so the DRX cycle includes 16 POs. In this case, 32 terminals are configured within corresponding POs, as shown in table 2:

TABLE 2

| Terminal | PO Offset ($t_{offset}$) | Paging Occasion (PO) | Additional Sweeping Resource |
|---|---|---|---|
| UE0, UE1 | 0 | $PO_0$ | 0 |
| UE2, UE3 | 2 | $PO_1$ | 1 |
| UE4, UE5 | 4 | $PO_2$ | 2 |
| UE6, UE7 | 6 | $PO_3$ | 3 |
| UE8, UE9 | 8 | $PO_4$ | 4 |
| UE10, UE11 | 10 | $PO_5$ | 5 |

TABLE 2-continued

| Terminal | PO Offset ($t_{offset}$) | Paging Occasion (PO) | Additional Sweeping Resource |
|---|---|---|---|
| ... | ... | ... | ... |
| UE28, UE29 | 28 | $PO_{14}$ | 14 |
| UE30, UE31 | 30 | $PO_{15}$ | 15 |

Sub-Implementation Example 9-3

Figure 34:
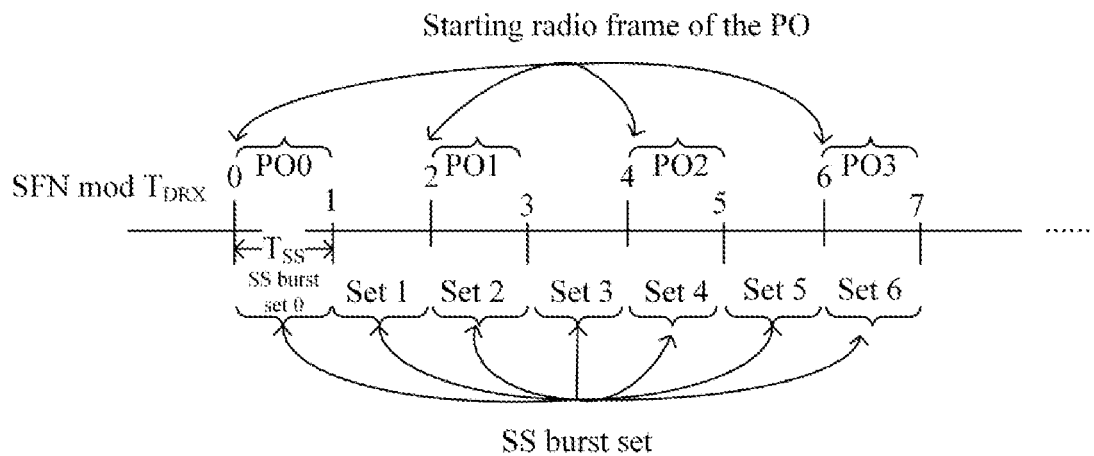
FIG. 34 is a schematic diagram of a relationship between $T_{paging}$ and $T_{SS}$ according to sub-implementation example 9-3.

FIG. 34 is a schematic diagram of a relationship between $T_{paging}$ and $T_{SS}$ according to sub-implementation example 9-3. A transmission period of the paging information is different from a transmission period of an SS, but the transmission period of the paging information has a multiple or constraint relationship with the transmission period of the SS. For example, $T_{paging}=2*T_{SS}=2$, that is, $T_{SS}=1$. A starting radio frame of the PO may be configured as a subset of starting radio frames of the SS burst set. In this case, some SS burst sets may be multiplexed for paging information transmissions. That is, some SS burst sets are not multiplexed to transmit the paging information, and other SS burst sets are multiplexed to transmit the paging information. As shown in Table 3, the SS burst sets with even indexes are multiplexed to transmit the paging information.

TABLE 3

| Terminal | PO Offset ($t_{offset}$) | Paging Occasion (PO) | Index of SS Burst Set |
|---|---|---|---|
| UE0, , UE1 | 0 | $PO_0$ | 0 |
| UE2, UE3 | 2 | $PO_1$ | 1 |
| UE4, UE5 | 4 | $PO_2$ | 2 |
| UE6, UE7 | 6 | $PO_3$ | 3 |
| UE8, UE9 | 8 | $PO_4$ | 4 |
| UE10, UE11 | 10 | $PO_5$ | 5 |
| ... | ... | ... | ... |
| UE28, UE29 | 28 | $PO_{14}$ | 14 |
| UE30, UE31 | 30 | $PO_{15}$ | 15 |

Sub-Implementation Example 9-4

Figure 35:
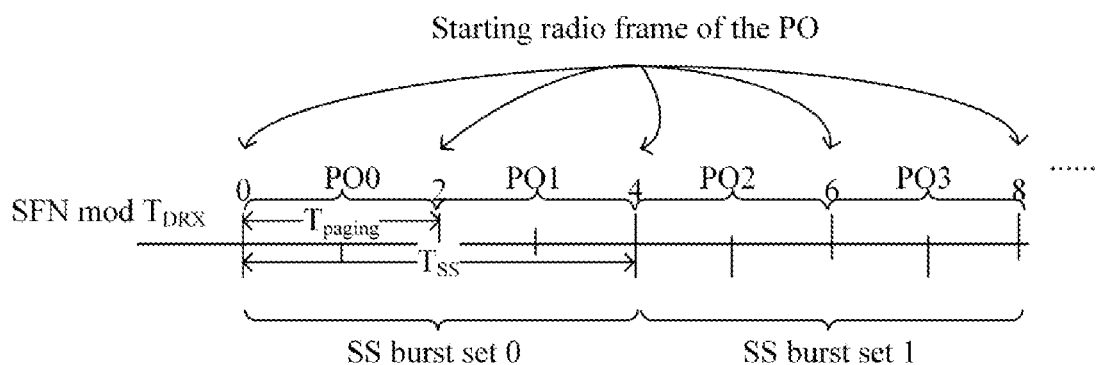
FIG. 35 is a schematic diagram of a relationship between $T_{paging}$ and $T_{SS}$ according to sub-implementation example 9-4.

FIG. 35 is a schematic diagram of a relationship between $T_{paging}$ and $T_{SS}$ according to sub-implementation example 9-4. In this sub-implementation example, $T_{paging}=0.5*T_{SS}=2$, that is, $T_{SS}=4$. That is, a period of the SS burst set is a length of 4 radio frames, and a starting radio frame number of the SS burst set satisfies SFN mod 4=0. In this case, the SS burst set may be multiplexed for part of paging information transmissions. That is to say, all the SS burst sets are multiplexed for transmitting the paging information. In addition, additional sweeping resources are used for the other part of paging information transmissions. As shown in Table 4, resources of the SS burst sets may be multiplexed as $PO_0$, $PO_2$, ..., and $PO_{14}$, and a group of sweeping resources is added for each $PO_1$, $PO_3$, ..., and $PO_{15}$.

TABLE 4

| Terminal | $t_{offset}$ | Paging Occasion | Index of SS Burst Set | Index of Additional Sweeping Resource |
|---|---|---|---|---|
| UE0, UE1 | 0 | $PO_0$ | 0 | |
| UE2, UE3 | 2 | $PO_1$ | | 0 |
| UE4, UE5 | 4 | $PO_2$ | 1 | |
| UE6, UE7 | 6 | $PO_3$ | | 1 |
| UE8, UE9 | 8 | $PO_4$ | 2 | |
| UE10, UE11 | 10 | $PO_5$ | | 2 |
| ... | ... | ... | ... | |
| UE28, UE29 | 28 | $PO_{14}$ | 7 | |
| UE30, UE31 | 30 | $PO_{15}$ | | 7 |

Implementation Example 10

Figure 36:
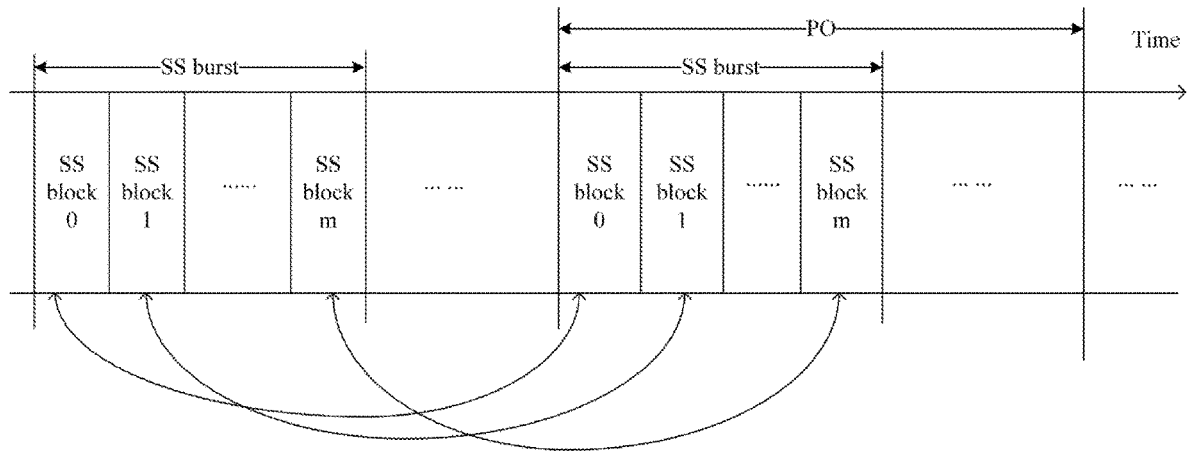
FIG. 36 is a schematic diagram illustrating a structure of a PO of a terminal in implementation example 10.

FIG. 36 is a schematic diagram illustrating a structure of a PO of a terminal in implementation example 10. In this implementation example, a synchronous signal has a quasi-co-location relationship with a signal related to paging information, and both the synchronous signal and the signal related to the paging information are transmitted with the same sweeping resources. A terminal has determined a time domain position of the PO of the terminal in a particular manner. This implementation example describes a method in which the terminal determines a paging resource within the PO by measuring the synchronous signal according to information of the quasi-co-location relationship.

A base station configures the information of the quasi-co-location relationship between the signal related to the paging information (such as a demodulation reference signal of a physical control channel related to the paging information) and the synchronous signal for the terminal, that is, the demodulation reference signal of paging DCI and the synchronous signal are quasi-co-located. Moreover, provided is a mapping relationship between a paging resource and a transmission resource of the synchronous signal. The information of the quasi-co-location (QCL) relationship may be transmitted by the base station to all terminals through a broadcast message or via dedicated RRC signaling between the base station and the terminals. For example, the paging resource and the transmission resource of the synchronous signal have a one-to-one mapping relationship. The transmission resource of the synchronous signal is represented by an index of an SS block. Accordingly, a resource of the SS block is multiplexed by the paging information and the SS, so the paging resource is also represented by the index of the SS block.

Before the PO arrives, the terminal wakes up in advance from a sleep state, and measures or receives a sweeping signal/channel having the QCL relationship with the signal related to the paging information transmitted by the base station. Taking the synchronous signal as an example, the terminal sequentially receives the synchronous signal transmitted by the base station through different transmit antenna ports by using different receive antenna ports, and the terminal obtains multiple groups of measurement results, each of which corresponds to one receive antenna port of the terminal and one transmit antenna port of the base station. The receive antenna port of the terminal corresponding to a group pf measure results with the strongest signal strength among the multiple groups of measurement results is taken as an antenna port for subsequently receiving the paging information. When the PO arrives, the terminal may receive the paging information transmitted by the base station with the predetermined specific receive antenna port. In this implementation example, for example, the terminal learns by trainings that a preferred downlink receive antenna port is a receive antenna port 4. When the PO arrives, the terminal receives a paging message only with the receive antenna port 4, and no longer switches the receive antenna port within different POs.

In a training process of a downlink receive antenna port of the terminal, a preferred downlink transmit antenna port/a preferred transmit beam direction on a base station side may be simultaneously identified, that is, a transmit antenna port on the base station side corresponding to the group of measurement results with the strongest signal strength among the multiple of measurement results. If a system predefines a position of a time and frequency domain resource of the transmit antenna port (such as an SS block with index 3) and a mapping relationship between the time and frequency domain resource and the paging resource corresponding to the transmit antenna port (i.e., a specific paging resource within the PO, that is, the SS block 3), the terminal may reduce paging information reception times when the PO arrives, that is, the terminal only receives the paging information within the SS block corresponding to the preferred downlink transmit antenna port.

In this implementation example, the preferred downlink transmit antenna port (the corresponding paging resource is the SS block 3) of the base station with respect to the terminal is obtained by the trainings, and the preferred downlink receive antenna port of a UE is the port 4. When the PO arrives, the terminal will only receive the paging information within the SS block 3 by using the receive antenna port 4.

The sweeping signal or channel having the QCL relationship with the signal related to the paging information may also be one or more of: the demodulation reference signal (DMRS) of a physical broadcast channel (PBCH), a beam reference signal (BRS), a mobility reference signal (MRS), and a channel state information-reference signal (CSI-RS). A manner in which the terminal determines the paging resource within the PO by using the information on the QCL relationship is the same as the manner in this implementation example.

Implementation Example 11

Figure 37:
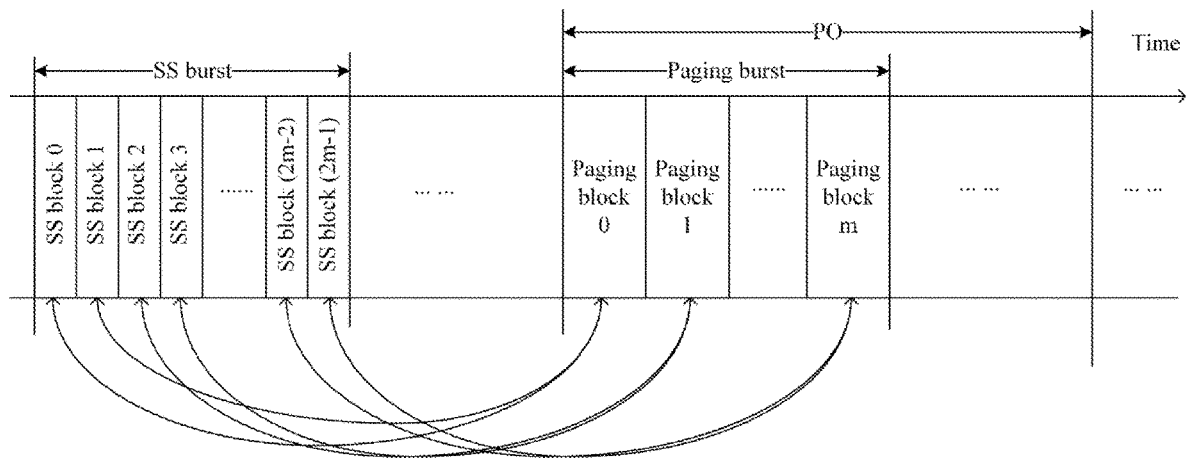
FIG. 37 is a schematic diagram illustrating a structure of a PO of a terminal in implementation example 11.

FIG. 37 is a schematic diagram illustrating a structure of a PO of a terminal in implementation example 11. In this implementation example, a synchronous signal has a quasi-co-location relationship with a signal related to paging information, and the synchronous signal and the signal related to the paging information are transmitted with different sweeping resources. A terminal has determined a time domain position of the PO of the terminal in a particular manner. This implementation example describes a method in which the terminal determines a paging resource within the PO by measuring the synchronous signal according to information of the quasi-co-location relationship.

A base station configures the information of the quasi-co-location relationship between the signal related to the paging information (such as a demodulation reference signal of a paging message) and the synchronous signal for the terminal, that is, the demodulation reference signal of the paging message and the synchronous signal are quasi-co-located. Moreover, provided is a mapping relationship between a resource of the paging message and a transmission resource of the synchronous signal. The information of the quasi-co-location (QCL) relationship may be transmitted by the base station to all terminals through a broadcast message or via dedicated RRC signaling between the base station and the terminals. For example, one resource of the paging message corresponds to multiple transmission resources of the synchronous signal: two resources of the synchronous signal correspond to one resource of the paging message, that is, ports within a paging block 0 are quasi-co-located with ports within SS blocks 0 and 1. The transmission resource of the synchronous signal is still represented by an index of the SS block. Accordingly, the resource of the paging message is represented by an index of the paging block.

Before the PO arrives, the terminal wakes up in advance from a sleep state, and measures or receives a sweeping signal/channel having the QCL relationship with the paging message transmitted by the base station. Taking the synchronous signal as an example, the terminal sequentially receives the synchronous signal transmitted by the base station through different transmit antenna ports by using different receive antenna ports, and the terminal obtains multiple groups of measurement results, each of which corresponds to one receive antenna port of the terminal and one transmit antenna port of the base station. The receive antenna port of the terminal corresponding to a group pf measure results with the strongest signal strength among the multiple groups of measurements is taken as an antenna port for subsequently receiving the paging message. When the PO arrives, the terminal may receive the paging message transmitted by the base station with the predetermined specific receive antenna port. In this implementation example, for example, the terminal learns by trainings that a preferred downlink receive antenna port is a receive antenna port 4. When the PO arrives, the terminal receives the paging message only with the receive antenna port 4, and no longer switches the receive antenna port within different POs.

In a training process of a downlink receive antenna port of the terminal, a preferred downlink transmit antenna port/a preferred transmit beam direction on a base station side may be simultaneously identified, that is, a transmit antenna port on the base station side corresponding to the group of measurement results with the strongest signal strength among the multiple of measurement results. If the base station indicates a position of a time and frequency domain resource of the transmit antenna port (such as an SS block with index 3) and a mapping relationship between the time and frequency domain resource and the paging resource corresponding to the transmit antenna port (i.e., one paging resource within the PO, that is, a paging block 1), the terminal may reduce paging message reception times when the PO arrives, that is, the terminal only receives the paging message within the paging block 1 corresponding to the preferred downlink transmit antenna port.

In this implementation example, the preferred downlink transmit antenna port (the corresponding paging resource is the SS block 3) of the base station with respect to the terminal is obtained by the trainings, and the preferred downlink receive antenna port of a UE is the port 4. When the PO arrives, the terminal will only receive the paging message within the paging block 1 by using the receive antenna port 4.

The sweeping signal or channel having the QCL relationship with the signal related to the paging information may also be one or more of: the demodulation reference signal (DMRS) of a physical broadcast channel (PBCH), a beam reference signal (BRS), a mobility reference signal (MRS), and a channel state information-reference signal (CSI-RS). A manner in which the terminal determines the paging resource within the PO by using the information on the QCL relationship is the same as the manner in this implementation example.

Implementation Example 12

Figure 38:
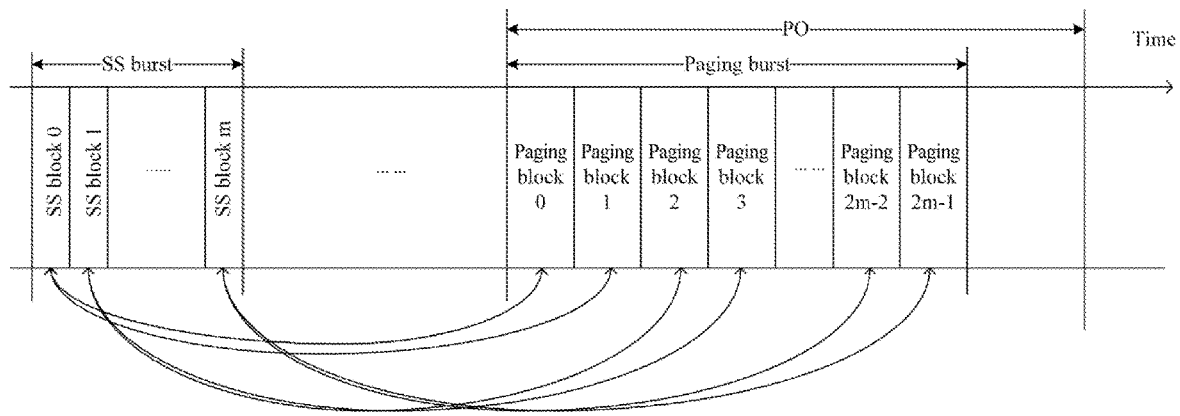
FIG. 38 is a schematic diagram illustrating a structure of a PO of a terminal in implementation example 12.

FIG. 38 is a schematic diagram illustrating a structure of a PO of a terminal in implementation example 12. In this implementation example, a synchronous signal has a quasi-co-location relationship with a signal related to paging information, and the synchronous signal and the signal related to the paging information are transmitted with different sweeping resources. A terminal has determined a time domain position of the PO of the terminal in a particular manner. This implementation example describes a method in which the terminal determines a paging resource within the PO by measuring the synchronous signal according to information of the quasi-co-location relationship.

A base station configures the information of the quasi-co-location (QCL) relationship between the signal related to the paging information and the synchronous signal for the terminal, that is, a demodulation reference signal of a paging message and the synchronous signal are quasi-co-located. Moreover, provided is a mapping relationship between a resource of the paging message and a transmission resource of the synchronous signal. The information on the QCL relationship may be transmitted by the base station to all terminals through a broadcast message or via dedicated RRC signaling between the base station and the terminals. For example, multiple resources of the paging message correspond to one transmission resource of the synchronous signal: one resource of the synchronous signal corresponds to two resources of the paging message, that is, ports within an SS block 0 are nearly the same as ports within paging blocks 0 and 1. The transmission resource of the synchronous signal is still represented by an index of the SS block. Accordingly, the paging resource is represented by an index of the paging block.

Before the PO arrives, the terminal wakes up in advance from a sleep state, and measures or receives a sweeping signal/channel having the QCL relationship with the paging message transmitted by the base station. Taking the synchronous signal as an example, the terminal sequentially receives the synchronous signal transmitted by the base station through different transmit antenna ports by using different receive antenna ports, and the terminal obtains multiple groups of measurement results, each of which corresponds to one receive antenna port of the terminal and one transmit antenna port of the base station. The receive antenna port of the terminal corresponding to a group pf measure results with the strongest signal strength among the multiple groups of measurements is taken as an antenna port for subsequently receiving the paging message. When the PO arrives, the terminal may receive the paging message transmitted by the base station with the predetermined specific receive antenna port. In this implementation example, for example, the terminal learns by trainings that a preferred downlink receive antenna port is a receive antenna port 4. When the PO arrives, the terminal receives the paging message only with the receive antenna port 4, and no longer switches the receive antenna port within different POs.

In a training process of a downlink receive antenna port of the terminal, a preferred downlink transmit antenna port/a preferred transmit beam direction on a base station side may be simultaneously identified, that is, a transmit antenna port on the base station side corresponding to the group of measurement results with the strongest signal strength among the multiple of measurement results. If the base station indicates a position of a time and frequency domain resource of the transmit antenna port (such as an SS block with index 1) and a mapping relationship between the time and frequency domain resource and the paging resource corresponding to the transmit antenna port (two paging resource within the PO, that is, paging blocks 2 and 3), the terminal may reduce paging message reception times when the PO arrives, that is, the terminal only receives the paging message within the paging blocks 2 and 3 corresponding to the preferred downlink transmit antenna port.

In this implementation example, the preferred downlink transmit antenna port (the corresponding paging resource is the SS block 1) of the base station with respect to the terminal is obtained by the trainings, and the preferred downlink receive antenna port of a UE is the port 4. When the PO arrives, the terminal will only receive the paging message within the paging blocks 2 and 3 by using the receive antenna port 4.

The sweeping signal or channel having the QCL relationship with the signal related to the paging information may also be one or more of: the demodulation reference signal (DMRS) of a physical broadcast channel (PBCH), a beam reference signal (BRS), a mobility reference signal (MRS), and a channel state information-reference signal (CSI-RS). A manner in which the terminal determines the paging resource within the PO by using the information on the QCL relationship is the same as the manner in this implementation example.

Implementation Example 13

Figure 39:
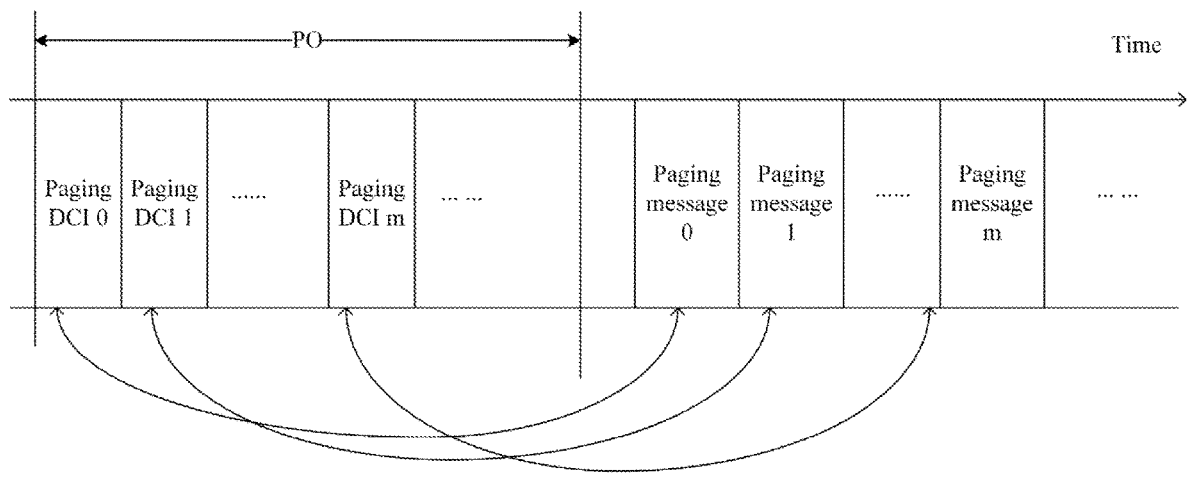
FIG. 39 is a schematic diagram illustrating a structure of a PO of a terminal in implementation example 13.

In implementation examples 10 to 12, a signal related to paging information refers to a demodulation reference signal of paging downlink control information (DCI) and/or a demodulation reference signal of a paging message. When the paging DCI and the paging message are transmitted with independent sweeping resources, a base station may also indicate to a terminal a quasi-co-location relationship between the demodulation reference signal of the paging DCI and the demodulation reference signal of the paging message. Therefore, the terminal may determine a resource of the paging message according to a resource of the received paging DCI and the quasi-co-location relationship, and receive the paging message. FIG. 39 is a schematic diagram illustrating a structure of a PO of a terminal in implementation example 13. The PO in FIG. 39 includes a group of paging resources including the paging DCI in each beam direction (a resource of an SS burst set may be multiplexed by the paging DCI and an SS, or a group of sweeping resources independently configured may be used), and a group of sweeping resource is independently configured for the paging message. FIG. 39 shows that the quasi-co-location relationship between the paging DCI and the paging message is a one-to-one resource mapping relationship. Similar to implementation examples 11 and 12, a many-to-one or one-to-many resource mapping relationship may also be configured.

Implementation Example 14

In the methods described in implementation examples 10 to 13, a base station notifies, via explicit signaling, a terminal of a sweeping signal or channel with a quasi-colocation relationship with a signal related to paging information, or indicates a quasi-co-location relationship between signals related to the paging information (a demodulation reference signal of a physical control channel related to the paging information and a demodulation reference signal related to the paging information) and indicates a mapping relationship between each paging resource and each sweeping channel resource (or a mapping relationship between each physical control channel resource related to the paging information and each resource of a paging message). The preceding relationship information may also be predefined by a system. For example, the system predefines a quasi-co-location relationship between the signal related to the paging information and a beam reference signal (BRS) (or between the demodulation reference signal of the physical control channel related to the paging information and a demodulation reference signal of the paging message). A mapping relationship between a transmission resource of the signal related to the paging information and a resource of a synchronous signal (or between each physical control channel resource related to the paging information and each resource of the paging message) is also fixed. In this case, the terminal may determine a receiving manner within a PO according to a predefined configuration.

This embodiment further provides a computer-readable storage medium storing computer-executable instructions for executing any method described above.

Figure 40:
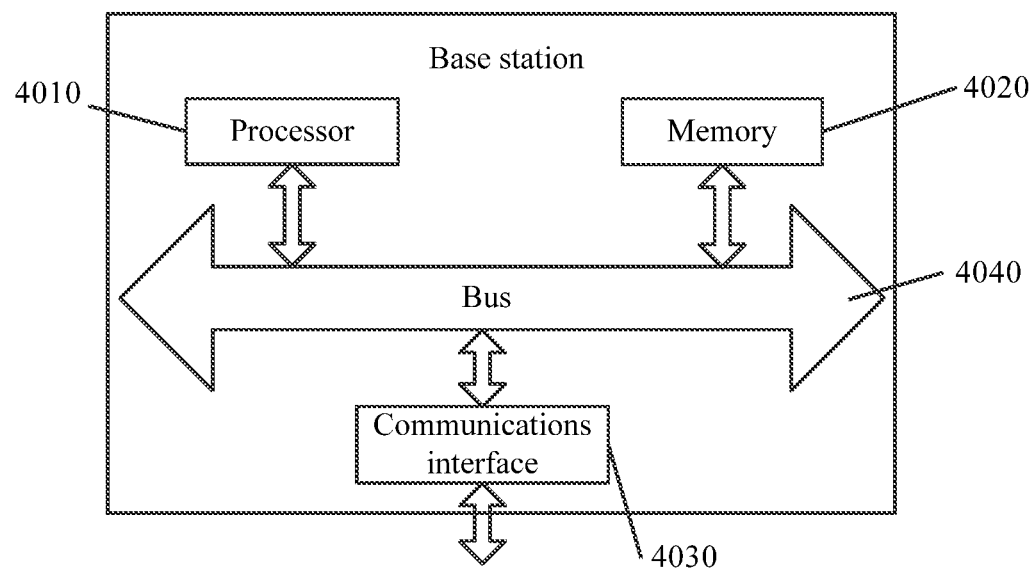
FIG. 40 is a structural diagram of hardware of a base station according to an embodiment of the present disclosure.

FIG. 40 is a structural diagram of hardware of a base station according to this embodiment. As shown in FIG. 40, the base station includes a processor 4010 and a memory 4020, and may further include a communications interface 4030 and a bus 4040.

The processor 4010, the memory 4020 and the communications interface 4030 may communicate with each other via the bus 4040. The communications interface 4030 may be used for information transmission. The processor 4010 may call logic instructions in the memory 4020 to perform the methods according to the embodiments described above.

Figure 41:
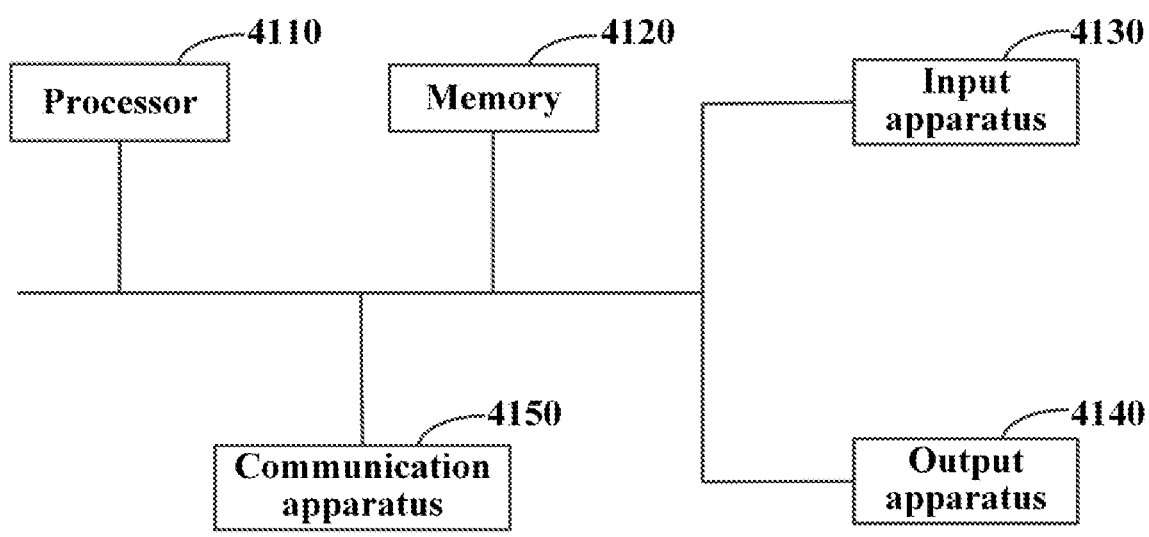
FIG. 41 is a structural diagram of hardware of a terminal device according to an embodiment of the present disclosure.

FIG. 41 is a structural diagram of hardware of a terminal device according to this embodiment. As shown in FIG. 41, the terminal device includes one or more processors 4110 and a memory 4120. One processor 4110 is taken as an example in FIG. 41.

The terminal device may further include an input apparatus 4130 and an output apparatus 4140.

The processor 4110, the memory 4120, the input apparatus 4130, and the output apparatus 4140 in the terminal device may be connected via a bus or in other manners. FIG. 41 uses connection via a bus as an example.

The input apparatus 4130 may receive inputted digital or character information and the output apparatus 4140 may include a display screen and other display devices. The terminal device may further include a communication apparatus 4150 configured to transmit information through a communication network. The processor 4110 may call logic instructions in the memory 4120 to perform the methods according to the embodiments described above.

The memory 4020 and the memory 4120 may both include a program storage region and a data storage region. The program storage region may store an operating system and an application program required by at least one function. The data storage region may store data created according to the use of the device and the like. In addition, the memory may include, for example, a volatile memory such as a random access memory, and may also include a non-volatile memory such as at least one disk memory, a flash memory, or other non-transient solid-state memories.

In addition, the logic instructions in the memory 4020 and the memory 4120 may be implemented in the form of a software functional unit and, when sold or used as an independent product, may be stored in a computer-readable storage medium. The technical solutions provided by the present disclosure may be embodied in the form of a computer software product. The computer software product may be stored in a storage medium and includes several instructions for enabling a computer device (which may be a personal computer, a server, a network device, or the like) to execute all or part of the steps in the methods according to the embodiments of the present disclosure.

The storage medium may be a non-transient storage medium, or may also be a transient storage medium. The non-transient storage medium may include: a USB flash disk, a mobile hard disk, a read-only memory (ROM), a random access memory (RAM), a magnetic disk, an optical disk, or another medium capable of storing program codes.

All or part of the processes in the methods according to the above-mentioned embodiments may be implemented by relevant hardware indicated by computer programs, which may be stored in a non-transient computer-readable storage medium. During these programs are executed, the processes in the methods according to the above-mentioned embodiments may be implemented.

All or part of the steps in the methods described above may be implemented by relevant hardware (such as a processor) as instructed by programs which may be stored in a computer-readable storage medium, such as a ROM, a magnetic disk, or an optical disk. In an embodiment, all or part of the steps in the embodiments described above may also be implemented by using one or more integrated circuits. Accordingly, each device/unit in the embodiments described above may be implemented by hardware, for example, the functions of these devices/units may be implemented by integrated circuits; or each device/unit may be implemented by software functional devices, for example, the functions of these devices/units may be implemented by using a processor to execute programs/instructions stored in a memory. The embodiments of the present application are not limited to any specific combination of hardware and software.

INDUSTRIAL APPLICABILITY

The method, apparatus and system for transmitting paging information provided by the present disclosure may solve the problem that when the DRX mechanism for receiving the paging information in the LTE system is applied to the new generation of wireless communication systems, the UE in the IDLE state cannot foresee how the beams or ports are scheduled in the different timeslots so that it is complex, even impossible, to implement the DRX mechanism for paging information transmissions.

What is claimed is:
1. A wireless communication method, comprising:
receiving, by a second communication node, a paging occasion offset transmitted by a first communication node, the paging occasion offset is configured to adjust a first time domain position of a paging occasion to a second time domain position of the paging occasion within a discontinuous reception (DRX) cycle, the DRX cycle having a set length, the paging occasion including a group of paging resources for transmitting paging downlink control information across a plurality of beams;

calculating, by the second communication node, the second time domain position of the paging occasion according to the paging occasion offset, the first time domain position, and the set length of the DRX cycle;

calculating, by the second communication node, a starting radio frame number in a radio frame corresponding to the paging occasion, according to the paging occasion offset;

determining, by the second communication node, a half frame position of the starting radio frame number in the radio frame corresponding to the paging occasion for a first beam of the plurality of beams corresponding to a resource of the group of resources; and receiving, by the second communication node, the paging downlink control information transmitted by the first communication node within the half frame position of the starting radio frame number in the radio frame corresponding to the paging occasion via the first beam of the plurality of beams.

2. The method of claim 1, wherein calculating the second time domain position of the paging occasion further comprises calculating the second time domain position of the paging occasion according to a device identifier of the second communication node and a number of paging information transmissions.

3. The method of claim 1, wherein the second time domain position of the position occasion for the respective beam differs from a third time domain position of the paging occasion for a second beam of the plurality of beams.

4. The method of claim 1, wherein the starting radio frame number for the respective beam differs from a starting radio frame number for a second beam of the plurality of beams.

5. A wireless communication apparatus, comprising:
a calculation device configured to:
calculate a second time domain position of a paging occasion according to a paging occasion offset, a first time domain position, and a set length of a discontinuous reception (DRX) cycle, the paging occasion offset is configured to adjust the first time domain position to the second time domain position of the paging occasion within the DRX cycle, the DRX cycle having the set length, the paging occasion including a group of paging resources for transmitting paging downlink control information in across a plurality of beams, and
calculate a starting radio frame number corresponding to the paging occasion in a radio frame, according to the paging occasion offset;
determine a half frame position of the starting radio frame number in the radio frame corresponding to the paging occasion for a first beam of the plurality of beams corresponding to a resource of the group of resources; and
a receiving device configured to:
receive the paging occasion offset transmitted by a communication node, and
receive the paging downlink control information transmitted by the communication node within the half frame position of the starting radio frame number in the radio frame corresponding to the paging occasion via the first beam of the plurality of beams.

6. The apparatus of claim 5, wherein the calculating device is further configured to calculate the second time domain position of the paging occasion according to a device identifier and a number of paging information transmissions.

7. A wireless communication method, comprising:
calculating, by a first communication node, a second time domain position of a paging occasion according to a paging occasion offset, a first time domain position, and a set length of a discontinuous reception (DRX) cycle, the paging occasion offset is configured to adjust the first time domain position to the second time domain position of the paging occasion within the DRX cycle, the DRX cycle having the set length, the paging occasion including a group of paging resources for transmitting paging downlink control information across a plurality of beams;

calculating, by the first communication node, a starting radio frame number in a radio frame corresponding to the paging occasion, according to the paging occasion offset;

determining, by the first communication node, a half frame position of the starting radio frame number in the radio frame corresponding to the paging occasion for a first beam of the plurality of beams corresponding to a resource of the group of resources; and transmitting, by the first communication node to a second communication node, paging downlink control information within the half frame position of the starting radio frame number in the radio frame corresponding to the paging occasion via the first beam of the plurality of beams.

8. The apparatus of claim 7, wherein calculating the second time domain position of the paging occasion further comprises calculating the second time domain position of the paging occasion according to a device identifier of the second communication node and a number of paging information transmissions.

9. A wireless communication apparatus, comprising:
a calculation device configured to:
calculate a second time domain position of a paging occasion according to a paging occasion offset, a first time domain position, and a set length of a discontinuous reception (DRX) cycle, the paging occasion offset is configured to adjust the first time domain position to the second time domain position of the paging occasion within the DRX cycle, the DRX cycle having the set length, the paging occasion including a group of paging resources for transmitting paging downlink control information in across a plurality of beams;
calculate a starting radio frame number in a radio frame corresponding to the paging occasion, according to the paging occasion offset;
determine a half frame position of the starting radio frame number in the radio frame corresponding to the paging occasion for a first beam of the plurality of beams corresponding to a resource of the group of resources; and
a transmitting device configured to transmit, to a communication node, the paging downlink control information within the half frame position of the starting radio frame number in the radio frame corresponding to the paging occasion via the first beam of the plurality of beams.

10. The apparatus of claim 9, wherein the calculating device is further configured to calculate the second time domain position of the paging occasion according to a device identifier and a number of paging information transmissions.

* * * * *